(12) United States Patent
Gokhale et al.

(10) Patent No.: US 10,469,854 B2
(45) Date of Patent: Nov. 5, 2019

(54) CONTENT, PSYCHOVISUAL, REGION OF INTEREST, AND PERSISTENCE BASED ADAPTIVE QUANTIZATION FOR VIDEO CODING

(71) Applicant: Intel Corporation, Santa Clara, CA (US)

(72) Inventors: Neelesh N. Gokhale, Seattle, WA (US); Atul Puri, Redmond, WA (US); Chang Kee Choi, Bellevue, WA (US)

(73) Assignee: Intel Corporation, Santa Clara, CA (US)

(*) Notice: Subject to any disclaimer, the term of this patent is extended or adjusted under 35 U.S.C. 154(b) by 188 days.

(21) Appl. No.: 15/628,961

(22) Filed: Jun. 21, 2017

(65) Prior Publication Data

US 2018/0376153 A1 Dec. 27, 2018

(51) Int. Cl.
| | | |
|---|---|---|
| *G06K 9/46* | (2006.01) | |
| *H04N 19/19* | (2014.01) | |
| *H04N 19/167* | (2014.01) | |
| *H04N 19/124* | (2014.01) | |
| *H04N 19/14* | (2014.01) | |
| *H04N 19/18* | (2014.01) | |
| *H04N 19/159* | (2014.01) | |
| *H04N 19/176* | (2014.01) | |
| *H04N 19/147* | (2014.01) | |

(Continued)

(52) U.S. Cl.
CPC .......... *H04N 19/19* (2014.11); *H04N 19/124* (2014.11); *H04N 19/132* (2014.11); *H04N 19/136* (2014.11); *H04N 19/137* (2014.11); *H04N 19/14* (2014.11); *H04N 19/147* (2014.11); *H04N 19/154* (2014.11); *H04N 19/159* (2014.11); *H04N 19/167* (2014.11); *H04N 19/176* (2014.11); *H04N 19/177* (2014.11); *H04N 19/18* (2014.11); *H04N 19/645* (2014.11)

(58) Field of Classification Search
CPC .... H04N 19/176; H04N 19/124; H04N 19/70; H04N 19/14; H04N 19/147; H04N 19/51; H04N 21/2662; G06T 2207/10016
See application file for complete search history.

(56) References Cited

U.S. PATENT DOCUMENTS

| | | | |
|---|---|---|---|
| 7,881,370 B2 * | 2/2011 | Reichel ................. | H04N 19/10 375/240.01 |
| 8,094,716 B1 * | 1/2012 | Chen .................... | H04N 19/147 375/240.01 |

(Continued)

OTHER PUBLICATIONS

Images and its compression Techniques—A Review, Sindhu M et al., IJRTE ACEEE, vol. 2, No. 4, Nov. 2009, pp. 71-75 (Year: 2009).*

(Continued)

*Primary Examiner* — Jayesh A Patel
(74) *Attorney, Agent, or Firm* — Green, Howard, & Mughal LLP.

(57) ABSTRACT

Techniques related to improved video encoding including content, psychovisual, region of interest, and persistence based adaptive quantization are discussed. Such techniques may include generating block level rate distortion optimization Lagrange multipliers and block level quantization parameters for blocks of a picture to be encoded and determining coding parameters for the blocks based on a rate distortion optimization using the Lagrange multipliers and quantization parameters.

31 Claims, 27 Drawing Sheets

(51) Int. Cl.
*H04N 19/132* (2014.01)
*H04N 19/136* (2014.01)
*H04N 19/137* (2014.01)
*H04N 19/154* (2014.01)
*H04N 19/177* (2014.01)
*H04N 19/645* (2014.01)

(56) References Cited

U.S. PATENT DOCUMENTS

| | | | | |
|---|---|---|---|---|
| 8,121,190 B2* | 2/2012 | Li | ......................... | H04N 19/147 |
| | | | | 375/240.07 |
| 8,165,063 B2* | 4/2012 | Kim | ................... | H04L 29/06027 |
| | | | | 370/328 |
| 8,331,438 B2* | 12/2012 | Chang | ................... | H04N 19/159 |
| | | | | 375/240.03 |
| 8,654,835 B2* | 2/2014 | Li | ......................... | H04N 19/105 |
| | | | | 375/240.01 |
| 9,479,786 B2* | 10/2016 | Lu | ......................... | H04N 19/176 |
| 2008/0063051 A1* | 3/2008 | Kwon | ................... | H04N 21/242 |
| | | | | 375/240.03 |
| 2008/0084929 A1* | 4/2008 | Li | ......................... | H04N 19/147 |
| | | | | 375/240.12 |
| 2014/0140396 A1* | 5/2014 | Wang | ..................... | H04N 19/61 |
| | | | | 375/240.03 |
| 2015/0071343 A1* | 3/2015 | Novotny | ............. | H04N 19/124 |
| | | | | 375/240.03 |

OTHER PUBLICATIONS

Ahumada, A. et al., "Luminance Model-Based DCT Quantization for Color Image Compression", SPIE, vol. 1666, Human Vision, Visual Processing, and Digital Display III, pp. 365-374, 1992, (published before this application Jun. 2017).

Chen, M-J et al., "ROI Video Coding Based on H.263+ with Robust Skin-Color", Proceedings, IEEE International Conference on Consumer Electronics, pp. 44-45, 2003, (published before this application Jun. 2017).

Li, B. et al., "Lambda Domain Rate Control Algorithm for High Efficiency Video Coding", IEEE Transactions on Image Processing, vol. 23, No. 9, pp. 3841-3854, Sep. 2014.

Puri, A., "Motion-Compensated Video Coding with Adaptive Perceptual Quantization", IEEE Trans. on Circuits and Systems for Video Technology, vol. CSVT-1, No. 4, pp. 351-361, Dec. 1991.

Verscheure, O., "Adaptive Quantization using a Perceptual Visibility Predictor", Proceedings, International Conference on Image Processing, pp. 299-301, 1997, (published before this application Jun. 2017).

* cited by examiner

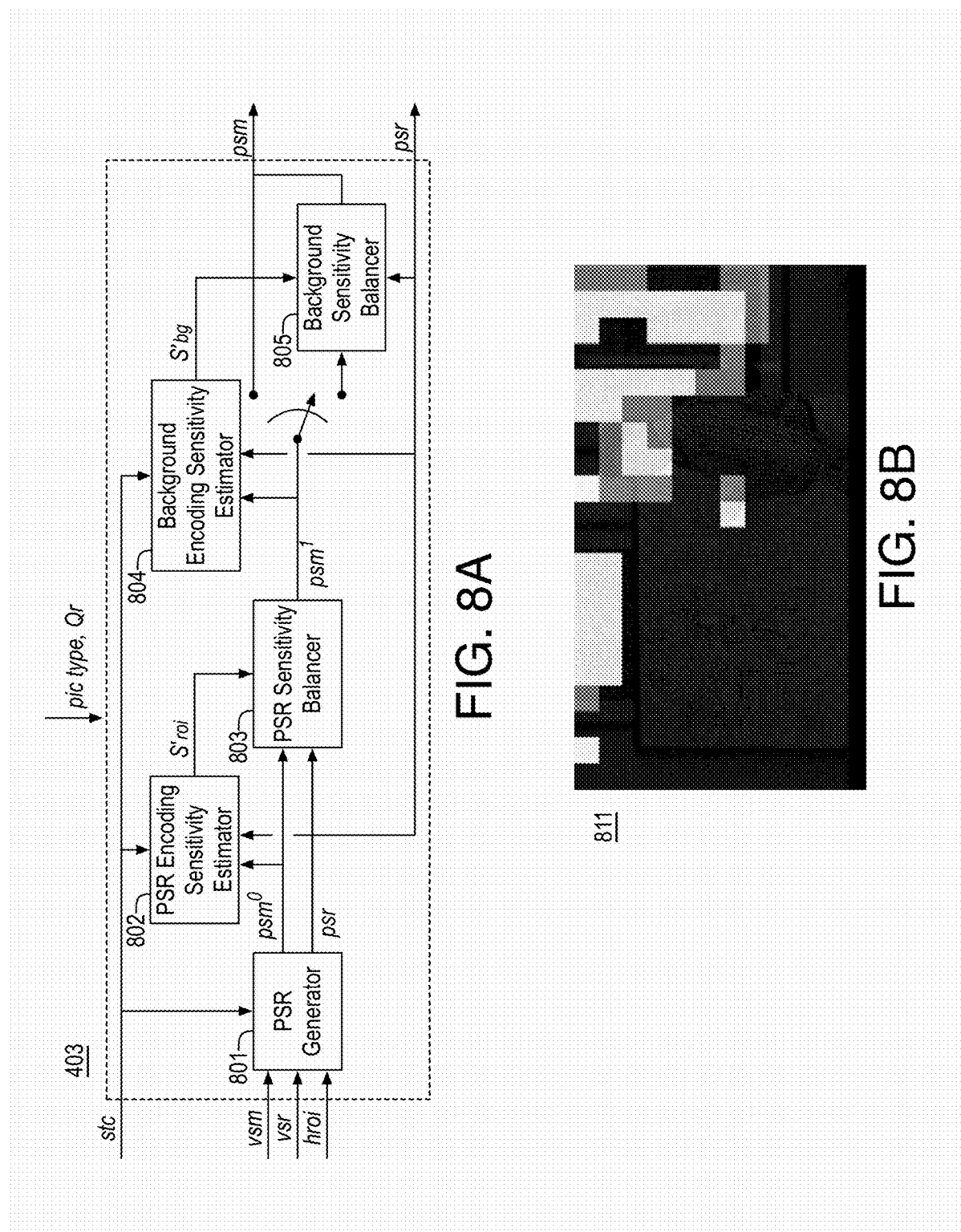

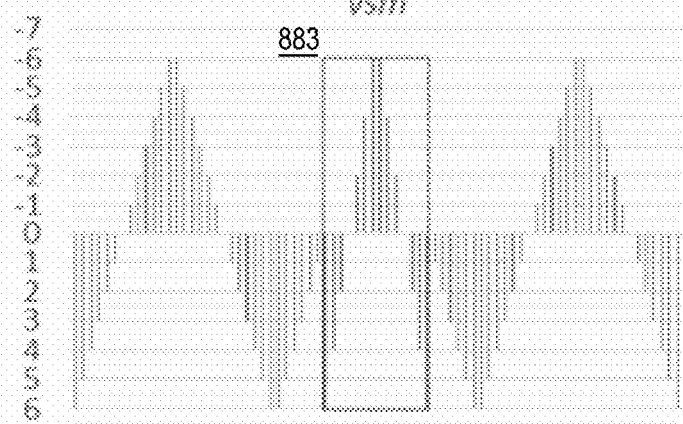
FIG. 8C(i)
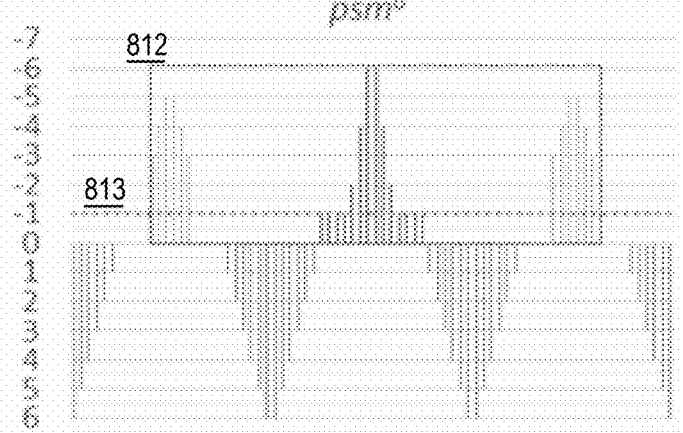
FIG. 8C(ii)

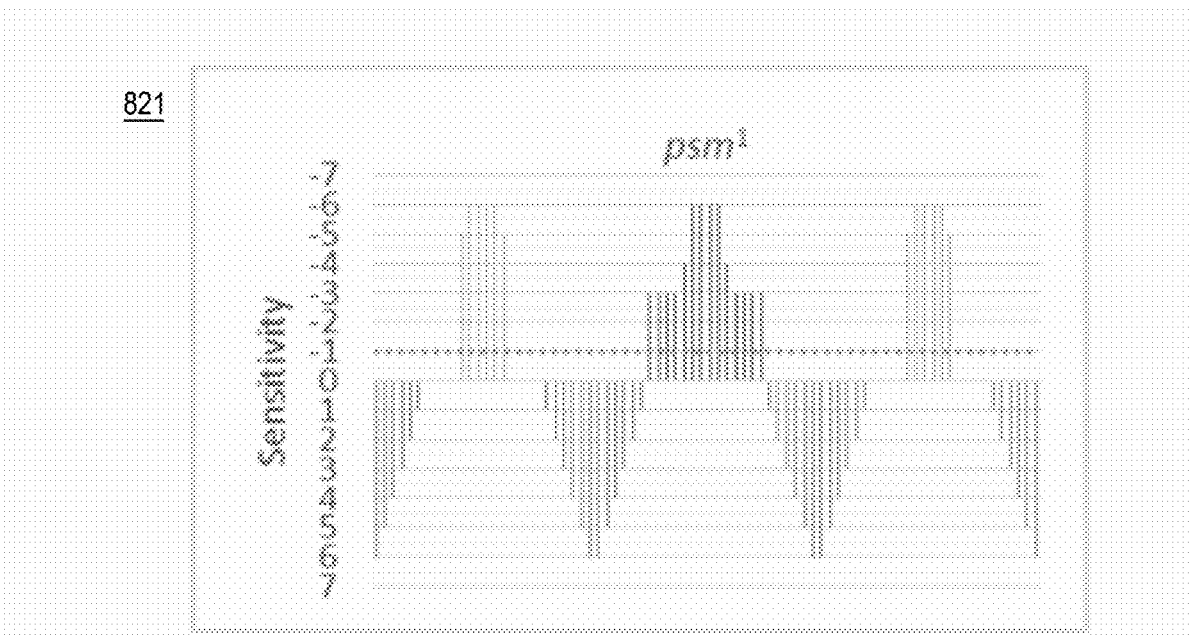
FIG. 8C(iii)
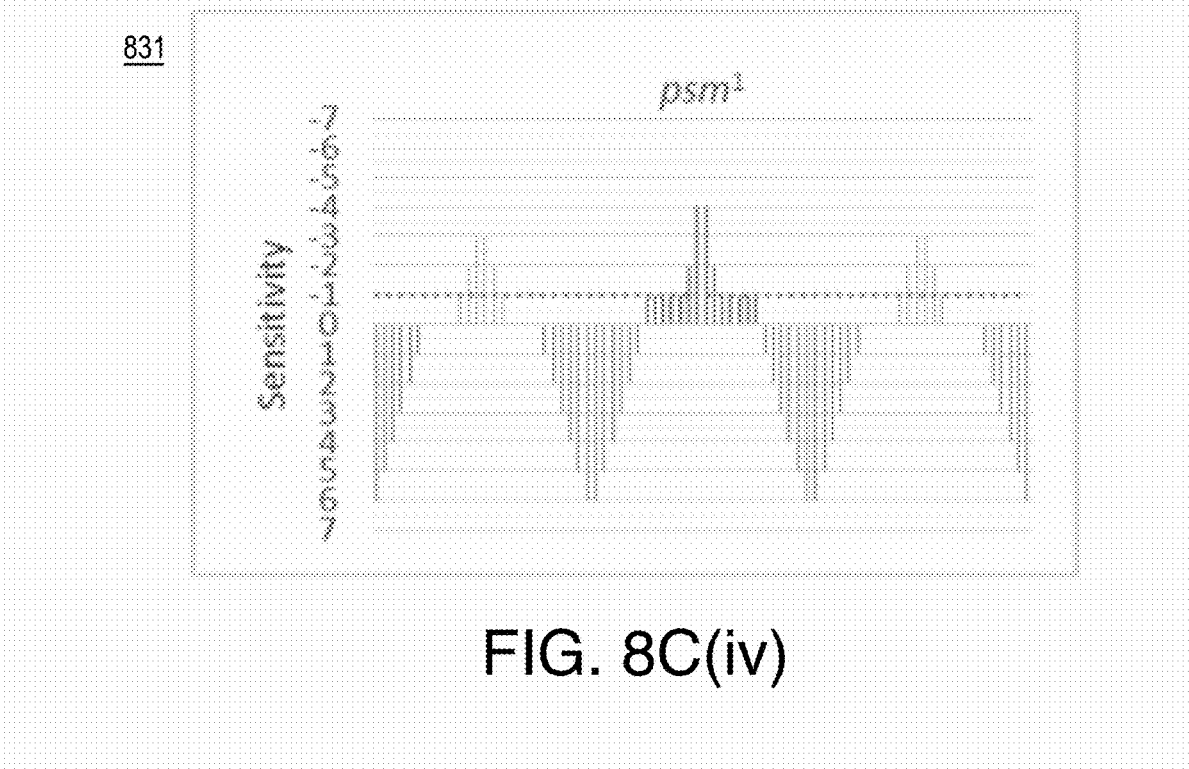
FIG. 8C(iv)

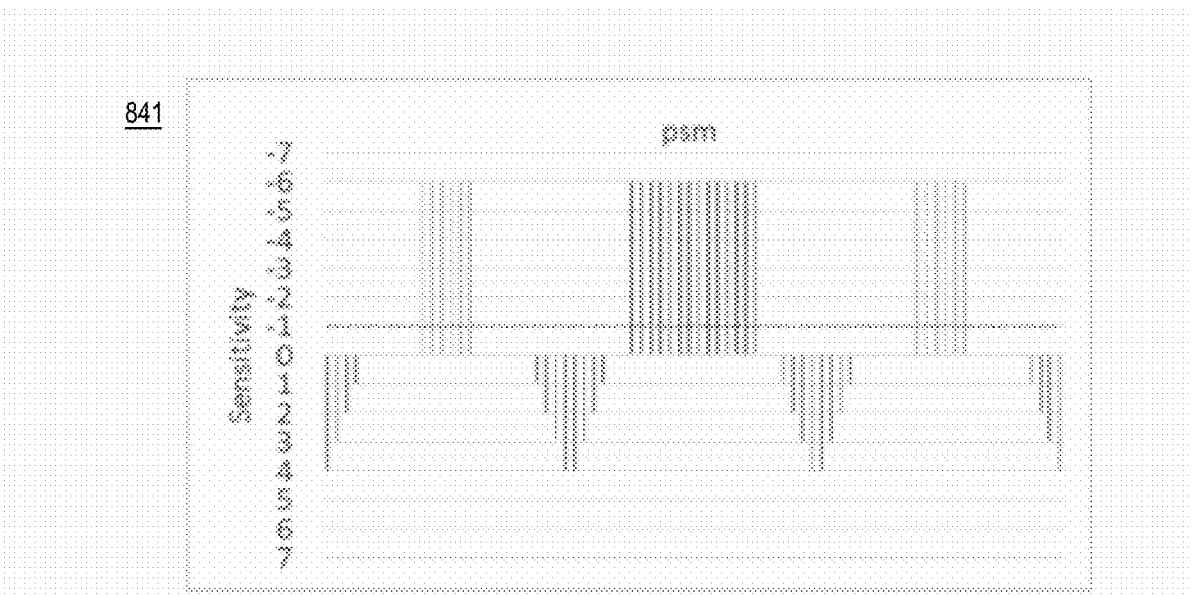
FIG. 8C(v)
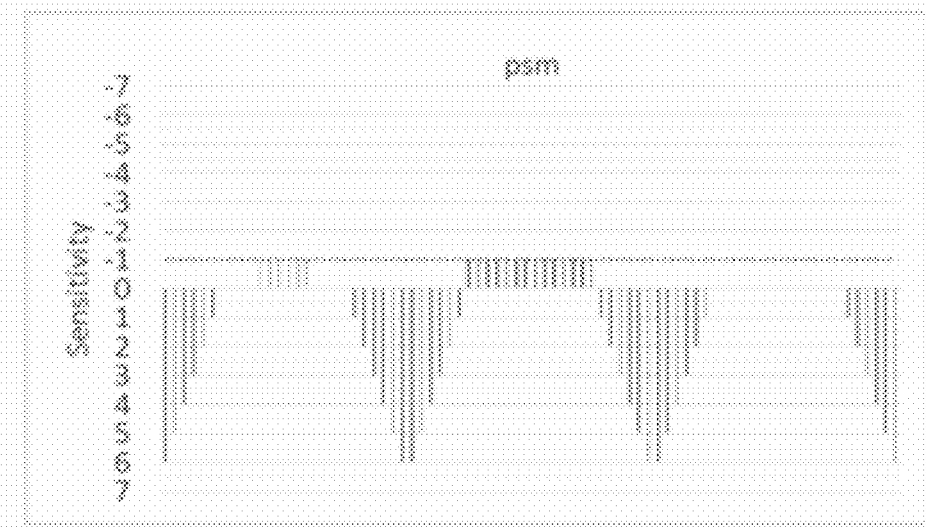
FIG. 8C(vi)

CONTENT, PSYCHOVISUAL, REGION OF INTEREST, AND PERSISTENCE BASED ADAPTIVE QUANTIZATION FOR VIDEO CODING

BACKGROUND

A video encoder compresses video information so that more information can be sent over a given bandwidth or stored in a given file size. The compressed video information may be transmitted or provided to a receiver having a decoder that decodes or decompresses the video information to generate video frames or pictures for display to a viewer. Exemplary video coding standards include ITU-T H.264/ISO MPEG AVC and ITU-T H.265/ISO MPEG HEVC as well as standards currently in development such as ITU-T H.266 and the AOM AV1 standard. Such coding standards standardize bitstream description and decoding semantics, which may define an encoding framework but leave many aspects of the encoder design open. To comply with the standard, the encoder must generate encoded bitstreams that are standards compliant, but it may do so in any manner thereby leaving room for encoder side innovation. The resulting bitstreams are then assumed to be decodable by any device or application compliant to the standard.

As such, there is a continual demand for improved video encoding techniques, devices, systems, and the like. It is with respect to these and other considerations that the present improvements have been needed. Such improvements may become critical as the desire to provide high quality video encoding becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 8A illustrates an example pyschovisual modulator;

FIG. 8B illustrates an example psychovisual regions of interest block map;

FIGS. 8C(i)-8C(vi) illustrate example psychovisual modulation;

DETAILED DESCRIPTION

Figure 1A:
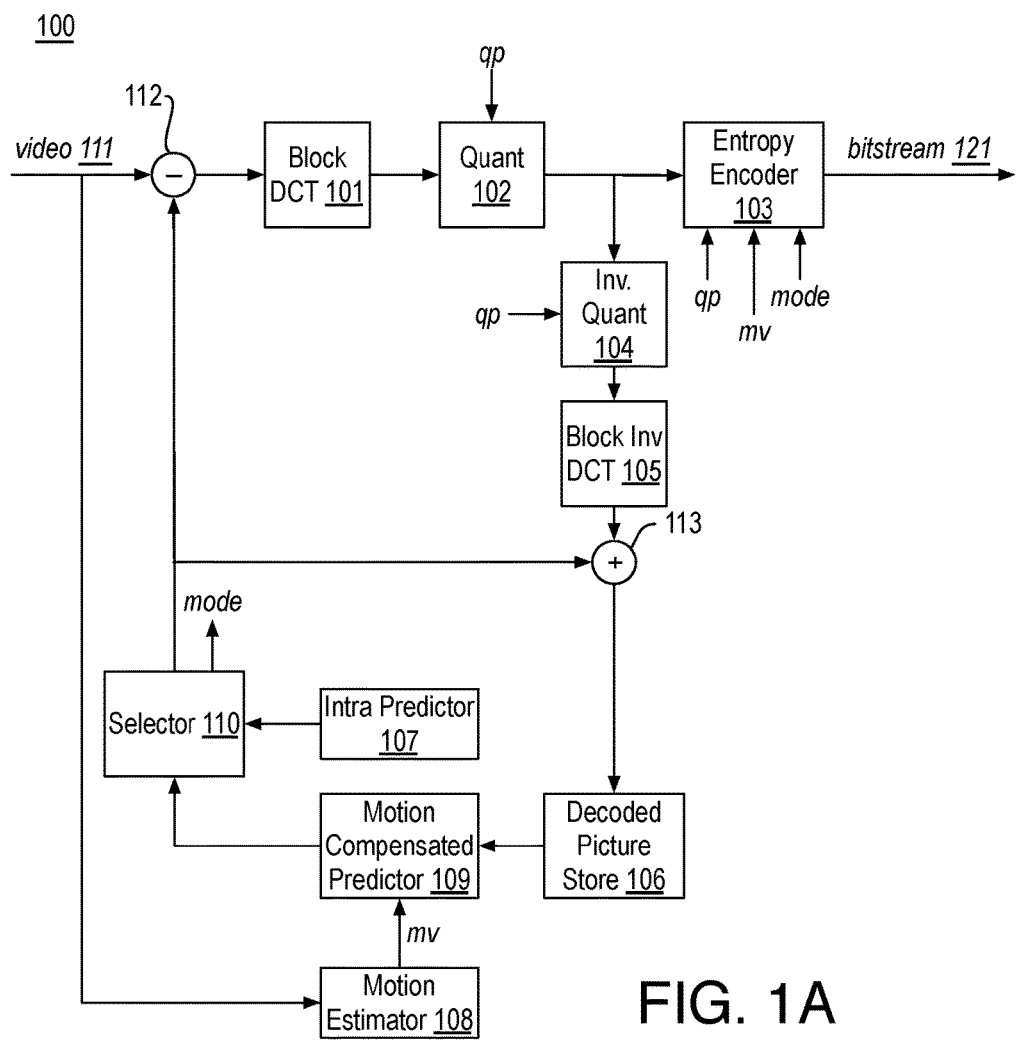
FIG. 1A illustrates a block diagram of an example video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video encoding and, in particular, to adaptive quantization video encoding.

The techniques discussed herein relate to highly efficient coding of video content by providing encoder side improvements. Such encoder side techniques may be implemented to provide bitstreams compliant to any suitable existing or newly developed video coding standard such as existing standards ITU-T H.264/ISO MPEG AVC (AVC) and ITU-T H.265/ISO MPEG HEVC (HEVC), as well as standards currently in development such as ITU-T H.266 or the AOM AV1. More specifically, the techniques discussed herein relate to encoding side quantization processes that perform optimal tradeoffs with encoding resulting in improved bitstreams at the same bitrate which, when decoded, produce video that appears to be of higher subjective quality to the viewer. Bitstreams resulting from the encode techniques discussed herein are both compliant to the standard and can be stored or transmitted prior to being received, decoded and displayed by an application, player, device, or the like to a human viewer.

Video encoders may use inter-frame coding using motion compensated prediction and inter coding (or temporal prediction based) differences. Such encoders may also support an intra coding (or spatial prediction) based mode. In the following, the terms frames and pictures are used interchangeably and such frames and pictures may include any suitable video data such as pixel based luma and chroma values at any suitable resolution(s).

FIG. 1A illustrates a block diagram of an example video encoder 100, arranged in accordance with at least some implementations of the present disclosure. For example, video encoder 100 may provide inter-frame coding. For example, such inter-frame coding may include motion-compensated discrete cosine transform (DCT) coding. For example, standards based video coding (e.g., encode/decode) may be based on such coding techniques, although details differ between the standards.

In inter-frame coding, temporally predictive coding that adapts to motion of objects between frames of video is used to compute motion compensated differential residual signals, which may be combined with spatial transform coding that converts spatial blocks of pixels to blocks of frequency coefficients, typically by DCT (e.g., of a block size such as 8×8) followed by reduction in precision of these DCT coefficients by quantization to adapt video quality to available bit-rate. Since the resulting transform coefficients have energy redistributed in lower frequencies, some of the small valued coefficients after quantization turn to zero and some high frequency coefficients may be coded with higher quantization errors or even skipped altogether. These and other characteristics of transform coefficients such as frequency location, some quantized levels occurring more frequently than others, etc. allow for the use of frequency domain scanning of coefficients and entropy coding (e.g., variable word length coding) to achieve additional compression gains.

As shown in FIG. 1A, since motion compensation is difficult to perform in the transform domain, an operation in an inter-frame coder may be to create a motion compensated prediction error in the pixel domain. For example, for each block of a current frame of video 111, intra or inter prediction may be used for the block. For inter prediction, a prediction block in a reference frame may be found by motion compensated predictor 109 using a motion vector computed during motion estimation by motion estimator 108. The current block and the prediction block may be differenced by differencer 112 to generate a prediction error signal (e.g., a residual block or the like). The resulting prediction error signal or residual block may be transformed using, for example, a 2D DCT by block DCT module 101. The resulting residual coefficients may be quantized by an adaptive quantizer 102 (based on a quantization parameter, qp) to generate quantized residual coefficients. The quantized residual coefficients may be encoded using an entropy encoder 103, which may be a Variable Length Coder (VLC), an arithmetic entropy coder, or the like, into coded into a bitstream 121, which may be buffered for transmission over a channel to a remote device such as a decoder.

For intra prediction, a prediction block may be generated using pixel data from the current frame of video 111 by intra predictor 107. As discussed with respect to inter prediction, the current block and the prediction block may be differenced by differencer 112 to generate a prediction error signal (e.g., a residual block or the like) and the resulting prediction error signal or residual block may be transformed using, for example, a 2D DCT by block DCT module 101. The resulting residual coefficients may be quantized by adaptive quantizer 102 to generate quantized residual coefficients, which may be encoded using an entropy encoder 103 and coded into bitstream 121, which may be buffered for transmission over a channel to a remote device such as a decoder.

Also as shown, encoder 100 includes a local decode loop including in inverse quantizer 104, a block inverse DCT module 105 and an adder 113. Inverse quantizer 104 may inverse quantize quantized coefficients from quantizer 102 to generate residual coefficients, which may be inverse transformed by a block inverse DCT module 105 to provide a prediction error signal (e.g., a residual block or the like). The prediction error signal may be added to the prediction block (as provided by intra predictor 107 or motion compensated predictor 109 via selector 110) by adder 113 to generate a predicted block. Such predicted blocks may be combined into a picture or frame, optionally deblock filtered or the like, and stored in decoded picture store 106 for use in the prediction of other frames or pictures of video 111.

Furthermore, a decoder in analogy to encoder 100 may include an entropy decoder (not shown), intra predictor 107, motion compensated predictor 109, inverse quantizer 104, block inverse DCT module 105, adder 113, and, optionally, selector 110. The decoder may receive bitstream 121 via the entropy decoder, which may decode bitstream 121 to generate quantized coefficients and control signals. The quantized coefficients may be provided to inverse quantizer 104, which may inverse quantize the quantized coefficients from quantizer 102 to generate residual coefficients, which may be inverse transformed by block inverse DCT module 105 to provide a prediction error signal (e.g., a residual block or the like). The prediction error signal may be added to a prediction block by adder 113 to generate a predicted block. The prediction block may be provided by intra predictor 107 (if intra prediction is used for the block) or motion compensated predictor 109 (if inter prediction is used for the block). Such intra or inter prediction may be based on intra modes or motion vectors received for the block via bitstream 121. Such predicted blocks may be combined into a picture or frame, optionally deblock filtered or the like, and stored in decoded picture store 106 for eventual display to a user via a display (not shown).

Figure 1B:
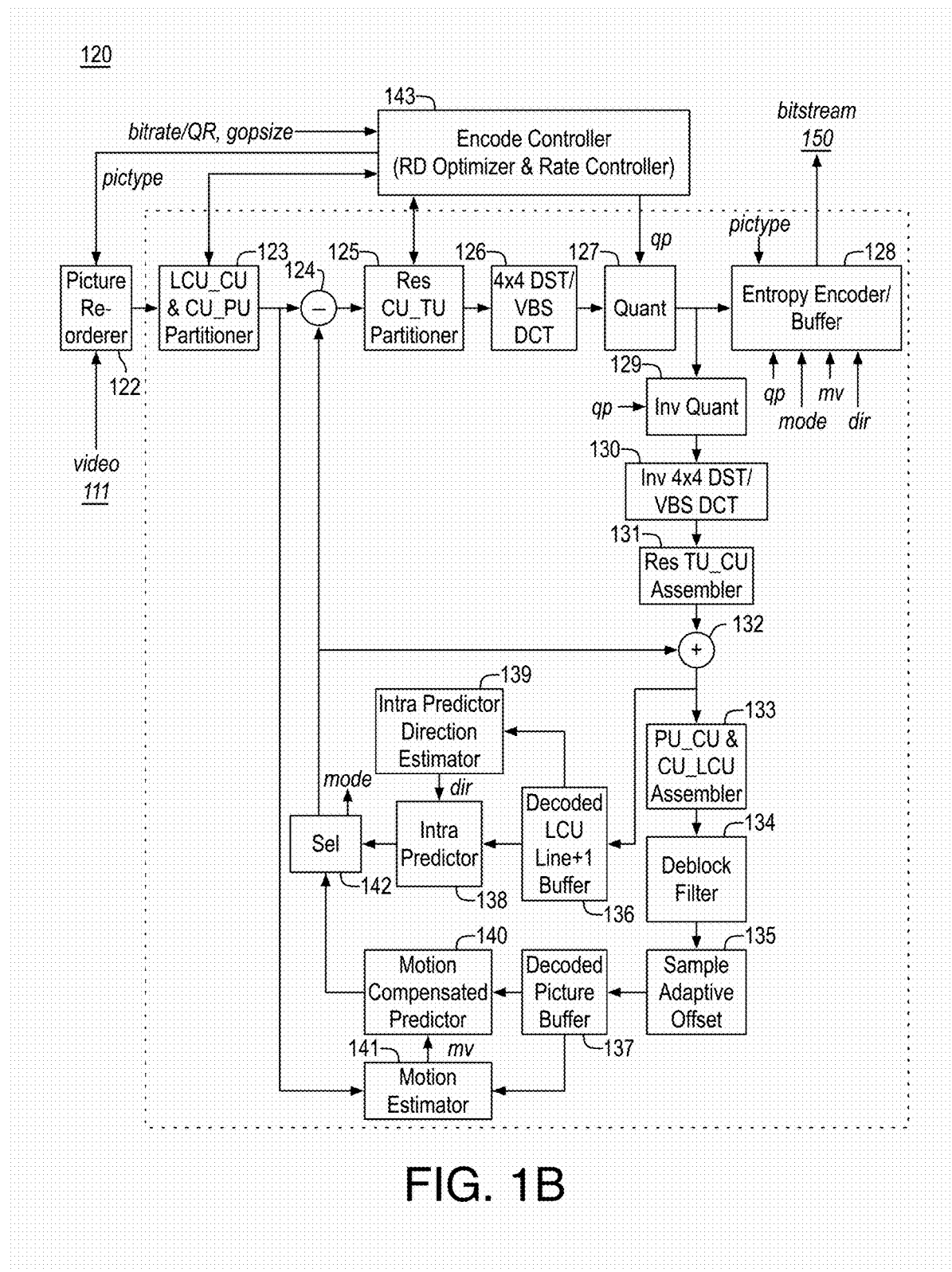
FIG. 1B illustrates a block diagram of an example HEVC encoder.

FIG. 1B illustrates a block diagram of an example HEVC video encoder 120, arranged in accordance with at least some implementations of the present disclosure. As shown, HEVC video encoder 120 may include an encode controller 143, a picture reorderer 122, a partioner (LCU_CU & CU_PU partitioner) 123, a differencer 124, a residual partioner (residual CU_TU partitioner) 125, a transform module (4×4 DST/VBS DCT module) 126, a quantizer 127, an entropy encoder and buffer 128, an inverse quantizer 129, an transform module (inverse DST/VBS DCT module) 130, a residual assembler (residual CU_TU assembler) 131, an adder 132, an assembler (PU_CU & CU_LCU assembler) 133, a deblock filter 134, a sample adaptive offset module 135, a decoded LCU line+1 buffer 136, a decoded picture buffer 137, an intra predictor 138, an intra prediction direction estimator 139, a motion compensated predictor 140, a motion estimator, and a selector 142.

For example, MPEG/ITU-T video standards including HEVC and AVC standards are based on the interframe coding principles discussed with respect to FIG. 1A although they differ in key details that attempt to provide higher compression efficiency. The techniques discussed herein may be applied to standards based encoding such as HEVC and AVC standards. Since HEVC is more complex than AVC, the framework of HEVC is used as a basis for discussion. However, the techniques discussed herein may be applied to any suitable codec standard.

In HEVC encoding, pictures/frames of video 111 may be divided into variable block size processing structures called coding units (CU) by partitioner 123. HEVC is a block based predictive difference block transform coder. Input video frames are partitioned recursively from coded tree blocks (CTBs) (e.g., largest coding units (LCUs)) to CUs and then nonrecursively into prediction units (PUs). LCUs are typically of 64×64 size while the minimum size of a CU is 8×8. The prediction partition PUs are then combined to generate prediction CUs that are differenced with the original CUs (e.g., from the input picture) by differencer 124 resulting in residual CUs that are recursively quad-tree split into transform units (TUs) by partitioner 125 and coded with variable block size (VBS) transform of 4×4 (DST or DCT approximation), or 8×8, 16×16, and 32×32 (DCT approximation only) by transform module 126. For example, partitioner 123 partitions LCUs into CUs/PUs and partitioner 125 partitions into TUs. HEVC uses various square transform sizes called transforms units (TU). The resultant transform coefficients are quantized by quantizer 127 according to Qp (quantization parameter) for entropy encoding into a bitstream 150. Different Qps can be specified for each LCU or CU depending on maxCuDQpDepth with LCU based adaptation being of the least granularity. The encode decisions, quantized transformed difference coefficients, motion vectors, and modes are encoded in bitstream 150 by entropy encoder and buffer 128 using context adaptive binary arithmetic coding (CABAC).

As shown, encode controller 143 (which includes a rate distortion optimizer and a rate controller) controls the degree of partitioning performed, which depends on quantizer used in transform coding. Assembler 133 (e.g., the CU/PU assembler) and assembler 133 (e.g., the TU assembler) perform the reverse function of their respective partitioners 123, 125. The decoded (the encoder incorporates a decoder loop) intra/motion compensated difference partitions are assembled following inverse transform (e.g., DST/DCT) by inverse transform module 130, to which prediction PUs are added by adder 132 and, after assembly by assembler 133, the reconstructed signal is then deblock filtered by deblock filter 135 and sample adaptive offset (SAO) filtered by sample adaptive offset module 135 to reduce appearance of artifacts and restore edges impacted by coding, respectively.

As shown, HEVC uses intra and inter prediction modes to predict portions of frames and encode the difference signal by transforming it. For example, intra or inter prediction may be selected on a block basis by selector 142. Inter prediction includes motion estimation by motion estimator 141 and motion compensated prediction by motion compensated predictor 140. Such operations provide a motion compensated frame portion corresponding to a current frame portion. Intra prediction includes intra prediction direction estimation by intra predictor direction estimator 139 (which evaluates available intra modes) and intra prediction by intra predictor 138 to provide an intra prediction frame portion corresponding to the current frame portion. As shown, the selected inter or inter predicted frame portion is provided to differencer 124 (for differencing with the current frame portion and to adder 132 (for adding to a reconstructed residual frame portion).

HEVC encoding classifies pictures or frames into one of 3 basic picture types (pictyp): I-pictures, P-pictures, and B-pictures. HEVC also allows out of order coding of B pictures, where the typical method is to encode a group of pictures (GOP) in an out of order pyramid configuration. In an embodiment, a pyramid GOP configuration uses an 8 picture GOP size (gopsz). The out of order delay of B pictures in the pyramid configuration may be characterized as the picture level in pyramid (piclvl).

Figure 1C:
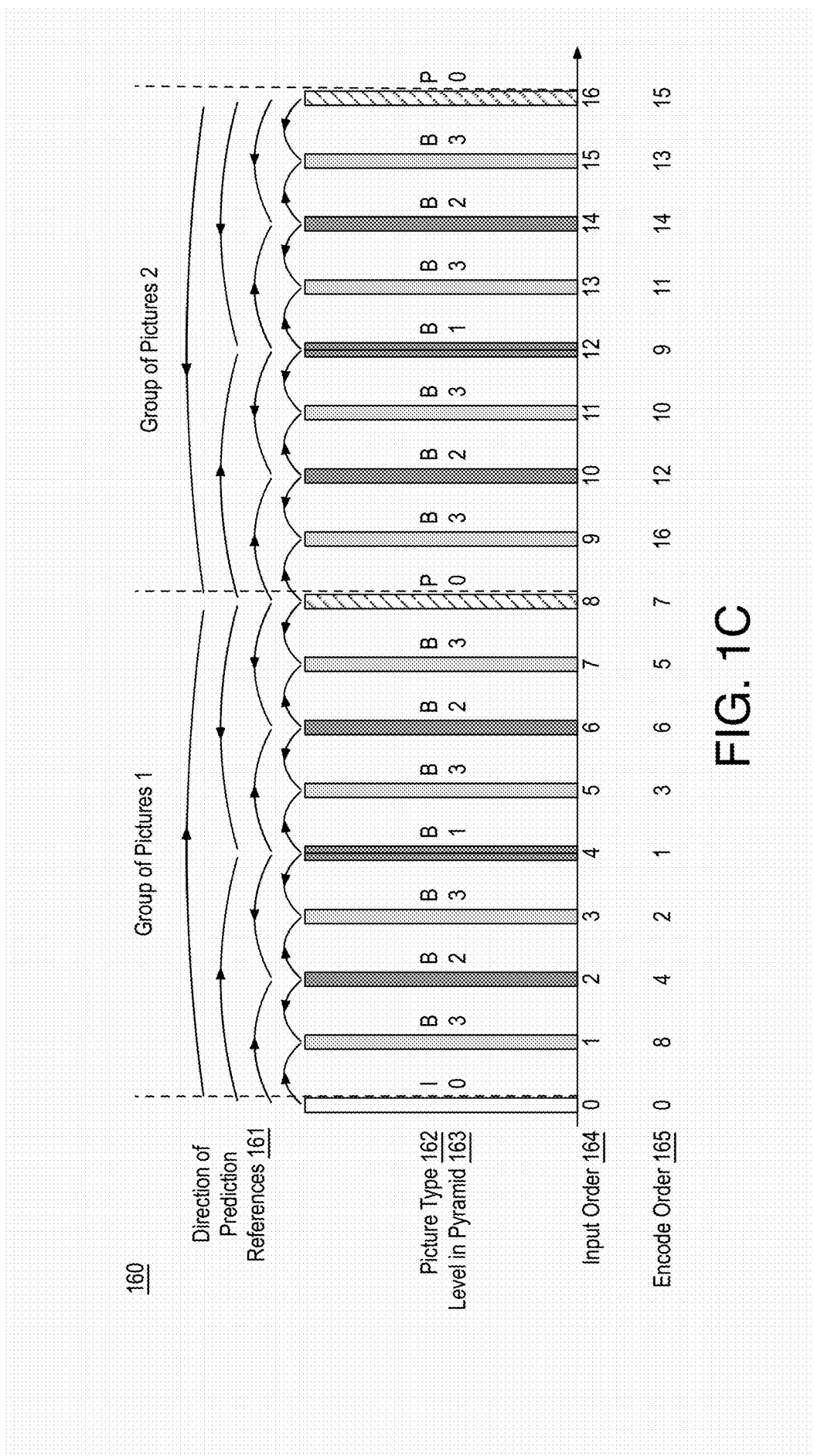
FIG. 1C illustrates example frames in two example groups of pictures.

FIG. 1C illustrates example frames 160 in two example groups of pictures, arranged in accordance with at least some implementations of the present disclosure. In FIG. 1C, input order 164 indicates the input order of frames 160, picture type 162 indicates the picture type (e.g., I-, B-, or P-) of each of frames 160, level in pyramid 163 indicates the level in the pyramid of each of frames 160, direction of prediction references indicates the frame(s) used for prediction for each of frames 160, and encode order 165 indicates the encoder order of frames. In the following the frame number of the frame typically indicates the input order of the frame.

The illustrated example shows, for example, a first 17 frames (e.g., frames 0 to 16 as shown by input order 164). For example frames 160 include a first frame (frame 0 as indicated by input order 164), which is an intra frame and a level 0 in pyramid 163 followed by two group of pictures (GOPs) 1 and 2, each with eight pictures. In the first GOP (group of pictures 1), frame 8 is a P frame (or frame 8 may be characterized as a generalized B (GPB) frame) and has a level 0 frame in pyramid 163, frame 4 is a first level (level 1 in pyramid 163) B-frame, frames 2 and 6 are second level (level 2 in pyramid 163) B-frames, and frames 1, 3, 5 and 7 are third level (level 3 in pyramid 163) B-frames. For example, frame 4 may be characterized as a first level B-frame as it only needs I-frame 0 (or the last P-frame of a previous GOP) as a previous reference and P-frame 8 of GOP 1 as a next reference to create predictions necessary for encoding frame 4. In some embodiments, frame 4 may use more than 2 references although 2 reference are used in the illustrated example. Furthermore, frames 2 and 6 may be characterized as second level B-frames as they use first level B-frame (e.g., frame 4) as a reference along with neighboring I- and P-frames. Similarly, level 3 B-frames may use at least one level 2 B-frame as a reference. Such prediction dependency examples are illustrated with respect to direction of prediction references 161 for GOP 1.

FIG. 1C also illustrates a second GOP (group of pictures 2). As shown, GOP 2 includes frames 9 through 16 (as provided by input order 164) and GOP 2 has the same size as GOP 1. GOP 2 uses decoded P-frame 8 of previous GOP 1 (e.g., instead of I-frame 0 as in case of previous GOP 1). The remainder of second GOP 2 has the same format as GOP 1. In the second GOP (group of pictures 2), frame 16 is a P frame (or frame 16 may be characterized as a generalized B (GPB) frame) and has a level 0 frame in pyramid 163, frame 12 is a first level (level 1 in pyramid 163) B-frame, frames 10 and 14 are second level (level 2 in pyramid 163) B-frames, and frames 9, 11, 13 and 15 are third level (level 3 in pyramid 163) B-frames. For example, frame 12 may be characterized as a first level B-frame as it only needs P-frame 8 as a previous reference and P-frame 16 as a next reference to create predictions necessary for encoding frame 12. Furthermore, frames 10 and 14 may be characterized as second level B-frames as they use first level B-frame (e.g., frame 12) as a reference along with neighboring P-frames. Similarly, level 3 B-frames may use at least one level 2 B-frame as a reference. Such prediction dependency examples are illustrated with respect to direction of prediction references 161 for GOP 2.

In terms of encode order 165, as shown, an encoded bitstream may include frames 160 encoded in the following order (with the following frame indicators indicating input order 164): frame 0, frame 8, frame 4, frame 2, frame 1, frame 3, frame 6, frame 5, frame 7, frame 16, frame 12, frame 10, frame 9, frame 11, frame 14, frame 13, and frame 15.

Returning to FIG. 1B, HEVC encoding generates video bitstreams (e.g., bitstream 150) such that certain compression and video quality trade-offs are made. HEVC video encoder 120 may attempt to optimize efficiency by achieving bitrate targets at high video quality. For example, bitrate is a resource that may affect network and/or storage capacity. In coding, quality is measured as error between compressed video frames and original video frames (e.g., distortion). HEVC video encoder 120 attempts to minimize this error, often at the expense of great computing resources.

For example, HEVC video encoder 120 determines on a per picture basis: local CU sizes, prediction modes (one of various intra or inter modes), TU sizes, and the like. In some embodiments, such decisions use rate distortion optimization (RDO) with a Lagrange multiplier characterized as lambda, $\lambda$, such that HEVC video encoder 120 attempts to minimize distortion (loss of video quality), D, for a given rate (amount of data used to encode the video; bitrate), R, by selecting optimal portioning and modes. For example HEVC video encoder 120 may attempt to optimize Equation (1) as follows:

$$\min\{J\} \text{ where } J=D+\lambda R \tag{1}$$

where D is distortion, $\lambda$ is a Lagrange multiplier, R is the rate, and J is the sum of the distortion and a product of the Lagrange multiplier and the rate.

Pyramid HEVC encoding may use constant Qp for each picture such that the Qp for each picture is determined from a representative Qp (e.g., QR, representative quantization parameter) for the GOP and is dependent on the pictype (picture type) and the piclvl (picture level) of a picture within a GOP. Furthermore, since video decoded from compressed bitstreams is intended for consumption by human viewers, quality measures that are visual rather than based on rate-distortion may be advantageous. For example, perceptual quality experienced by human viewers may be determined using a psychovisual basis such that psychovisual models quantify video quality as experienced by human viewers by based on the characteristics of the human visual system (HVS).

To achieve high coding efficiency, rate distortion optimization (RDO) based coding may minimize distortion (e.g., the square of error) to maximize fidelity (e.g., peak signal to noise ratio, PSNR) of decoded video at a given bitrate. However, maximizing fidelity inherently does not necessarily guarantee higher visual quality although higher fidelity does correlate to high visual quality. RDO based video coding uses tradeoffs of rate with distortion in making coding mode decisions. For example, the rate-distortion optimal may be specified as the one that minimizes the sum of bit cost multiplied by lambda multiplier and distortion (e.g., square error) as shown in Equation (1). Lambda may be fixed for a frame type and the quantization parameter (Qp) may be constant for a frame type (e.g., constant Qp, CQp) or Qp may be determined by Bitrate controller (BRC).

Figure 2A:
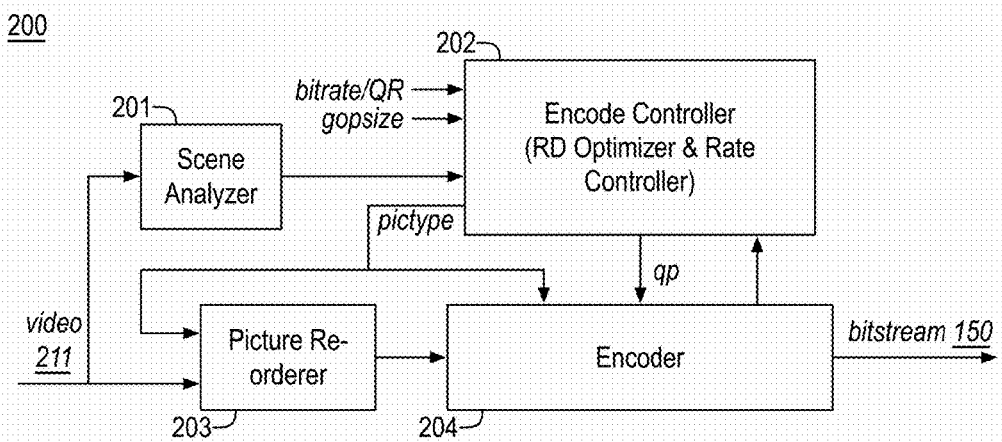
FIG. 2A illustrates a block diagram of an example encoding system.

FIG. 2A illustrates a block diagram of an example video encoder 200, arranged in accordance with at least some implementations of the present disclosure. For example, video encoder 200 may be implemented as an HEVC encoding system, an AVC encoding system, or any other standards based encoding system. As shown, video encoder 200 includes an encoder 204 (e.g., an HEVC encoder, AVC encoder, or the like), picture reorderer 203, a scene analyzer 201, and an encode controller 202 (that includes a rate distortion, RD, optimizer and a rate controller). Scene analyzer 201 determines scene changes, estimates complexity of the scene, and determines on a scene and/or a picture basis, statistical parameters to be used by encode controller 202. Encode controller 202 receives bitrate/representative quantizer (Qr), group-of-pictures size (gopsize), bits produced for a frame and/or buffer fullness, information about scene changes (from scene change analyzer 201), and other statistical parameters as discussed herein and encode controller 202 determines which picture type to assign to each picture or frame in video 211. The picture type data is provided to reorderer 203, which reorders input pictures of video 211 based on the picture type and the group-of-pictures information. As the reordered input is generated for encoding, encode controller 202 outputs selected quantizers, Qp, for encoding the frames. Encoder 204 generates a bitstream such as a standards (e.g., HEVC, AVC, etc.) compliant bitstream that is buffered for storage or transmission or the like. Furthermore, for each coded picture, a bit-count is generated and the status of the buffer is provided to encode controller 202.

Discussion now turns to an overview of psychovisual based encoding techniques discussed in further detail herein. In some embodiments, psychovisual considerations based encoding attempts to optimize video coding for human viewers. The approaches may be based on identifying regions of human interest or using modeling parameters derived from the human visual system (HVS) to distribute coding artifacts in a manner that is less objectionable to human viewers. For example, such approaches may include high-level semantic models of objects, faces, etc., HVS models that take into account local motion, eye fixation, etc., HVS perceptual models such as luminance sensitivity, contrast masking, contrast frequency sensitivity, contrast frequency masking, motion masking, etc.

For example, region of interest (ROI) based coding may include determining, in video frames, a region-of-interest to human viewers and assigning to ROI and non-ROI regions weights that can be used to determine quantization parameters for the regions. When the weight assigned to a region is high, the quantization parameter is lower (e.g., in the context of overall available bitrate) than normal and vice-versa to retain higher quality in the ROI region. Human visual system based perceptual coding may be based on luminance sensitivity, contrast masking, contrast frequency sensitivity, contrast frequency masking, and motion masking. For example, weights may be assigned to blocks within video frames based on visibility thresholds computed from HVS modeling and the weights may be converted to Qp.

Figure 2B:
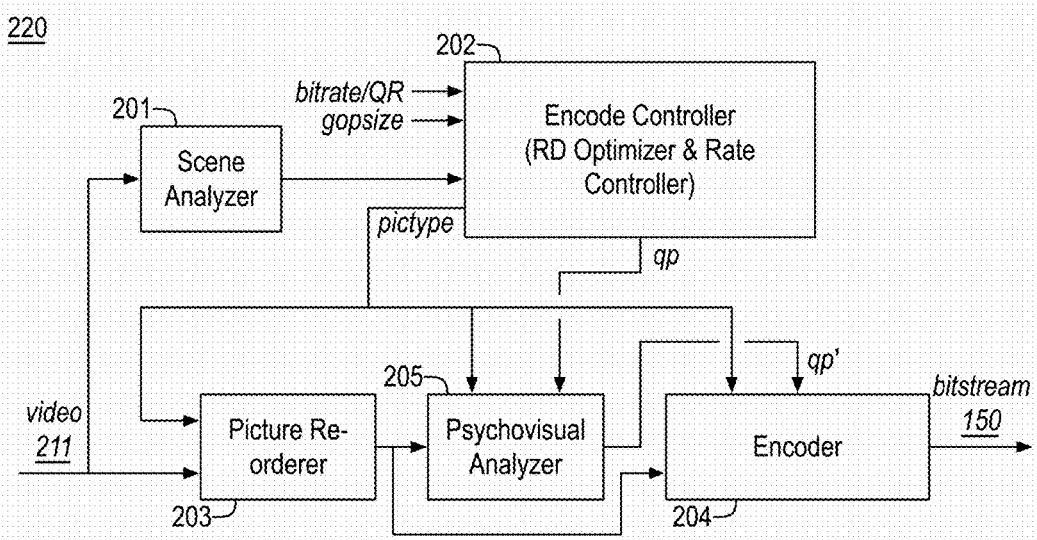
FIG. 2B illustrates a block diagram of an example encoding system.

FIG. 2B illustrates a block diagram of an example video encoder 220, arranged in accordance with at least some implementations of the present disclosure. For example, video encoder 200 may be implemented as an HEVC encoding system, an AVC encoding system, or any other standards based encoding system. As shown, video encoder 200 includes encoder 204 (e.g., an HEVC encoder, AVC encoder, or the like), picture reorderer 203, scene analyzer 201, encode controller 202 (that includes a rate distortion, RD, optimizer and a rate controller), and a psychovisual analyzer 205. It is noted that the same elements of video encoder 220 as indicated by the same reference numerals as discussed elsewhere herein with respect to FIG. 2A may perform the same or similar operations and such discussion is not repeated for the sake of brevity.

As shown, video encoder 220 includes psychovisual analyzer 205, which interacts with the other components (such as the encode controller 202 encoder 204) of video encoder 220. Psychovisual analyzer 205 determines psychovisual parameters for use in encode by encoder 204 such as luminance sensitivity, contrast masking, contrast frequency sensitivity, contrast frequency masking, and motion masking. As shown, psychovisual analyzer 205 receives quantizer Qp (or a reference quantizer, Qr) from encode controller 202 and uses psychovisual parameters to modify Qp (or Qr) resulting in a modified quantization parameter Qp' which it then outputs to encoder 204 for use in encode operations.

The techniques and systems discussed herein offer significant advantages. For example the systems and techniques discussed herein are flexible and operate with any suitable coding standards such as HEVC and AVC; are applicable to normal delay video coding and low delay video coding; produce improved visual quality at the same bitrate; are adaptive to content, coding bit-rate, and properties of human visual system; adapt coding to properties of the human visual system for optimal results for human viewers; exploit short term correlation and long term persistence of objects in video; operate in conjunction with human-regions detected by face and skin-tone detectors; are based on practical techniques suitable for a wide range of encoding modes/encoders; and are based on techniques can be used individually or as combinations.

For example, recent codecs such as those based on HEVC and AVC are more efficient in reduction of residue (prediction difference) as compared to codecs based on earlier standards such as MPEG-2. Thus, for codecs based on newer standards the contribution of quantization (of coefficients) to quality of coded video is lower. However, for recent codecs such as HEVC and AVC standards, lambda (e.g., rate distortion optimization Lagrange multiplier) plays a significant role in encoder decisions and thus has a notable impact on quality of video. The techniques discussed herein may include quantization techniques to provide psycho-visual sensitivity adaptive, bit-rate/distortion tradeoffs adaptive, long-term persistence adaptive, and content properties adaptive rate control. In some embodiments, the disclosed techniques may implement one or more of the following: psychovisual sensitivity & HROI based adaptation (PSRA), persistence analysis & quality adaptation (PAQA), content based lambda factor adaptation (CLFA), and content based quantization adaptation (CQA). In PSRA, various pyschovisual sensitivity and HROI based techniques are merged and automatically balanced for correct bit-rate operating point. The merged pyschovisual coding techniques are used to modulate lambda per block. PAQA uses properties of persistence for improved motion compensated inter frame coding efficiency and properties of motion masking for improved psychovisual coding. CLFA analyzes content to set the GOP and pyramid frame lambdas for each frame type for improved coding efficiency. CQA uses GOP size, pyramid level, and block complexity based models to determine the most efficient Qp to use for the psychovisually modulated lambda. The content adaptive psychovisual based lambda-Qp pair is then used for coding a block.

The discussed techniques and systems provide high efficiency, pyschovisual and region-of-interest based adaptations combined with content adaptive lambda and content adaptive quantization to drive encoding (e.g., HEVC or AVC) resulting in a system that is highly efficient in compression while minimizing visible coding distortion thus achieving optimum bits/quality tradeoffs. As used herein, the term rate distortion optimization Lagrange multiplier and lambda (λ) are used interchangeably and are not to be confused with the adaptive lambda factor (L), which is discussed further herein and may be used to determine a rate distortion optimization Lagrange multiplier.

Figures 3A, 3B:
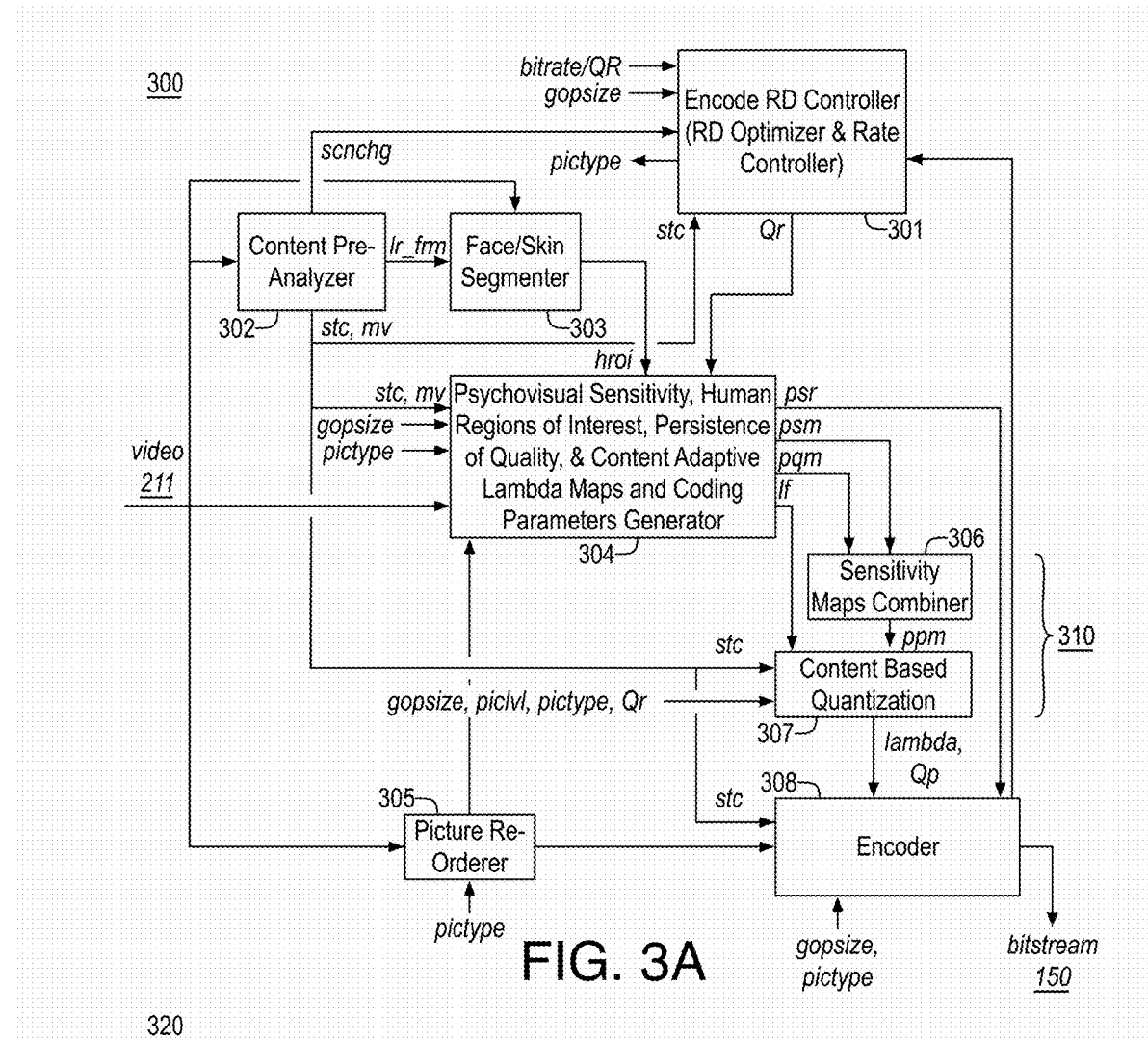
FIG. 3A illustrates a block diagram of an example encoding system.
FIG. 3B illustrates example results of directing quality at human region-of-interest in video pictures.

FIG. 3A illustrates a block diagram of an example video encoder 300, arranged in accordance with at least some implementations of the present disclosure. As shown, video encoder 300 includes an encode rate distortion (RD) controller (ERDC) 301 (including a RD optimizer and a rate controller), a content pre-analyzer (CPA) 302, a face and/or skin (HROI) segmenter 303, a psychovisual sensitivity, human region of interest, persistence of quality and content adaptive lambda (PSHRPQCL) maps and coding parameters generator 304, a sensitivity maps combiner 306, a content based quantization adapter (CQA) module 307, a picture reorderer (PR) 305, and an encoder 308 (e.g., an HEVC encoder, AVC encoder, or the like).

As shown, video frames or pictures of video 211 are input to content pre-analyzer 302, which determines spatial and temporal complexity (stc), a scene change flag (scnchg), motion vectors (mv), and a downsampled frame at lower resolution (lr_frm) for each frame or picture of video 211. The spatial and temporal complexity (stc) is input to four processing blocks: psychovisual sensitivity, human region of-interest, persistence of quality and content adaptive lambda maps and coding parameters generator 304, content based quantization adapter module 307, encode rate distortion controller 301, and encoder 308. Content pre-analyzer (CPA) 302 also provides scene change flags (scnchg) to encode rate distortion controller 301, down sampled low resolution frames to face and/or skin segmenter 303, and motion vectors, mv, to PSHRPQCL maps and coding parameters generator 304.

Group of pictures size (gopsz) is a parameter (e.g., a user defined parameter in some contexts) that may be input to three processing blocks: encode rate distortion controller 301, PSHRPQCL maps and coding parameters generator 304, and encoder 308.

As shown, encode rate distortion controller 301 generates a picture type (pictyp) signal that may be provided to picture reorderer 305 and encoder 308. The functions or operations of encode rate distortion controller 301 may include the following responsibilities. First, it may provide proper rate-distortion tradeoffs. Second, it may provide effective bit rate control. Picture reorder 305 reorders pictures into an encode order. The reordered pictures at the output of picture reorderer 305 are input to PSHRPQCL maps and coding parameters generator 304 and encoder 308.

PSHRPQCL maps and coding parameters generator 304 generates and/or determines psychovisual sensitivity regions (psr), a psychovisual sensitivity map (psm), a persistent quality map (pqm), and lambda factors (lf or L), which are discussed further herein.

As shown, sensitivity maps combiner 306 and content based quantization adapter module 307 may provide a content based quantization adapter (CQA) 310, which takes as input spatio-temporal complexity (stc), picture type (pictyp), gop size (gopsz), lambda factor (lf), psychovisual sensitivity map (psm), persistent quality map (pqm). Content based quantization adapter 310 combines the psm and pqm maps to generate a combined psychovisual and persistence map (ppm). Such combining of the two sensitivity maps may be provided as a sum such that if psm is formally represented by $S_{psm}$ and is pqm is formally represented by $S_{pqm}$ then the combined sensitivity ppm would be represented by $S_{ppm}$ which is a sum of $S_{psm}$ and $S_{pqm}$.

Content based quantization adapter 310 may also include a lambda calculator, a spatial complexity index calculator, and a Qp calculator. The lambda calculator takes as input lambda factors for each picture type (formally $L_i$ for I-picture, $L_0$ for P (or GBP)-picture, and $L_n$ for B-picture where n indicates its level in a group-of-picture), representative quantizer (Qr) and sensitivity mask $S_{ppm}$ (e.g., under control of pictyp, piclvl, gopsz) and determines a lambda value (e.g., an adaptive rate distortion optimization Lagrange multiplier) for every coding block (e.g., on a block by block basis). The lambda is used (e.g., under control of pictyp, piclvl, gopsz) to determine the quantizer Qp value per coding block (e.g., on a block by block basis). Together lambda and Qp are used for performing quantization by encoder 308 (e.g., as per HEVC or AVC or the like). As used herein the terms on a block level or on a block by block basis indicate the parameter, value or the like is determined for each block (e.g., LCU, CU, or the like) of a picture. In contrast, a slice or picture level may provide a parameter that is held constant for each block within a slice or picture.

Encoder 308 receives gopsz, pictyp, stc, lambda, Qp, and reordered input pictures and performs adaptive encoding (e.g., HEVC, AVC, etc.) and outputs encoded a bitstream 150 such as a standards compliant bitstream. For example, bitstream 150 may be an HEVC or AVC compliant bitstream. For example, encode rate distortion controller 301 may determine coding parameters (e.g., intra or inter, intra modes, MVs, splitting decisions, etc.) for the block (e.g., an LCU or CU or the like) based at least in part on a rate distortion optimization using adaptive rate distortion optimization Lagrange multipliers determined as discussed herein and the block level quantization parameter also determined as discussed herein. Encoder 308 may then encode blocks of a current picture using the coding parameters and the block level quantization parameter into bitstream 150 (e.g., a standards compliant bitstream).

FIG. 3B illustrates example results of directing quality at human region-of-interest in video pictures, arranged in accordance with at least some implementations of the present disclosure. For example, using techniques discussed herein, available bitrate may be provided to those areas of interest of a frame or picture that most benefit picture when it is ultimately decoded. For example, picture 320 is a picture to be encoded using the techniques discussed herein (e.g., to be coded into an HEVC or AVC compliant bitstream). As will be appreciated, for video scenes that contain human faces and skin-tones, it is important for human viewers that, after encoding/decoding, these regions preserve as high of a quality as possible. By first segmenting regions of likely interest such as face and skin of people (e.g., highlighted regions), adaptive coding can classify these regions to be psychovisually important before encoding thus achieving high visual quality in these regions while trading off quality with less important (e.g., background) regions. Other factors used to provide available bitrate may be provided to those areas of interest of a frame or picture include visually sensitivity, persistence sensitivity, and the like as discussed herein.

Before discussing system details, the overall nomenclature of the various terms employed to describe the operations of this invention are provided below.

NOMENCLATURE OF VARIOUS DATA AND SIGNALS USED HEREIN

CLFA—Content based Lambda Factor Adapter
CPA—Content Pre-Analyzer

Figure 4:
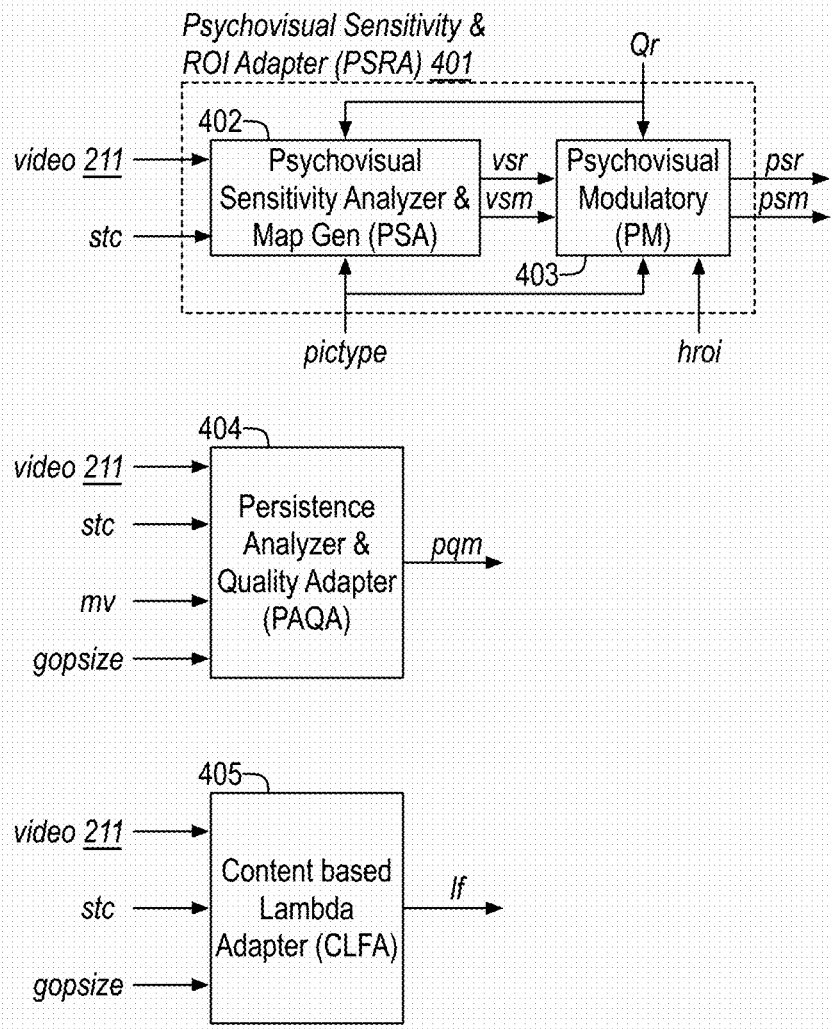
FIG. 4 illustrates a detailed block diagram of an example psychovisual sensitivity, human region of interest, persistence of quality and content adaptive lambda maps and coding parameters generator.

CQA—Content based Quantization Adapter
CQp—Constant Quantizer Parameter
CSM—Contrast Sensitivity Map
CU—Coding Unit
ERDC—Encode RD Controller
FP—Future Persistence
GOP—Group of Pictures
HME—Hierarchical Motion Estimator
HROI—Human Regions of Interest
HVS—Human Visual System
LCU—Largest Coding Unit
LSM—Luminance Sensitivity Map
LSC—Luminance Sensitivity Calculator
M—Masking, a ratio of normal and new threshold
MCM—Motion Complexity Map
P—Persistence
PAQA—Persistent Analyzer & Quality Adapter
PP—Past Persistence
PC—Persistence Continuity
PSA—Psychovisual Sensitivity Analyzer and Map generator
PSRA—Psychovisual Sensitivity & ROI Adapter
PM—Psychovisual Modulator
PPM—Psychovisual & Persistence Map
SAD—Sum of Absolute Difference
SATD—Sum of Absolute Transformed Difference
S—Sensitivity parameter (−ve means high sensitivity, +ve means low sensitivity)
SC—Spatial Complexity
SCM—Spatial Complexity Map
SMC—Sensitivity Map Combiner
STCE—Spatio-Temporal Complexity Estimator
STM—Spatio-temporal Complexity Map
$C_s$—a measure of horizontal texture, ie, horizontal (or columns) gradient
gop—group of pictures
gopsz—Length of group of picture
lambda—lagrangian multiplier
LCUsz—size of LCU
mv—motion vector
$NH_{roi}$—number of Partial and Full HROI LCUs
pictyp—picture type
piclvl—level of picture in picture hierarchy in gop
psm—Psychovisual Sensitivity Map
psr—Psychovisual Sensitivity Region
Qp—quantizer parameter
Qr—representative quantizer
$R_s$—a measure of vertical texture, ie, vertical (or row) gradient
$R_s C_s$—a combined spatial measure of $R_s C_s$ based texture for the luma frame
SADpp—SAD per pixel
stc—spatio-temporal complexity measures (Rs, Cs, RsCs, SADpp, satd, STM)
$TN_{roi}$—a threshold number of partial or full LCUs
vsm—visual sensitivity map
vsr—visual sensitivity region FIG. 4 illustrates a detailed block diagram of an example psychovisual sensitivity, human region of interest, persistence of quality and content adaptive lambda maps and coding parameters generator 304, arranged in accordance with at least some implementations of the present disclosure. For example psychovisual sensitivity, human region of interest, persistence of quality and content adaptive lambda maps and coding parameters generator 304 may be implemented in the context of video encoder 300. For example, an adaptive encoding/quantization system may include (please refer to FIG. 3A) encode rate distortion (RD) controller (ERDC) 301 (including a RD optimizer and a rate controller), content pre-analyzer (CPA) 302, face and/or skin (HROI) segmenter 303, psychovisual sensitivity, human region of interest, persistence of quality and content adaptive lambda (PSHRPQCL) maps and coding parameters generator 304, sensitivity maps combiner (SMC) 306, content based quantization adapter (CQA) module 307, picture reorderer (PR) 305, and encoder 308. Also, as shown in FIG. 4, the adaptive encoding/quantization system may include (e.g., as implemented by PSHRPQCL maps and coding parameters generator 304) a pyschovisual sensitivity analyzer and map generator (PSA) 402, a pyschovisual modulator (PM) 403, a persistence analyzer and quality adapter (PAQA) 404, and a content based lambda factor adapter (CLFA) 405. For example, pyschovisual sensitivity analyzer and map generator 402 and pyschovisual modulator 403 may be collectively referred to as a psychovisual sensitivity & ROI adapter (PSRA) 401.

Discussion is first directed to supporting blocks including content pre-analyzer 302, picture reorderer 305, face and/or skin segmenter 303, and encode rate distortion controller 301. With reference to FIG. 3, content pre-analyzer 302 performs analysis and preprocessing of content, including calculation of spatio-temporal complexity, downsampling, and buffering of frames. Picture reorderer 305 reorders pictures based on assigned picture type within a group of pictures. Encode rate distortion controller 301 performs rate distortion tradeoffs to maintain high coding efficiency and bit-rate control. Face and/or skin segmenter 303 provides a face and skin segmentation mask (HROI) at, for example, a smaller block (sub-LCU) accuracy.

Returning to FIG. 4, as shown, psychovisual sensitivity & ROI adapter 401 includes pyschovisual sensitivity analyzer and map generator 402 and pyschovisual modulator 403. The inputs to psychovisual sensitivity & ROI adapter 401 include input frames or pictures (e.g., video 211), picture type (pictyp), representative or reference quantizer (Qr), spatio-temporal complexity (stc), and segmented hroi (face/skin region) map (hroi). For example, hroi may be characterized as a a human region of interest regions map. For example, pyschovisual sensitivity analyzer and map generator 402 may use HVS models of contrast masking, luminance sensitivity, and black level compression to determine the level of visibility or sensitivity of quantization/coding noise in video 211. As shown, pyschovisual sensitivity analyzer and map generator 402 generates a visual sensitivity region (vsr) (e.g., a visibility sensitivity regions map) and an associated visual sensitivity map (vsm) at, for example, block accuracy. In some embodiments, the vsm map represents, on a block basis, visual sensitivity based on visibility of errors.

Pyschovisual modulator 403 uses various psychovisual coding inputs, coding complexity and codec operating information to produce a psychovisual sensitivity region (psr) (e.g., a psychovisual regions of interest block map) and associated psychovisual sensitivity map (psm). For example, content pre-analyzer 302 may determine a coding complexity metric based on a Hadamard transform L1 norm of intra and inter prediction difference (satd). The coding complexity metric is used to estimate the bit-rate. The bitrate savings from using the vsm on the non-psr area (e.g., regions that are not psychovisually sensitive as provided by the psychovisual regions of interest block map) may then be estimated.

Next, the psr is created by adding visually sensitive important areas conditionally to segmented hroi regions. For example, the psychovisual regions of interest block map may include regions from the hroi map and, if the number of regions from the hroi map does not meet or exceed a threshold, regions from the visibility sensitivity regions map (e.g., by adding the most sensitive regions therefrom).

The sensitivities of the psychovisual sensitivity map for the psr area of the psychovisual regions of interest block map (e.g., those regions that are psychovisually sensitive as provided by the psychovisual regions of interest block map) are modulated using the bits saved from the non-ppsr are of the vsm until all bits saved from non-psr area are consumed. For example, such sensitivity modulation may be performed such that the bitrate may be balanced to an original estimate based on a representative Qp (e.g., Qr) as provided by user or by bit-rate controller to achieve the same codec operating point and to prevent any unnecessary bit-rate control reaction.

Different scans using properties of causality and center of attention may be used for balancing the overall bitrate of a frame (e.g., for modulating the sensitivities as discussed) so as to provide the highest psychovisual benefit to compression efficiency. Such processing provides a bitrate balanced psr and non-psr based psychovisual sensitivity map (psm) (e.g., a final or modulated psychovisual sensitivity map) for the entire frame or picture (e.g., the current frame of video 211). To maintain efficiency in video coding, lambda-quantizer changes per frame may adhere to reference quality propagation, pyramidal coding rules, and quantization noise re-encoding prevention. Thus pyramid constraints (e.g., HEVC pyramid constraints) and checks are used to ensure that the final psychovisual sensitivity map can provide high efficiency.

Persistence analyzer and quality adapter 404 determines reference quality propagation for video 211 (e.g., the entire video) as well as psychovisual motion masking. For example, persistence analyzer and quality adapter (PAQA) 404 takes as input frames (e.g., video 211), spatio-temporal complexity (stc), gop size (gopsz), and motion vectors (my). Persistence analyzer and quality adapter 404 determines by look ahead the time of visibility of each block and provides a persistent quality map (pqm) that is based on relative persistence of each block. For example, the persistent quality map may include a value for each block indicating the persistence of the block. For example, the persistence of a block may be defined as the number of frames in which the block has co-located regions of low spatio-temporal complexity and low motion complexity. The persistent quality map may be used by sensitivity maps combiner 306 to modulate the sensitivity of non-psr regions (e.g., regions that are not psychovisually sensitive as provided by the psychovisual regions of interest block map) such that artifacts do not persist and to modulate the psr regions (e.g., regions that are psychovisually sensitive as provided by the psychovisual regions of interest block map) to improve its quality. The psychovisual sensitivity map (psm) and the persistent quality map (pqm) may be combined (e.g., by summing) to provide a combined psychovisual and persistence map (ppm). For example, combining, for a block, a psychovisual sensitivity value and a persistence sensitivy value may include summing the psychovisual value and the persistence sensitivy value. Such block wise summing may be performed for each block (e.g., LCU) of a current picture.

Content based lambda factor adapter 405 take as input spatio-temporal complexity (stc) and gop size (gopsz) and outputs lambda factors (lf or L). For example, content based lambda factor adapter 405 uses spatio-temporal complexity (stc) to classify a gop being coded into different spatio-temporal groups, each with an appropriate high efficiency lambda factor. In some embodiments, content based lambda factor adapter 405 models portions of a gop based on properties such as highly predictive, average, or continuously varying to assign suitable lambda factor for frames in the gop pyramid. The actual lambda (e.g., rate distortion optimization Lagrange multiplier) for each block of each pyramidal frame may then be determined based on the lambda factor for that frame and the representative quantizer (Qr) for the gop. The Qr is either provided based on constant quantizer parameter coding or it is determined by encode rate distortion controller 301. In some embodiments, the rate distortion optimization Lagrange multiplier (lambda) is also generated based on the sensitivity value for the block from the discussed combined psychovisual and persistence map (ppm).

Content based quantization adapter 310 determines lambda for each coding block (or block as used herein) (e.g., LCU or sub-LCU) in each frame of video 211 based on psychovisual and persistence map (ppm), lambda factor L[ ], representative quantizer Qr, picture type (pictyp), picture level in gop (piclvl), and gop size (gopsz) as is discussed further herein. Content based quantization adapter 310 then determines, for each lambda (e.g., for each picture type (pictyp), picture level in gop (piclvl), gop size (gopsz), and spatial complexity (subset of spatio-temporal complexity, stc)), a Qp for each block using a parametric model to maximize compression efficiency. The relationship between lambda and Qp may be provided by the LQ (lambda-quantizer) parametric model discussed further herein. The lambda-Qp pair is then used for coding of blocks (or coding units, CUs) by encoder 308.

In the discussion herein with respect to HEVC encoding a minimum delta Qp depth (or LCU based adaptation) has been assumed. However, the techniques discussed herein may be extended to any CU size/depth as allowed by HEVC.

Discussion now turns to the components of the described system.

Figure 5A:
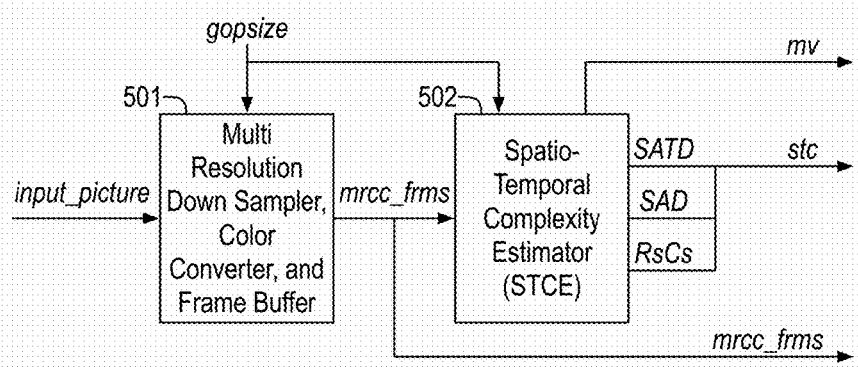
FIG. 5A illustrates an example content pre-analyzer.

FIG. 5A illustrates an example content pre-analyzer 302, arranged in accordance with at least some implementations of the present disclosure. As shown, content pre-analyzer 302 may include a multi resolution down sampler, color converter, and frames buffer (MRCC) 501 and a spatio-temporal complexity estimator (STCE) 502. For example, content pre-analyzer 302 may provide multiple resolutions of an input picture (e.g., of video 211) as frames, a low resolution color converted frame, and spatio-temporal complexity metrics. Furthermore, content pre-analyzer 302 may use gopsz parameter to configure a look_ahead_delay and for motion estimation reference frame determination. In some embodiments, content pre-analyzer 302 provides block metrics such as sum of absolute difference (SAD) of the motion compensated (MC) frames, sum of absolute transform difference (SATD) of Intra predicted and MC frames, and row and column difference based spatial complexity metrics (RsCs). Furthermore, content pre-analyzer 302 also provides frame based averages of each metric and GOP averages of each metric. For example, such metrics may be provided at a block level, a picture level, or a group of pictures level.

Multi resolution down sampler, color converter, and frames buffer 501 pads, converts, and stores input pictures for further processing. In an embodiment, the input picture is padded on all sides with pixel repeat to generate a padded frames for efficient motion estimation. The padding dimension is usually LCU size in HEVC video coding. Furthermore, multi resolution down sampler, color converter, and frames buffer 501 generates $1/16^{th}$ Resolution frames by subsampling the input by 4 in the horizontal and vertical directions. The low resolution frames are used by a hierarchical motion estimator in spatio-temporal complexity estimator 502. Multi resolution down sampler, color converter, and frames buffer 501 also generates $\frac{1}{64}^{th}$ resolution YUV4:4:4 frames used for psychovisual analysis. For a YUV 4:2:0 input_picture, the $\frac{1}{64}^{th}$ resolution frames may be generated by 8×8 block averaging of luma to create a luminance plane and 4×4 averaging of chroma to produce the two chrominance planes, all of equal sampling distance. For other input formats the chroma may be averaged by appropriate sizes to generate a $\frac{1}{64}^{th}$ resolution equal sampling YUV4:4:4 frame. All the delayed full resolution frames (fr_frame), reduced resolution frames (lr_frame), and color converted frames (cc_frame) are available for further processing and are characterized as multi resolution and color converted frames (mrcc_frms). The look_ahead_delay is based the gopsz input, such that previous frame, past GOP P reference frame, and future GOP P reference frame, are available for further processing. For example, look_ahead_delay may be directly determined from gopsz as shown in Equation (2):

$$n = \text{look\_ahead\_delay} = 2 * \text{gopsz} + 1 \tag{1}$$

where n is the look ahead delay and gopsz is gop size.

Figure 5B:
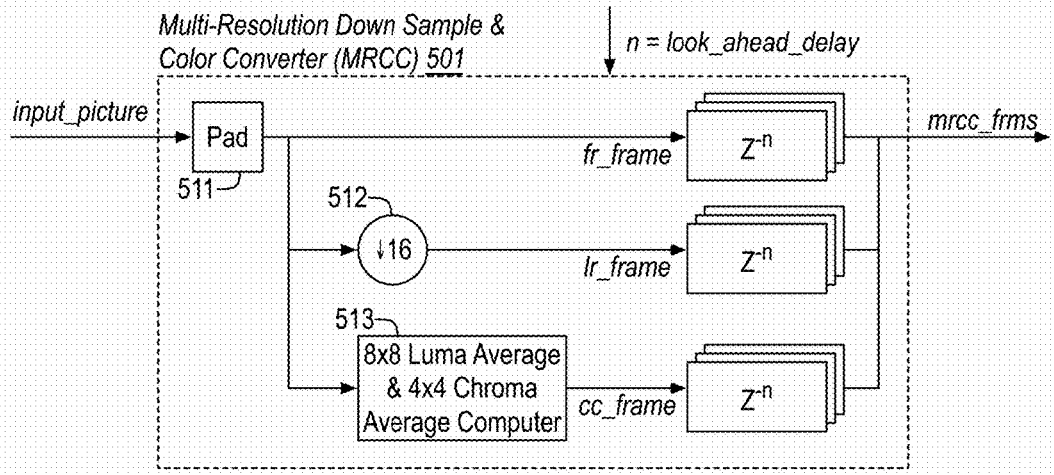
FIG. 5B illustrates an example multi resolution down sampler, color converter, and frames buffer.

FIG. 5B illustrates an example multi resolution down sampler, color converter, and frames buffer 501, arranged in accordance with at least some implementations of the present disclosure. As shown, multi resolution down sampler, color converter, and frames buffer 502 includes a padding module 511, a down sampler 512, and a luma and chroma average computer 513. For example, an input picture (input_picture) of video 211 may be padded by padding module 511 to provide full resolution frames (fr_frame). Furthermore, the padded frames may be down sampled by down sampler 512 to generate reduced resolution frames (lr_frame) and averaged (e.g., using 8×8 blocks in luma and 4×4 blocks in chroma) to generate color converted frames (cc_frame). Such frames (mrcc_frms) may be available for further processing as discussed herein.

Figure 5C:
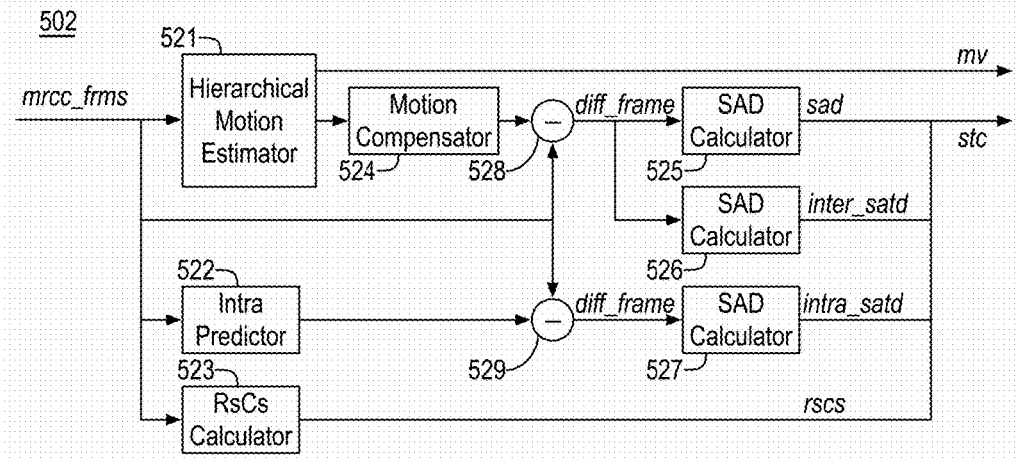
FIG. 5C illustrates an example spatio-temporal complexity estimator.

FIG. 5C illustrates an example spatio-temporal complexity estimator 502, arranged in accordance with at least some implementations of the present disclosure. As shown, spatio-temporal complexity estimator 502 includes a hierarchical motion estimator 521, a motion compensator 524, intra predictor 522, spatial complexity (RsCs) calculator 523, differencers 528, 529, and SAD calculators 525, 526, 527. For example, spatio-temporal complexity estimator 502 determines spatial complexity, motion compensated difference metrics, and intra prediction difference metrics. In some embodiments, the references used for motion estimation (ME) by hierarchical motion estimator 521 are previous frame, past GOP P reference frame, and future GOP P reference frame.

In an embodiment, spatial complexity calculator 523 determines a spatial complexity as the metric RsCs, which may be any suitable spatial complexity metric such as the square root of average row difference squares and average column difference squares over a given block of pixels. For example, spatial complexity calculator 523 may determine spatial complexity on a block level as shown in Equations (3)-(5):

$$Rs = \sqrt{\frac{\sum_{i=0}^{4}\sum_{j=0}^{4}(P[i][j] - P[i-1][j])^2}{16}} \tag{3}$$

such that Rs is the square root of average previous row pixel difference squares for a 4×4 block (which may be extended to any size block), i and j are counter variables, P is a pixel value;

$$Cs = \sqrt{\frac{\sum_{i=0}^{4}\sum_{j=0}^{4}(P[i][j] - P[i][j-1])^2}{16}} \tag{4}$$

such that Cs is the square root of average previous column pixel difference squares for a 4×4 block (which may be extended to any size block);

$$RsCs = \sqrt{Rs^2 + Cs^2} \tag{5}$$

such that RsCs is a measure of spatial complexity for a 4×4 block (which may be extended to any size block).

For example, the spatial complexity for any block size of N×N may be determined as shown in Equations (6) and (7):

$$RsCs_N = \frac{\sqrt{\left(\sum_{k=0}^{N/4}\sum_{l=0}^{N/4} Rs^2[k][l]\right) + \left(\sum_{k=0}^{N/4}\sum_{l=0}^{N/4} Cs^2[k][l]\right)}}{\left(\frac{N}{4}\right)^2} \tag{6}$$

$$RsCs_N^2 = \frac{\left(\sum_{k=0}^{N/4}\sum_{l=0}^{N/4} Rs[k][l]\right)^2 + \left(\sum_{k=0}^{N/4}\sum_{l=0}^{N/4} Cs[k][l]\right)^2}{\left(\frac{N}{4}\right)^2} \tag{7}$$

where k and l are counter variables, N is the length and width of the block, and Rs and Cs are provided above. Any of RsCs, Rs, Cs, or $RsCs^2$ may be used as a spatial complexity for a block.

Temporal complexity may be based on a measure of motion compensated SAD-per-pixel (SADpp). For example, motion estimation and compensation may be performed by hierarchical motion estimator 521 and motion compensator 524, respectively, and the original block and the motion compensated block may be differenced by differencer 528. The SAD of an N×N block, SADpp, may then be determined by SAD calculator 525 as follows in Equations (8) and (9):

$$SAD = \sum_{i=0}^{N}\sum_{j=0}^{N} |S(i, j) - P(i, j)| \tag{8}$$

$$SADpp_N = \frac{SAD}{N^2} \tag{9}$$

where i and j are counter variables, N is the length and width of the block, S are the source (e.g., original) pixel values, P are the prediction (e.g., motion compensated) pixel values, SAD is the sum of absolute differences on a block level, and SADpp is the SAD on a per pixel basis for a block.

For example, SADpp may provide a block level residual error measure for a block or region. However, SADpp may not describe the complexity/predictability of video. Spatio-temporal complexity is a classification of the temporal complexity of a region dependent on its spatial complexity. This classification map is called stm and is discussed further herein.

Furthermore, coding complexity may be determined on a block level by SAD calculators 526, 527. In some embodiments, coding complexity is based on the sum of absolute transformed differences, characterized as a SATD metric. For example, the prediction difference signals are the motion compensated prediction difference and the intra compensated prediction difference signals (e.g., from differencers 528, 529). For intra, any suitable intra modes may be used such as DC and angular prediction as defined in HEVC specification by intra predictor 522. For example, the coding complexity metric may be determined as SATD by SAD calculators 526, 527 as shown in Equations (10) and (11):

$$H = T_H(S - P)T_H^T \quad (10)$$

$$SATD = \sum_i^N \sum_j^N |H(i,j)| \quad (11)$$

where i and j are counter variables, N is the length and width of the block, $T_H$ is the Hadamard transform matrix, S are source pixels, and P are prediction pixels. In some examples, 8×8 SATD is used. SATD for other block sizes may be the accumulated 8×8 SATDs within that block. Such metrics may be used in encode processing as discussed herein.

Discussion now turns to automatic HROI mask generation.

Figure 6A:
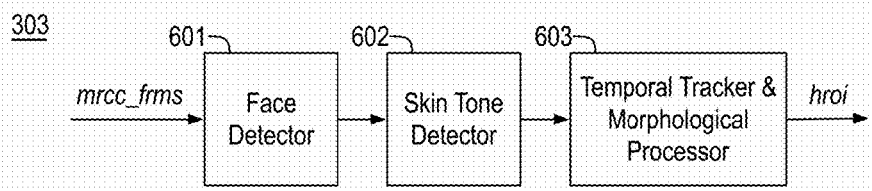
FIG. 6A illustrates an example face and/or skin (HROI) segmenter.

FIG. 6A illustrates an example face and/or skin (HROI) segmenter 303, arranged in accordance with at least some implementations of the present disclosure. As shown, face and/or skin (HROI) segmenter 303 includes a face detector 601, a skin tone detector 602, and a temporal tracker and morphological processor 603. Such face and or skin detection, segmentation and tracking may be performed using any suitable technique or techniques. In some embodiments, the HROI mask (hroi) is at a finer block accuracy than the LCU map and LCU map values are filled based on thresholds of ROI size within an LCU.

Figure 6B:
FIG. 6B illustrates example HROI segmentation.

FIG. 6B illustrates example HROI segmentation, arranged in accordance with at least some implementations of the present disclosure. As shown, a picture or frame 610 may be analyzed to determine HROI regions 611, 612 corresponding to the hand and face of a person in frame 610.

Discussion now turns to psychovisual analysis and modulation (PSRA).

Figure 7A:
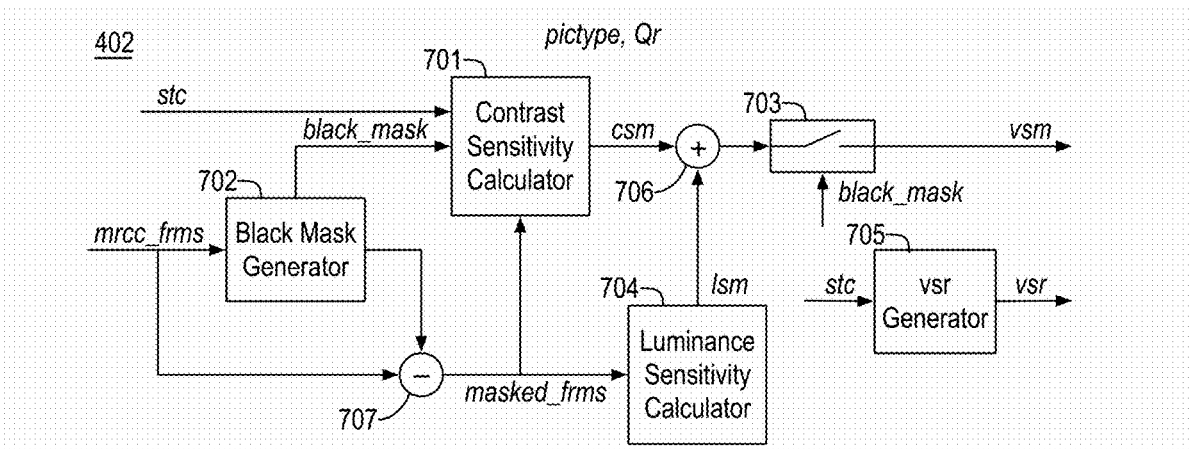
FIG. 7A illustrates an example pyschovisual sensitivity analyzer and map generator (PSA)

FIG. 7A illustrates an example pyschovisual sensitivity analyzer and map generator (PSA) 402, arranged in accordance with at least some implementations of the present disclosure. As shown, pyschovisual sensitivity analyzer and map generator 402 includes a contrast sensitivity calculator 701, a black mask generator 702, a switch 703, a luminance sensitivity calculator 704, a visual sensitivity region (vsr) generator 705, an adder 706, and a differencer 707. For example, pyschovisual analysis may include HVS based visual sensitivity analysis and map generation.

For example, a visibility threshold (T) may be empirically derived for the human visual system such that T represents a minimum threshold value which results in equal perception of change or error for different content/conditions. A relative masking of error (M) may be determined as the ratio of local T compared to a base or average threshold (To) as shown in Equation (12):

$$M=T/To \quad (12)$$

where M is the masking of error, T is a visibility threshold, and To is a base or average threshold. For example, for relative masking of error, M, lower M values may provide for lower masking (e.g., high visibility) and higher M values may provide for higher masking (e.g., low visibility). As shown, To is the base or average threshold and T is the local threshold.

Techniques discussed herein may use relative masking of errors, M, to control a lambda-Qp pair for perceptual coding. In some embodiments, the masking may be expressed in the same domain as video coding standards (e.g., HEVC) Qp for fast computation. For example, a sensitivity parameter (S) may be defined as a measure of relative masking of error in the Qp domain such that negative S means lower masking and positive S means higher masking than average. For example, the sensitivity parameter (S) may be defined as shown in Equation (13):

$$S=\log_2(M)*6.0 \quad (12)$$

where M is the masking of error, S is the sensitivity parameter, and 6.0 is an example conversion factor, which may be any suitable value.

In some embodiments, the sensitivity parameter may be provided relative to HEVC coding. Table 1 provides example sensitivity parameter ranges corresponding to example HEVC representative or reference quantizers (Qr).

TABLE 1

HEVC Qr & Frame Type Based Sensitivity Parameter Ranges

| HEVC Qr | Sensitivity Parameter Range ($S_r$) | | | | |
|---|---|---|---|---|---|
| | I | P | B1 | B2 | B3 |
| <16 | ±1 | ±2 | ±1 | ±1 | ±1 |
| 16-22 | ±2 | ±3 | ±2 | ±1 | ±1 |
| 23-27 | ±2 | ±4 | ±3 | ±2 | ±1 |
| 28-33 | ±3 | ±5 | ±4 | ±3 | ±2 |
| 34-39 | ±3 | ±6 | ±5 | ±4 | ±3 |
| 40-43 | ±2 | ±4 | ±3 | ±2 | ±1 |
| >43 | ±1 | ±2 | ±1 | ±1 | ±1 |

Furthermore, luminance for blocks (e.g., LCUs or the like) may be determined by luminance sensitivity calculator 704 and/or black mask generator 702. For example, luminance (L) of a block (e.g., LCU) may be the average of luma pixels of that block (e.g., LCU), which may be determined as shown in Equation (13):

$$L[LCUidx] = \sum_{i=LCU_y}^{LCU_y+-1} \sum_{j=LCU_x}^{LCU_x+LCU_w-1} Y[i][j] \quad (13)$$

where Y is the luma plane of the picture or video frame, LCUidx is the index of the given LCU and (LCUx, LCUy) is the top left pixel position of LCUidx, and (LCUw,LCUh) are the LCU dimensions. In some embodiments, LCU may be square such that LCUh=LCUw.

As shown, pyschovisual sensitivity analyzer and map generator 402 includes black mask generator 702, which may generate a black level mask or black mask (black_mask) based on mrcc_frames (please refer to FIGS. 5A and 5B). For example, a black level mask for the current picture may be generated such that the black level mask indicates, on a block by block basis, whether blocks of the current picture have an average luminance less than a threshold (as discussed below). For example, sensitivity may be very non-linear at low luminance since different human vision components are activated for low light perception. Low luminance perception has poor frequency sensitivity, can have high sensitivity based on ambient conditions, but it saturates easily. As shown, a black mask (B) is generated for the current frame. The black mask may be used to remove all masked blocks (e.g., LCUs) from luminance sensitivity and contrast sensitivity maps as discussed herein. For example, the sensitivity parameter (S) within a visual sensitivity map (vsm) for masked blocks may be set to 0 by switch 703 under the control of black_mask. The black mask may be determined using any suitable technique or techniques. In an embodiment, the black mask is determined based on a comparison of the block based luminance to a threshold as shown in Equation (14):

$$B[LCUidx] = \begin{cases} 0 \mid L[LCUidx] \geq 32 \\ 1 \mid L[LCUidx] < 32 \end{cases} \quad (14)$$

where B is the black mask and 32 is the black mask threshold, which may be any suitable value.

Pyschovisual sensitivity analyzer and map generator 402 may create LCU granularity maps. Since video size may not be a multiple of LCU size, incomplete border blocks may be added to the black mask to remove them from analysis.

Furthermore, the number of blocks not masked may be determined by pyschovisual sensitivity analyzer and map generator 402 for use in later processing as discussed herein. For example, the number of blocks not masked is provided as NumActLCU, which may be provided as shown in Equations (15) and (16):

$$B[LCUidx] = \begin{cases} 0 \mid (LCU_x + LCUw \leq W) \& (LCU_y + LCUh \leq H) \\ 1 \mid (LCU_x + LCUw > W) \mid (LCU_y + LCUh > H) \end{cases} \quad (15)$$

$$NumActLCU = \sum_{i=0}^{NumLCU-1} B[i] \quad (16)$$

where W and H are the picture or video frame width and height and NumActLCU is the number of blocks not masked.

Furthermore, a luminance sensitivity measure ($S_l$) and corresponding luminance sensitivity map (lsm) may be determined by luminance sensitivity calculator 704 based on local luminance, average luminance and the range of sensitivity measure ($S_r$). For example, the luminance sensitivity measure ($S_l$) may be provided as shown in Equations (17) and (18):

$$S_l = 0.3 \log_2\left(\frac{L}{\overline{L}}\right) \cdot S_r \quad (17)$$

$$\overline{L} = \frac{1}{NumActLCU} \sum L \mid B \text{ is } 0 \quad (18)$$

where L is the block or LCU level luminance, $\overline{L}$ is the average luminance for blocks or LCUs that are not masked, $S_l$ is luminance sensitivity measure, $S_r$ is the range of sensitivity measure, and 0.3 is a conversion parameter that may be any suitable value. Luminance sensitivity map (lsm) may then include block level contrast sensitivity parameter values. For example, luminance sensitivity map (lsm) may include a luminance sensitivity value for each block of a current picture.

Discussion now turns to the determination of a contrast sensitivity parameter and a contrast sensitivity parameter map (csm). For example, a contrast sensitivity parameter and corresponding contrast sensitivity map (csm) may be determined by contrast sensitivity calculator 703 based on a contrast masking property of the HVS. In some embodiments, contrast is computed as a variance of the block. For example, high contrast may have the property of masking error visibility. In some embodiments, the contrast sensitivity parameter may be determined from spatial complexity measure $RsCs^2$ as discussed herein. For example, a minimum $RsCs^2$ for a quad split of the LCU (e.g., minQSC) may be considered as a representative contrast for each LCU. The contrast sensitivity parameter may then be computed from the local minQSC, the picture average of all minQSC, and the range of the sensitivity measure. In some embodiments, a contrast sensitivity parameter map (csm) may be determined as shown in Equations (19)-(22):

$$minQSC = \frac{1}{2}\min\left(RsCs^2_{\frac{LCUw}{4}}\right) \quad (19)$$

$$\overline{minQSC} = \frac{1}{NumLCU} \sum minQSC \mid B \text{ is } 0 \quad (20)$$

$$S_c = 6 \log_2\left(\frac{K_c * \overline{minQSC} + minQSC}{\overline{minQSC} + K_c \cdot minQSC}\right) \quad (21)$$

$$K_c = 2^{\frac{S_r}{6}} \quad (22)$$

where minQSC is a minimum $RsCs^2$ for a quad split of the block (e.g., LCU), $RsCs^2$ is a spatial complexity measure as discussed herein, $\overline{minQSC}$ is the average representative contrast for blocks or LCUs that are not masked, $S_c$ is the sensitivity parameter, Kc is a contrast parameter, and $S_r$ is the range of sensitivity measure. Contrast sensitivity map (csm) may then include block level contrast sensitivity parameter values. For example, contrast sensitivity map (csm) may include a contrast sensitivity value for each block of a current picture.

Discussion now turns to the generation of visual sensitivity map (vsm). For example, the visual sensitivity map (vsm) may be generated by adder 706 and switch 703. In an embodiment, the visual sensitivity map (vsm) is the additive luminance sensitivity parameter and contrast sensitivity parameter with black masked areas being set to zero. For example, the visual sensitivity map (vsm) may be determined as shown in Equation (23):

$$S_v = \begin{cases} S_l + S_c \mid B \text{ is } 0 \\ 0 \quad \mid B \text{ is } 1 \end{cases} \quad (23)$$

where Sv is the visual sensitivity value for the block, Sl is the luminance sensitivity value for the block, and Sc is the contrast sensitivity value for the block. As shown, when the black mask masks the block, the visual sensitivity value for the block is set to zero and, when the black mask does not mask the block, the visual sensitivity value for the block is set to the luminance sensitivity value plus the contrast sensitivity value. For example, switch 703 may operate under control of the black_mask to zero out masked values and to provide visual sensitivity map (vsm). For example, For example, a visual sensitivity map (vsm) may be generated including, for each block of the current picture, either a visual sensitivity value for the block when the black level mask (black_mask) does not mask the block or a value of zero when the black level mask does mask the block such that the visual sensitivity value for the block is a sum of the luminance sensitivity value and the contrast sensitivity value.

Discussion now turns to region maps, which may be generated by pyschovisual sensitivity analyzer and map generator 402. In some embodiments, a region map indicates whether an LCU is fully in a region, partially in a region, or not in a region. The region in this context may be a human region of interest (hroi) region, a psychovisual sensitivity (e.g., psr) region, or the like. For example, Table 2 indicates the classes of regions/non-regions areas. Such region maps may indicate whether a block (e.g., LCU) is fully in the region, partially in the region, or not in the region. In contrast, sensitivity maps or the like may include sensitivity values (e.g., sensitivity values of varying types) for each block (e.g., LCU).

TABLE 2

LCU classes in a region

| Value | Description |
|---|---|
| 0 | LCU not in region |
| 1 | Partial LCU in Region |
| 2 | Full LCU in Region |

The classes illustrated in Table 2 can be generated based on a ROI Mask (e.g., HROI uses finer block sizes) or from determining region block characteristics (for psr) or the like. For example, a human region of interest block map may be generated such that the human region of interest block map includes, for each block of a current picture, an indicator as to whether the block is fully in a human region of interest region, partially in a human region of interest region, or not in a human region of interest region. Similarly, a visibility sensitivity block map may be generated such that the visibility sensitivity block map includes, for each block of a current picture, an indicator as to whether the block is fully in a visibility sensitivity region, partially in a visibility sensitivity region, or not in a visibility sensitivity region. Such a human region of interest block map and a visibility sensitivity block map may be combined to generate a psychovisual regions of interest block map as is discussed further herein. The psychovisual regions of interest block map includes, for each block of the current picture, an indicator of whether the block is fully in a region of interest, partially in a region of interest, or not in a region of interest (e.g., the region of interest in this context being a psychovisual region of interest).

For example, the visibility sensitivity block map may also be characterized as a visual sensitivity region map (vsr) and the psychovisual regions of interest block map may also be characterized as a psychovisual sensitivity region block map (psr). In such a psychovisual regions of interest block map or psychovisual sensitivity region block map (psr), psychovisual region of interest blocks may be characterized as psr block or regions or the like and non-psychovisual region of interest may be characterized as non-psr block or regions or the like.

Discussion now turns to visual sensitivity region and visual sensitivity region map (vsr) generation, which may be performed by visual sensitivity region (vsr) generator 705. For example, the vsr may indicate those regions that are visually sensitive. For example, a visual sensitivity region (vsr) may be any region of a picture with $S_v < 0$. For partial region of interest LCUs, the determination of whether the LCU is a visual sensitivity region may be determined based on a ratio of a minQSC and avgQSC as shown in Equations (24) and (25):

$$PartialROI = (minQSC/avgQSC) > 8.0\,?\,1:0 \text{ for } S_v < 0 \quad (24)$$

$$avgQSC = \frac{1}{4}\sum\left(RsCs^2_{\frac{LCU}{4}}\right) \quad (25)$$

where minQSC is a minimum $RsCs^2$ for a quad split of the block (e.g., LCU) and avgQSC is the where minQSC is a average $RsCs^2$ for the block (e.g., LCU). As shown if the ratio is greater than a threshold (8 in this example), the partial region of interest may be set as a visual sensitivity region of interest.

Figure 7B:
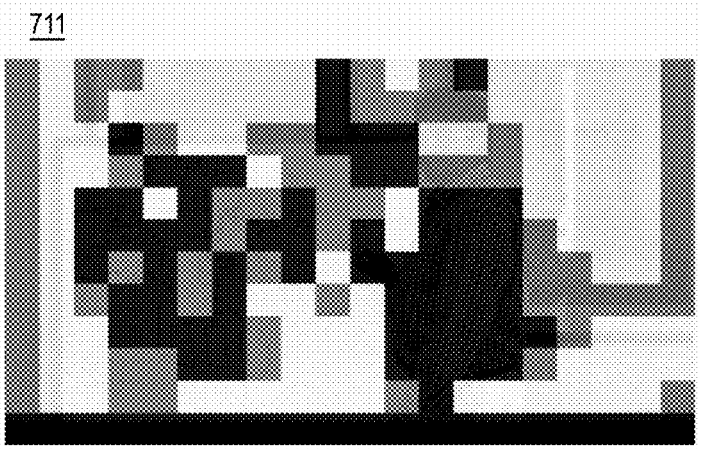
FIG. 7B illustrates an example visibility sensitivity block map.

FIG. 7B illustrates an example visibility sensitivity block map 711, arranged in accordance with at least some implementations of the present disclosure. For example, visibility sensitivity block map 711 may be characterized as a visual sensitivity region map, With reference to FIG. 6B, for picture or frame 610, example visibility sensitivity block map (vsr) 711 may be generated as discussed herein. In visibility sensitivity block map (vsr) 711, white regions or blocks may indicate the entirety of the region or block is fully within the visual sensitivity region of interest (e.g., the block is a full block or region of interest (full ROI)), grey regions may indicate the region or block is partially within the visual sensitivity region of interest (e.g., the block or region is a partial block or region of interest (partial ROI)), and black regions may indicate no portion of the region or block is within the visual sensitivity region of interest (e.g., the block or region is of no interest (no ROI)).

As discussed, an HROI mask may be at a finer block accuracy than the block level (e.g., LCU level or LCU map level). LCU region map values may be filled based on thresholds of ROI size within an LCU as shown in Equations (26)-(28):

$$FullROI = LCU\_ROI\_Mask\_Area > LCUsz/2 \quad (26)$$

$$PartialROI = LCU\_ROI\_Mask\_Area < LCUsz/2 \text{ and } LCU\_ROI\_Mask\_Area > 0 \quad (27)$$

$$NoROI = LCU\_ROI\_Mask\_Area == 0 \quad (28)$$

where FullROI indicates a region or block is a full region or block of interest, PartialROI indicates a region or block is a partial region or block of interest, NoROI indicates a region or block is not a region or block of interest, LCU_ROI_Mask_Area is the area of the region or block covered by the region of interest, LCUsz is the block or region size, and ½ is a threshold factor, which may be any suitable value.

Figure 7C:
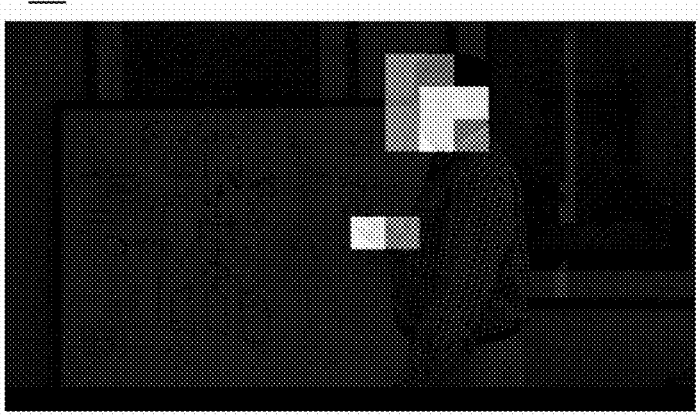
FIG. 7C illustrates an example human region of interest block map.

FIG. 7C illustrates an example human region of interest block map 712, arranged in accordance with at least some implementations of the present disclosure. For example, human region of interest block map 712 may be characterized as a face and/or skin (HROI) block map or the like. Again with reference to FIG. 6B, for picture or frame 610, human region of interest block map 712 may be generated as discussed herein. In human region of interest block map 712, white regions or blocks may indicate the entirety of the region or block is fully within the visual sensitivity region of interest (e.g., the block is a full block or region of interest (full ROI)) or the region or block is FullROI as discussed above, grey regions may indicate the region or block is partially within the visual sensitivity region of interest (e.g., the block or region is a partial block or region of interest (partial ROI)) or the region or block is PartialROI as discussed above, and black regions may indicate no portion of the region or block is within the visual sensitivity region of interest (e.g., the block or region is of no interest (no ROI)) or the region is NoROI as discussed above.

FIG. 8A illustrates an example pyschovisual modulator 403, arranged in accordance with at least some implementations of the present disclosure. As shown, pyschovisual modulator 403 may include a psychovisual sensitivity region (PSR) generator 801, a psychovisual sensitivity region (PSR) encoding sensitivity estimator 802, a psychovisual sensitivity region (PSR) sensitivity balancer 803, a background encoding sensitivity estimator 804, and a background sensitivity balancer 805. For example, pyschovisual modulator 403 may combine the visual sensitivity map (vsm), the human region of interest block map (hroi) (e.g., the HROI map) based on Qr, PicType, PicLevel and block coding complexity to generate a psychovisual sensitivity region (psr) and an psychovisual sensitivity map (psm).

For example, pyschovisual modulator 403 may handle three cases: HROI found and $NH_{roi} \geq TN_{roi}$ (e.g., a number of human region of interest blocks in the human region of interest block map exceeds or meets a threshold); HROI found and Smaller than $NH_{roi} < TN_{roi}$ (the number of human region of interest blocks in the human region of interest bock map does not meet the threshold); and HROI not found $NH_{roi} = 0$ (no human region of interest blocks exist) where the number of partial and full HROI LCUs is $NH_{roi}$ and $TN_{roi}$ is the ROI threshold.

For example, a psychovisual regions of interest block map (psr) may be generated as follows. The psychovisual regions of interest block map may also be characterized as a psychovisual sensitivity region block map or simply a psychovisual sensitivity region block map. When $NH_{roi} \geq TN_{roi}$, the psychovisual regions of interest block map (psr) is set to the human region of interest block map. In such contexts, the human region of interest block map has enough blocks of interest and bit rate balancing as discussed herein may be provided using background regions of the visual sensitivity map (vsm).

When the number of partial and full HROI LCUs ($NH_{roi}$) is less than the threshold ($TN_{roi}$), a psychovisual regions of interest block map (psr) is generated by combining blocks of the human region of interest block map with some blocks from selected blocks from the visibility sensitivity block map (e.g., vsr-LCUs). For example, blocks from the visibility sensitivity block map with visual sensitivity values ($S_v$) less than a minimum HROI sensitivity measure (e.g., $S_{hmin}$) are added to the blocks of the human region of interest block map until the combined number of blocks of the human region of interest block map and added blocks from the visibility sensitivity block map is greater than the threshold number of blocks (e.g., a number of psr-LCUs ($NH_{roi}$+Npsr) is greater than $TN_{roi}$). For example, FullROI blocks from the visibility sensitivity block map (e.g., vsr-LCUs) may be added in an order of lowest sensitivity value $S_v$ to higher sensitivity value (e.g., to add a maximum sensitivity as lower values indicate higher sensitivity), followed by PartialROI blocks from the visibility sensitivity block map (e.g., vsr-LCUs) again in order of west sensitivity value $S_v$ to higher sensitivity value. In some embodiments, blocks (e.g., LCUs) are added in regular raster scan order. In an embodiment, the sensitivity measure of added vsr LCUs is increased by abs($S_{hmin}$). When the number of human region of interest blocks in the human region of interest block map is zero (e.g., HROI is absent) psychovisual regions of interest block map (psr) is provided as the psychovisual regions of interest block map (psr) (e.g., psr is set to vsr).

In an embodiment, the sensitivity value of the blocks of human region of interest blocks (e.g., HROI LCUs) may be clamped to be less than $S_{hmin}$. The resulting visual sensitivity map (vsm) may be characterized as an initial psychovisual sensitivity map (e.g., an unbalanced $psm^0$). Furthermore, constants may be used in the vsr determination. For example, a max HROI sensitivity measure may be given as $S_{hmin} = -1$, a min vsr sensitivity measure may be given as $S_{vmin} = 0$, and a PSR LCU threshold may be given as $TN_{roi}$=NumActLCU/4.

FIG. 8B illustrates an example psychovisual regions of interest block map 811, arranged in accordance with at least some implementations of the present disclosure. For example, psychovisual regions of interest block map 811 may be characterized as psychovisual sensitivity regions 811. With reference to FIGS. 7B and 7C, visibility sensitivity block map 711 and human region of interest block map 712 may be combined as discussed to generate psychovisual regions of interest block map 811. In psychovisual regions of interest block map 811, the white, grey, and black regions may retain, for each block, the full, partial, or no region of interest designations discussed herein.

Discussion now turns to the generation of a psychovisual sensitivity map (psm). In some embodiments, the psychovisual sensitivity map (psm) is generated by combining the visual sensitivity map (vsm), psychovisual regions of interest block map (psr) (e.g., a psychovisual sensitivity region (psr)), and coding complexity to create a single map. The psychovisual sensitivity map (psm) may be balanced such that it produces the same bitrate as would be generated in non-psychovisual encoding. For example, bitrate may be estimated using a coding complexity metric. In an embodiment, the coding complexity metric is determined by spatio-temporal complexity estimator 502 (please refer to FIG. 5A) based on a Hadamard transform L1 norm of intra and inter prediction difference (SATD).

The bitrate savings from using the visual sensitivity map (vsm) on blocks or regions that are not psychovisually sensitive as provided by the psychovisual regions of interest block map (e.g., non-psr blocks or area) is then determined. The blocks or regions that are psychovisually sensitive as provided by the psychovisual regions of interest block map (e.g., the psr blocks or area) are then modulated using the previously saved bits until all bits saved from non-psr blocks or area are consumed. The bitrate is then balanced to the original estimate based on a frame representative Qp (Qr) provided as control by a bit-rate controller or a user so as achieve the same codec operating point and to prevent any unnecessary reaction from bit-rate controller. Such techniques may provide additional bits (e.g., more quality) to psychovisually sensitive blocks and fewer bits (e.g., lesser quality) to non psychovisually sensitive blocks. For example, the initial psychovisual sensitivity map ($psm^0$) generated for the current picture (e.g., including, for each block of the current picture, a psychovisual sensitivity value) may be modulated psychovisual regions of interest block map to provide a final psychovisual sensitivity map, the final psychovisual sensitivity map including the psychovisual sensitivity values for each block. Such modulation may be performed by psychovisual sensitivity region (PSR) encoding sensitivity estimator 802, psychovisual sensitivity region (PSR) sensitivity balancer 803, background encoding sensitivity estimator 804, and background sensitivity balancer 805 as discussed below.

Different scans using properties of causality and center of attention may be used to balance the overall bitrate of a frame (e.g., via the described sensitivity modulation) resulting in the highest psychovisual benefit and compression efficiency. Such techniques may provide a bitrate balanced psr/non-psr psychovisual sensitivity map (psm) for the entire frame.

In some embodiments, a coding complexity may be defined as the block (e.g., LCU) sum of the best 8×8 SATD such that the best SATD is the minimum of intra and inter prediction SATDs. For example, the coding complexity for a block may be determined as follows in Equation (29):

$$C = \text{Sum}(\min(\text{Inter\_SATD}, \text{Intra\_SATD})) \quad (29)$$

where C is the coding complexity, Inter_SATD is the inter prediction sum of absolute transform difference, and Intra_SATD is the intra prediction sum of absolute transform difference.

Next the region of interest (ROI) sensitivity may be determined. For example, a rate of a region may be linearly related to the complexity of the region. Estimated effective complexity due to application of sensitivity during encoding may be provided as given by Table 3.

TABLE 3

Estimated Complexity change due to ROI sensitivity measure

| S | 1 | 2 | 3 | 4 | 5 | 6 | 7 | 8 | 9 |
|---|---|---|---|---|---|---|---|---|---|
| dC+ | 1.0 | 0.891 | 0.794 | 0.707 | 0.623 | 0.561 | 0.5 | 0.445 | 0.39 |
| dC− | 1.0 | 1.123 | 1.260 | 1.414 | 1.587 | 1.782 | 2.0 | 2.245 | 2.52 |

FIGS. 8C(i)-8C(vi) illustrate example psychovisual modulation, arranged in accordance with at least some implementations of the present disclosure. In FIGS. 8C(i)-8C(vi), the x-axis shows a row of LCUs and the y-axis shows a sensitivity value for a specific LCU for a particular picture. FIG. 8C(i) illustrates an example visual sensitivity map (vsm) 810 for the picture. For example, rectangular insert region 883 shows LCUs that are part of an HROI. FIG. 8C(ii) illustrates an example initial psychovisual sensitivity map (psm$^0$) 881 for the picture. For example, rectangular insert region 812 shows LCUs that are part of psychovisual sensitivity regions (psr) and dotted line 813 shows $S_{hmin}$). FIG. 8C(iii) illustrates an example psychovisual sensitivity map (psm$^1$) 821 for the picture. For example, FIG. 8C(iii) illustrates an example psr with low complexity that is balanced (e.g., not saturated). FIG. 8C(iv) illustrates an example psychovisual sensitivity map (psm$^1$) 831 for the picture. For example, FIG. 8C(iv) illustrates an example psr with high complexity that is balanced (e.g., not saturated). FIG. 8C(v) illustrates an example psychovisual sensitivity map (psm) 841 for the picture. For example, FIG. 8C(v) illustrates an example psr with low complexity that undergoes saturation that is balanced with reduction in background sensitivity measure. FIG. 8C(vi) illustrates an example psychovisual sensitivity map (psm) 851 for the picture. For example, FIG. 8C(iv) illustrates an example psr with high complexity that undergoes saturation that is truncated to a minimum sensitivity measure.

The following parameters may be determined by psychovisual sensitivity region (PSR) encoding sensitivity estimator 802, psychovisual sensitivity region (PSR) sensitivity balancer 803, background encoding sensitivity estimator 804, and background sensitivity balancer 805 as shown in Equations (30)-(36):

$$\tilde{R}_{pic} = h \sum C_{lcu} \quad (30)$$

$$\tilde{R}_{roi} = h \sum C_{roi} \quad (31)$$

$$\tilde{R}_{bg} = h \sum C_{bg} \quad (32)$$

$$\tilde{R}^s_{bg} = h \sum C_{bg} \cdot dC^+[S] \quad (33)$$

$$\tilde{R}^s_{roi} = \tilde{R}_{pic} - \tilde{R}^s_{bg} \quad (34)$$

$$S'_{roi} = \frac{\tilde{R}_{pic} - \tilde{R}^s_{bg}}{\tilde{R}_{roi}} \quad (35)$$

$$S_{roi} = \sum S_{roi} \quad (36)$$

where $R_{pic}$ is an estimate of picture bitrate, C is complexity, h is a constant (e.g., averaging factor) mapping C to R, $C_{luc}$ is block (e.g., LCU) level complexity, $R_{roi}$ is an estimate of a region of interest bitrate, $R_{bg}$ is an estimate of a background bitrate, $R^s_{bg}$ is an estimate of a background rate due to decreasing psychovisual sensitivity in non-psr blocks or areas (e.g., due to psm in in the non-psr area), $R^s_{roi}$ is an estimate of a new bitrate for psr blocks (e.g., due to increasing psychovisual sensitivity in non-psr blocks or areas), S'$_{roi}$ is an estimate of average psr area sensitivity, and $S_{roi}$ is a true overage of psr area sensitivity based on the psychovisual sensitivity map (psm). For example, as used herein psr blocks or just psr may indicate psychovisual regions of interest from psychovisual regions of interest block map (psr) and non-psr blocks or just non-psr may indicate non-psychovisual regions of interest from psychovisual regions of interest block map (psr).

In an embodiment, modulating the initial psychovisual sensitivity map (psm$^0$) based on the psychovisual regions of interest block map (psr) may include increasing a first sensitivity of a first block of the initial psychovisual sensitivity map that includes a region of interest in the psychovisual regions of interest block map and decreasing a second sensitivity of a second block of the initial psychovisual sensitivity map that includes a region of no interest in the psychovisual regions of interest block map. For example, bits may be moved from regions of no interest in the psychovisual regions of interest block map to regions of interest in the psychovisual regions of interest block map.

Discussion now turns to scanning of psr (e.g., psychovisual regions of interest from psychovisual regions of interest block map (psr)) using properties of causality and center of attention. For example, bitrate balancing may include iteratively changing sensitivity values (e.g., in psychovisual sensitivity map (psm)) per block (e.g., LCU). Furthermore, scanning the psm/psr may play an important role in efficiency and quality of video. Bitrate balance may be achieved at any block. If a fixed scan is used, visual quality discontinuity may result. In some embodiments, the human region of interest block map (e.g., HROI) may provide indirect information about psychovisual property of attention or eye fixation.

Based on the above properties, four scans may be used for bitrate balancing: causal raster scan, anti-causal raster scan, centroid spiral scan, and anti-centroid spiral scan. For example, when a sensitivity value (e.g., S) is decremented for a background block or a vsr block (e.g., −1, increased visibility), a causal raster scan may be used. When a sensitivity value (e.g., S) is incremented for a background block or a vsr block (e.g., +1, reduced visibility), an anti-causal raster scan may be used. When a sensitivity value (e.g., S) is decremented for an HROI block or, a centroid spiral scan may be used. When a sensitivity value (e.g., S) is incremented for an HROI block or, an anti-centroid spiral scan may be used.

Figure 8D:
FIG. 8D illustrates an example centroid scan of blocks of a psychovisual sensitivity region of a picture for balancing of overall bitrate.

FIG. 8D illustrates an example centroid scan 861 of blocks of a psychovisual sensitivity region of a picture for balancing of overall bitrate, arranged in accordance with at least some implementations of the present disclosure. As shown, centroid scan 861 may proceed in a spiral manner beginning at an HROI block (please refer to FIG. 7C) to other psychovisually sensitive blocks or regions as indicated by psychovisual regions of interest block map (psr) (please refer to FIG. 8B).

In some embodiments, to balance the bitrate, the following pseudocode may be used.
Pseudocode (1):

The psr is scanned as described above and the psm sensitivity map of psr is changed in ±1 step size until Equation (37) is satisfied:

$$\mathrm{abs}(\overline{S_{roi}} - \widehat{S^T_{roi}}) < T_s \qquad (37)$$

where Ts is 0.1, minimum S allowed is given by $-S_r$, and maximum S is given by $S_{hmin}$ and $S_{vmin}$.

If psr sensitivity measure is saturated such that sensitivity cannot be increased or decreased due to limits imposed but target sensitivity is not achieved, then:

If $\overline{S_{roi}} > \widehat{S^T_{roi}}$, minimum sensitivity for ROI is reached and the process is stopped.

If $\overline{S_{roi}} < \widehat{S^T_{roi}}$, non-psr sensitivity is reduced as shown below.

A new rate estimate of saturated psr is $\widehat{R^S_{roi}} = h\Sigma C_{roi} \cdot dC^{-}[S]$. An estimate of average non-psr sensitivity is given as:

$$\widehat{S^T_{bg}} = \frac{\overline{R_{pic}} - \widehat{R^S_{roi}}}{\overline{R_{bg}}}.$$

To balance the bitrate, the non-psr region is scanned as described above and the sensitivity of non-psr LCUs is changed in ±1 step size until Equation (38) is satisfied:

$$\mathrm{abs}(\overline{S_{bg}} - \widehat{S^T_{bg}}) < T_s \qquad (38)$$

where Ts is 0.1 and minimum non-psr sensitivity allowed is 0.

For example, as shown in FIG. 8A, psychovisual sensitivity region (PSR) generator 801 may generate a psychovisual sensitivity region block map (psr) and an initial psychovisual sensitivity map (psm⁰). Psychovisual sensitivity region (PSR) encoding sensitivity estimator 802 may estimate average psr area sensitivity for the psychovisual sensitive blocks of psychovisual sensitivity region block map (psr) to provide $S'_{roi}$. Psychovisual sensitivity region (PSR) sensitivity balancer 803 may balance the sensitivity values in the psychovisual sensitive blocks of psychovisual sensitivity region block map (psr) to generate a modulated psychovisual sensitivity map (psm¹). Background encoding sensitivity estimator 804 may estimate average non-psr area sensitivity for the non-psychovisual sensitive blocks of psychovisual sensitivity region block map (psr) to provide $S'_{bg}$. Background sensitivity balancer 805 may balance the sensitivity values in the non-psychovisual sensitive blocks of psychovisual sensitivity region block map (psr) to generate a further modulated psychovisual sensitivity map (psm). As discussed, such techniques may be performed once or iteratively to generate a final psychovisual sensitivity map (psm).

Discussion now turns to persistence analysis and integration. For example, persistence as used herein is a measure of visibility time of a block. To measure the visibility, sequential block motion estimation and block spatio-temporal complexity is determined. Areas with low spatio-temporal complexity in consecutive temporal locations are persistent. The count of such sequential temporally collocated blocks is the persistence measure. A persistence map may be created using a decision tree and additional metrics. Blocks which have high persistence have unique properties such that they may be relatively easy to encode in the future and the changes in quality have a longer impact in time.

Figure 9A:
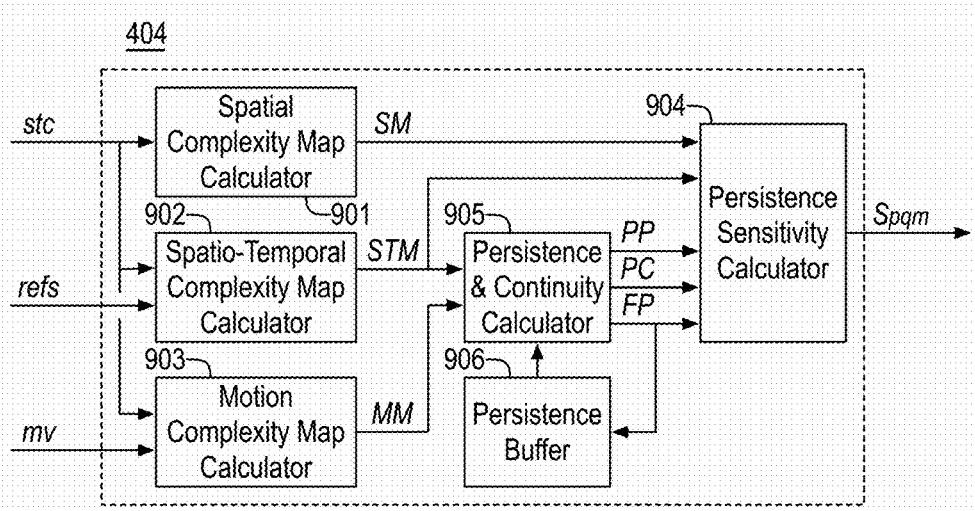
FIG. 9A illustrates an example persistence analyzer and quality adapter.

FIG. 9A illustrates an example persistence analyzer and quality adapter 404, arranged in accordance with at least some implementations of the present disclosure. As shown, persistence analyzer and quality adapter 404 may include a spatial complexity map calculator 901, a spatio-temporal complexity map calculator 902, a motion complexity map calculator 903, a persistence sensitivity calculator 904, a persistence and continuity calculator 905, and a persistence buffer 906.

For example, coding artifacts should be avoided in high persistence areas as the visibility of artifacts is increased by persistence. Since coding of high persistence blocks have low future coding costs, encoding them with high quality propagates the quality across multiple frames at low overall cost thus increasing compression efficiency. Low persistence blocks have short visibility time but still have temporal continuity and should be coded at average or medium quality. Zero persistence blocks can be encoded at lower quality to save bits and zero persistence blocks also show motion masking which reduces the visibility of errors. A persistent quality map (pqm) is a block (e.g., LCU) level map of persistence sensitivity values (e.g., $S_{pqm}$ values) that can be directly combined (e.g. added) to psychovisual sensitivity values (e.g., $S_{ppm}$ values) provided by psychovisual sensitivity map (psm) or a Qp map for persistence based encoding.

In some embodiments, spatial complexity (e.g., RsCs or the like) may be non-linearly quantized by spatial complexity map calculator 901 into 10 bins with index 0-9 to uniformly cover the typical image complexities as shown in Table 4 where SC indicates spatial complexity values and SI indicates spatial indices.

TABLE 4

| Spatial Complexity index (SI) | | | | | | | | | |
|---|---|---|---|---|---|---|---|---|---|
| SC | 4 | 9 | 15 | 23 | 32 | 42 | 53 | 65 | 78 | ∞ |
| SI | 0 | 1 | 2 | 3 | 4 | 5 | 6 | 7 | 8 | 9 |

In some embodiments, motion complexity map calculator 903 may determine a motion complexity, nM, as the number of unique 8×8 motion vectors in a given region. The maximum number of 8×8 blocks in a region (e.g., CU) may be given by nB.

Spatial complexity map calculator 901 may then determine a spatial complexity map (SM) as a tri-level classification of spatial indices, SI. For example, the classification thresholds and the values classified may be provided as follows in Table 5. For example, spatial complexity map (SM) may include a value of 1 (indicating low spatial complexity), 2 (indicating medium spatial complexity), or 3 (indicating high spatial complexity) for each block of a current picture.

TABLE 5

Spatial Complexity Map (SM)

| | SM = f(SI) | Low Threshold | High Threshold |
|---|---|---|---|
| 1 | SC-Low | | <=1 |
| 2 | SC-Med | >1 | <=6 |
| 3 | SC-High | >6 | |

Spatio-temporal complexity map calculator 901 may determine a spatio-temporal complexity map (STM) as follows. SADpp may provide the residual error measure of a region but cannot describe the complexity/predictability of video. Spatio-temporal complexity as used herein may provide a 5 level classification of the temporal complexity of a region with thresholds dependent on its spatial complexity. For example, an equation based mapping may be used to compute 4 thresholds resulting in 5 classes as shown in Table 6. For example, spatio-temporal complexity map (STM) may include a value of 1 (indicating very low spatio-temporal complexity), 2 (indicating low spatio-temporal complexity), 3 (indicating medium spatio-temporal complexity), 4 (indicating medium high spatio-temporal complexity), or 4 (indicating high spatio-temporal complexity) for each block of a current picture.

TABLE 6

Spatio-temporal Complexity Map (STM)

| | ST = f(SADpp, RsCs) | Low Threshold | High Threshold |
|---|---|---|---|
| 1 | STC-Very-Low | | $SADpp_{LCUw} < 0.3 \sqrt{RsCs_{LCUw}}$ |
| 2 | STC-Low | $SADpp_{LCUw} \geq 0.3 \sqrt{RsCs_{LCUw}}$ | $SADpp_{LCUw} < 0.6 \sqrt{RsCs_{LCUw}}$ |
| 3 | STC-Med | $SADpp_{LCUw} \geq 0.6 \sqrt{RsCs_{LCUw}}$ | $SADpp_{LCUw} < 1.2 \sqrt{RsCs_{LCUw}}$ |
| 4 | STC-Med-High | $SADpp_{LCUw} \geq 1.2 \sqrt{RsCs_{LCUw}}$ | $SADpp_{LCUw} \leq 1.8 \sqrt{RsCs_{LCUw}}$ |
| 5 | STC-High | $SADpp_{LCUw} > 1.8 \sqrt{RsCs_{LCUw}}$ | |

Motion complexity map calculator 903 may determine a motion complexity map (MM) as a bi-level classification based on a number of unique 8×8 motion vectors in a given region. For example, nB is the number of 8×8 blocks in a given block (e.g., LCU). Based on the number of unique motion vectors, classification may be provided as shown in Table 7. For example, motion complexity map (MM) may include a value of 1 (indicating low motion complexity) or 2 (indicating high motion complexity) for each block of a current picture.

TABLE 7

Motion Complexity Map (MM)

| | MM = f(nM) | Low Threshold | High Threshold |
|---|---|---|---|
| 1 | MC-Low | | <nB/2 |
| 2 | MC-High | >=nB/2 | |

Persistence (P) may be defined as a numeric quantity defined for a block or region as a number of sequential frames with co-located regions of low spatio-temporal complexity (e.g., <=STC-Low-Complexity) and low motion complexity (e.g., <=MC-Low-Complexity). It is noted that a future persistence sensitivy value is invalidated if the future frame is an intra frame.

Persistence continuity (PC) may be provided by persistence and continuity calculator 905 as follows. A block or region is considered to have persistence continuity if past persistence is high (e.g., >=8) and future persistence of a previous GOP is high (e.g., >=8). For example, persistence continuity (PC) may be true or false (e.g., 1 or 0). For example, persistence continuity (PC) may be true when past persistence is high and future persistence is high and false otherwise. In an embodiment, a block has persistence continuity when the block has co-located regions of low spatio-temporal complexity and low motion complexity in one or more past and future pictures (e.g., 8 in this example) of the video sequence. As shown in Tables 9 and 8, when a block has persistence continuity (e.g., PC==True, please see Table 9), a persistence sensitivity value for the block may be set to zero (e.g., $S_{pqm}=dS_{pqm}[1]$ such that $dS_{pqm}[1]$ is zero, please see Table 8).

As shown below in Table 8, a delta (Δ) value may be provided as a multiplier for a non-linear quantizer. For HEVC, the delta value may be 1. A $S_{pqm\_max}$ may be provided as a maximum persistent quality map. For example, $S_{pqm\_max}$ may be −6Δ.

For example, persistence and continuity calculator 905 may generate persistence continuity (PC), past persistence (PP), and future persistence (FP) as discussed herein and persistence sensitivity calculator 904 may generate a persistence sensitivity value ($S_{pqm}$) for the block as discussed below.

Figure 9B:
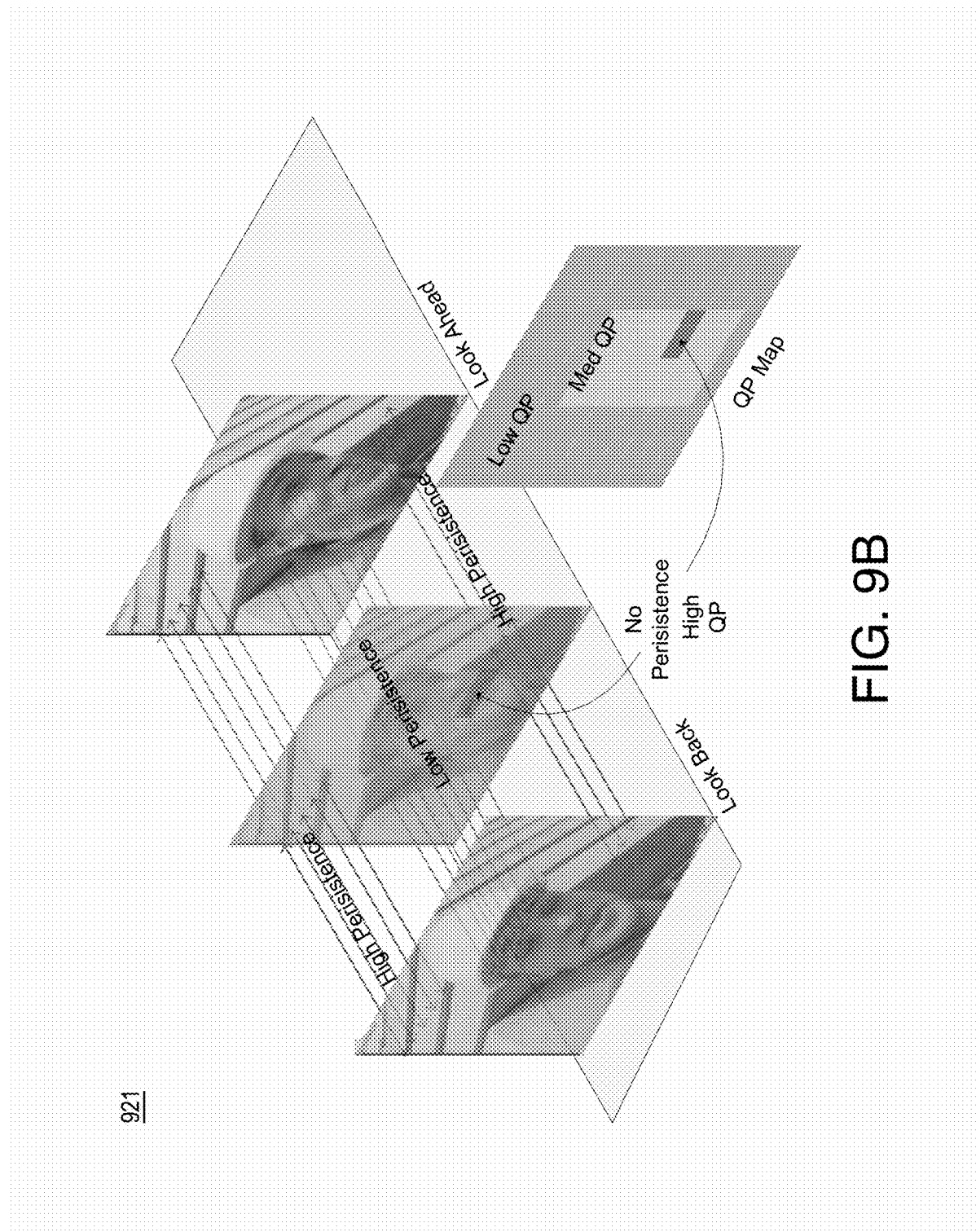
FIG. 9B illustrates example persistence for example video frames.

FIG. 9B illustrates example persistence for example video frames 921, arranged in accordance with at least some implementations of the present disclosure. In the illustrated example, high persistence regions may correspond to background regions (e.g., where no changes occur in the look ahead or look back directions). As shown, compression of video 921 may generally benefit from high persistence regions having low QP. In the illustrated example, medium persistence regions may correspond to unchanging facial regions (e.g., where some changes occur in the look ahead or look back directions but less frequently). As shown, compression of video 921 may generally benefit from medium persistence regions having medium QP. In the illustrated example, low persistence regions may correspond to mouth regions (e.g., where changes occur frequently in the look ahead or look back directions but less frequently). As shown, compression of video 921 may generally benefit from low or no persistence regions having high QP.

Returning to FIG. 9A, a persistence sensitivity value map having, for each block of a picture, a particular persistence sensitivity value ($S_{pqm}$) may be generated as follows. Sequential fast motion estimation may be performed for buffered input frames. A past motion estimate may be performed at gopsz distance. A future motion estimate may be performed at gopsz distance. Then, for each block (e.g., LCU): a spatial complexity index (SI) is determined, a spatial complexity map (SM) is determined, a past gopsz distance spatio-temporal complexity map (PST) is determined, a future gopsz distance spatio-temporal complexity map (FST) is determined, a past persistence (PP) is determined, a persistence continuity (PC) is determined, a future persistence (FP) is determined, and a persistent quality sensitivity value $S_{pqm}$ value is assigned based on a decision tree (as provided by Table 9 or Table 10 depending on the prediction type) and a $dS_{pqm}$ table as discussed further herein. The future persistence map may be saved for tracking persistence continuity.

For example, the spatial complexity index may be provide as discussed with respect to Table 5. The past gopsz distance spatio-temporal complexity map (PST) may be determined for each block as discussed with respect to Table 6 using the past gopsz distance picture (e.g., a picture that is the number of pictures in the group of pictures, gopsz, in the past with respect to the current frame). The future gopsz distance spatio-temporal complexity map (PST) may be determined for each block as discussed with respect to Table 6 using the future gopsz distance picture (e.g., a picture that is the number of pictures in the group of pictures, gopsz, in the future with respect to the current frame). The past persistence (PP) may be determined for a block or region as the number of sequential past frames with co-located blocks of low spatio-temporal complexity (e.g., <=STC-Low-Complexity) and low motion complexity (e.g., <=MC-Low-Complexity). The future persistence (FP) may be determined for a block or region as the number of sequential past frames with co-located blocks of low spatio-temporal complexity (e.g., <=STC-Low-Complexity) and low motion complexity (e.g., <=MC-Low-Complexity).

The persistent quality sensitivity value for each block may then be determined as shown in Tables 9 and 10. As shown in Table 8, for an inter block, if the block has persistence continuity (PC=true), the persistent quality sensitivity value for the block is set to $dS_{pqm}$ [1] (e.g., 0). Else if future persistence for the block is at least 8 frames (e.g., the number of pictures in the group of pictures) and the future gopsz distance spatio-temporal complexity does not exceed low complexity (e.g., FP>=8 && FST<=ST-Low-Complexity), the persistent quality sensitivity value for the block is set to the maximum (e.g., $dS_{pqm\_max}$, which may be −6 in some examples). Else if future persistence for the block is at least 8 frames (e.g., the number of pictures in the group of pictures) and the future gopsz distance spatio-temporal complexity does not exceed medium complexity but exceeds low complexity (e.g., FP>=8 && FST<=ST-Medium-Complexity), the persistent quality sensitivity value for the block is set to determined based on the future persistence (e.g., $dS_{pqm}$ [FP], please refer to Table 8). Else if future persistence for the block exceeds 1 frame and the future gopsz distance spatio-temporal complexity does not exceed medium complexity (e.g., FP>1 && FST<=ST-Medium-Complexity), the persistent quality sensitivity value for the block is set to determined based on the future persistence (e.g., $dS_{pqm}$ [FP], please refer to Table 8). Else if past persistence for the block exceeds 1 frame and the past gopsz distance spatio-temporal complexity does not exceed medium complexity (e.g., PP>1 && PST<=ST-Medium-Complexity), the persistent quality sensitivity value for the block is set to determined based on the past persistence (e.g., $dS_{pqm}$ [PP], please refer to Table 8). Else if the spatial complexity for the block is high complexity and past gopsz distance spatio-temporal complexity is high complexity and the block has no future persistence and the block has no past persistence (e.g., SM=S-High-Complexity && PST=ST-High-Complexity && !FP && !PP), the persistent quality sensitivity value for the block is set to a minimum (e.g., $dS_{pqm}$ [0], +1). Else, the persistent quality sensitivity value for the block is set to zero (e.g., $dS_{pqm}$ [1], 0).

As shown in Table 8, for an intra block, if the block has low spatial complexity and the future gopsz distance spatio-temporal complexity does not exceed low complexity (e.g., SM=S-Low-Complexity && FST<=ST-Low-Complexity), the persistent quality sensitivity value for the block is set to $dS_{pqm}$ [2] (e.g., −1). Else if future persistence for the block is at least 8 frames (e.g., the number of pictures in the group of pictures) and the future gopsz distance spatio-temporal complexity does not exceed low complexity (e.g., FP>=8 && FST<=ST-Low-Complexity), the persistent quality sensitivity value for the block is set to the maximum (e.g., $dS_{pqm\_max}$, which may be −6 in some examples). Else if future persistence for the block is at least 8 frames (e.g., the number of pictures in the group of pictures) and the future gopsz distance spatio-temporal complexity is medium complexity (e.g., FP>=8 && FST=ST-Medium-Complexity), the persistent quality sensitivity value for the block is set to determined based on the future persistence (e.g., $dS_{pqm}$ [FP], please refer to Table 8). Else if past persistence for the block exceeds 1 frame and the past gopsz distance spatio-temporal complexity does not exceed medium complexity (e.g., FP>1 && FST=ST-Medium-Complexity), the persistent quality sensitivity value for the block is set to determined based on the future persistence (e.g., $dS_{pqm}$ [FP], please refer to Table 8). Else if the spatial complexity for the block is high complexity and past gopsz distance spatio-temporal complexity is high complexity and the block has no future persistence and the block has no past persistence (e.g., SM=S-High-Complexity && PST=ST-High-Complexity && !FP && !PP), the persistent quality sensitivity value for the block is set to a minimum (e.g., $dS_{pqm}$ [0], +1). Else, the persistent quality sensitivity value for the block is set to zero (e.g., $dS_{pqm}$ [1], 0).

For example, Table 8 provides a persistence to delta S mapping.

TABLE 8

Persistence to Delta S Table
$dS_{pqm}$ Table

| Persistence | 0 | 1 | 2 | 3 | 4 | 5 | 6 | 7 | 8 | ∞ |
|---|---|---|---|---|---|---|---|---|---|---|
| $dS_{pqm}$ | +1Δ | 0 | −1Δ | −1Δ | −2Δ | −2Δ | −3Δ | −3Δ | −4Δ | −4Δ |

Table 9 provides a pseudocode fragment describing Spqm decision tree for inter.

TABLE 9

Persistence to Delta S Table

| if | PC==true | $S_{pqm} = dS_{pqm}[1]$ |
|---|---|---|
| else if | FP>=8 && FST<=ST-Low-Complexity | $S_{pqm} = dS_{pqm\_max}$ |
| else if | FP>=8 && FST<=ST-Medium-Complexity | $S_{pqm} = dS_{pqm}[FP]$ |
| else if | FP>1 && FST<=ST-Medium-Complexity | $S_{pqm} = dS_{pqm}[FP]$ |
| else if | PP>1 && PST<=ST-Medium-Complexity | $S_{pqm} = dS_{pqm}[PP]$ |
| else if | SM==S-High-Complexity && PST==ST-High-Complexity && !FP && !PP | $S_{pqm} = dS_{pqm}[0]$ |
| else | | $S_{pqm} = dS_{pqm}[1]$ |

Table 10 provides a pseudocode fragment describing Spqm decision tree for intra.

TABLE 10

Persistence to Delta S Table

| if | SM==S-Low-Complexity && FST<=ST-Low-Complexity | $S_{pqm} = dS_{pqm}[2]$ |
|---|---|---|
| else if | FP>=8 && FST<=ST-Low-Complexity | $S_{pqm} = dS_{pqm\_max}$ |
| else if | FP>=8 && FST==ST-Medium-Complexity | $S_{pqm} = dS_{pqm}[FP]$ |
| else if | FP>1 && FST<=ST-Medium-Complexity | $S_{pqm} = dS_{pqm}[FP]$ |
| else if | SM==S-High-Complexity && PST==ST-High-Complexity && !FP && !PP | $S_{pqm} = dS_{pqm}[0]$ |
| else | | $S_{pqm} = dS_{pqm}[1]$ |

The combined psychovisual and persistence map (ppm) may then be determined as shown in Equation (39) by sensitivity maps combiner 306 (please refer to FIG. 3A):

$$S_{ppm} = S_{psm} S_{pqm} \quad (39)$$

where $S_{ppm}$ is the combined psychovisual and persistence map, $S_{psm}$ is the psychovisual sensitivity map, and $S_{pqm}$ is the persistent quality map. For example, for each block, combining the psychovisual sensitivity value for the block and the persistence sensitivy value for the block may include summing the psychovisual value and the persistence sensitivy value to generate a psychovisual and persistence sensitivity ($S_{ppm}$) value for the block.

Discussion now turns to determining a content based lambda factor. As discussed, in HEVC high delay encoding, every frame is part of pyramidal GOP. GOP coding efficiency and quality may be based on the relative coding quality of reference frames in the pyramid. A highly predictive GOP can use high quality reference frames with increasingly higher Qp differential coding in the pyramid, which provides consistent high quality across the GOP and high compression efficiency. A continuously varying GOP cannot use the same model as it will result in temporal flicker and lower compression efficiency. GOP complexity may determine whether the GOP is a continuously varying GOP or an average GOP or a highly predictive GOP. In some embodiments, GOPs are classified as High Complexity, Medium, Complexity, and Low Complexity, correspondingly.

Figure 10A:
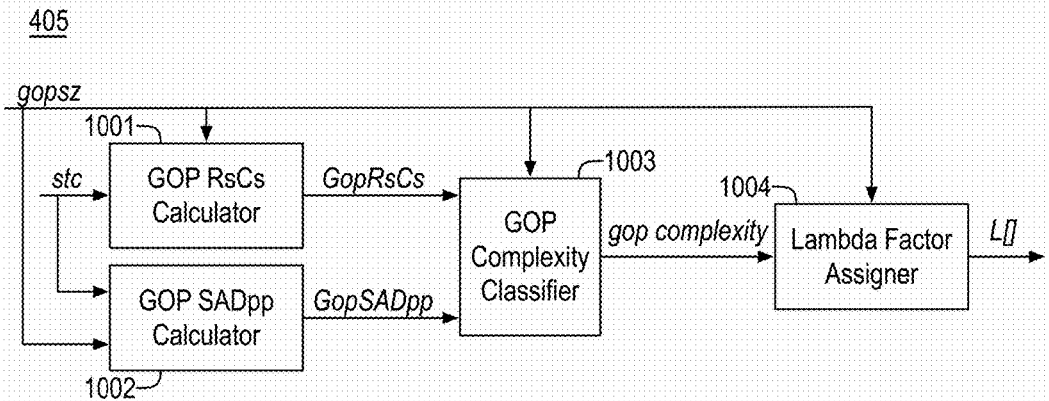
FIG. 10A illustrates an example content based lambda factor adapter.

FIG. 10A illustrates an example content based lambda factor adapter 405, arranged in accordance with at least some implementations of the present disclosure. As shown, content based lambda factor adapter 405 may include a group of pictures spatial complexity (GOP RsCs) calculator 1001, a group of pictures temporal complexity (GOP-SADpp) calculator 1002, a group of pictures (GOP) complexity classifier 1003, and a lambda factor assigner 1004.

For example, group of pictures spatial complexity calculator 1001 may determine a group of pictures spatial complexity as follows in Equations (40) and (41):

$$PicRsCs = \sqrt{\frac{\sum_{i=0}^{\frac{H}{4}-1} \sum_{j=0}^{\frac{W}{4}-1} Rs^2[i][j] + \sum_{i=0}^{\frac{H}{4}-1} \sum_{j=0}^{\frac{W}{4}-1} Cs^2[i][j]}{\left(\frac{W}{4}\right)\left(\frac{H}{4}\right)}} \quad (40)$$

$$GopRsCs = \frac{\sum_{i}^{gopsz} PicRsCs}{gopsz} \quad (41)$$

where PicRsCs is a spatial complexity (e.g., RsCs) of a picture of width W and height H and GopRsCs is a spatial complexity (e.g., average of PicRsCs) for a group of pictures.

Group of pictures temporal complexity calculator 1002 may determine a group of pictures temporal complexity as follows in Equations (42) and (43):

$$PicSADpp = \frac{\sum_{i}^{H/B} \sum_{j}^{W/B} SADpp}{\left(\frac{W}{B}\right)\left(\frac{H}{B}\right)} \quad (42)$$

$$GopSADpp = \frac{\sum_{i}^{gopsz} PicSADpp}{gopsz} \quad (43)$$

where PicSADpp is a temporal complexity (e.g., SADpp) of a picture with block sizes B and GopSADpp is a temporal complexity (e.g., average of PicSADpp) for a group of pictures.

As discussed, a lambda factor may be determined on a block by block basis. For example, lambda factors may be dependent at least in part on picture type of the current picture being coded. In an embodiment, the lambda factor, $L_n$, may be a constant in the Qr to lambda equation used to determine lambda of a block (e.g., LCU) based on a representative quantization (Qr), sensitivity measure (S) from the psychovisual and persistence map (ppm) and a level assigned to each picture in the GOP hierarchy. As used herein, $L_i$ may be a lambda factor for an intra picture and $L_n$ may be a lambda factor for a picture when n is the pyramid level of the picture.

Table 11 illustrates example lambda factors, $L_n$, discrimination for an 8 picture group of pictures.

TABLE 11

| Discriminant for 8 GOP | | |
|---|---|---|
| High Complexity | GopSADpp > 1.1 $\sqrt{\text{GopRsCs}}$ − 1.5<br>$\sqrt{\text{GopRsCs}}$ > 2 | $L_0$ = 0.4420<br>$L_1$ = 0.2793<br>$L_2$ = 0.3536<br>$L_3$ = 0.5000 |
| Medium Complexity | GopSADpp ≤ 1.1 $\sqrt{\text{GopRsCs}}$ − 1.5<br>$\sqrt{\text{GopRsCs}}$ > 2<br>GopSADpp > $\sqrt{\text{GopRsCs}}$ − 2 | $L_0$ = 0.4420<br>$L_1$ = 0.3356<br>$L_2$ = 0.3817<br>$L_3$ = 0.6000 |
| Low Complexity | GopSADpp < $\sqrt{\text{GopRsCs}}$ − 2<br>$\sqrt{\text{GopRsCs}}$ ≤ 2 | $L_0$ = 0.4420<br>$L_1$ = 0.3536<br>$L_2$ = 0.4000<br>$L_3$ = 0.6800 |

For example, with respect to an 8 picture group of pictures, group of pictures (GOP) complexity classifier 1003 may determine a group of pictures complexity (gop complexity) for a group of pictures based on the temporal complexity (e.g., GopSADpp) of a group of pictures and the spatial complexity (e.g., GopRsCs) of a group of pictures. As shown in Table 11, when the temporal complexity (e.g., GopSADpp) of a group of pictures exceeds a product of a first factor (e.g., 1.1 in the illustrated example) and a spatial complexity (e.g., sqrt(GopSADpp)) less a second factor (e.g., 1.5 in the illustrated example) and the spatial complexity (e.g., sqrt(GopSADpp)) exceeds a threshold (e.g., 2 in the illustrated example), the group of pictures complexity may be assigned as high complexity and the lambda factors may be provided as shown in the first row of the third column of Table 11. When the temporal complexity (e.g., GopSADpp) of the group of pictures does not exceed the product of the first factor (e.g., 1.1 in the illustrated example) and the spatial complexity (e.g., sqrt(GopSADpp)) less the second factor (e.g., 1.5 in the illustrated example), the spatial complexity (e.g., sqrt(GopSADpp)) exceeds the threshold (e.g., 2 in the illustrated example), and the temporal complexity (e.g., GopSADpp) of the group of pictures exceeds the spatial complexity (e.g., sqrt(GopSADpp)) less a third factor (e.g., 2 in the illustrated example), the group of pictures complexity may be assigned as medium complexity and the lambda factors may be provided as shown in the second row of the third column of Table 11. When the temporal complexity (e.g., GopSADpp) of the group of pictures is less than the spatial complexity (e.g., sqrt(GopSADpp)) less a fourth factor (e.g., 2 in the illustrated example) and the spatial complexity (e.g., sqrt(GopSADpp)) does not exceed the threshold (e.g., 2 in the illustrated example), the group of pictures complexity may be assigned as low complexity and the lambda factors may be provided as shown in the third row of the third column of Table 11.

Figure 10B:
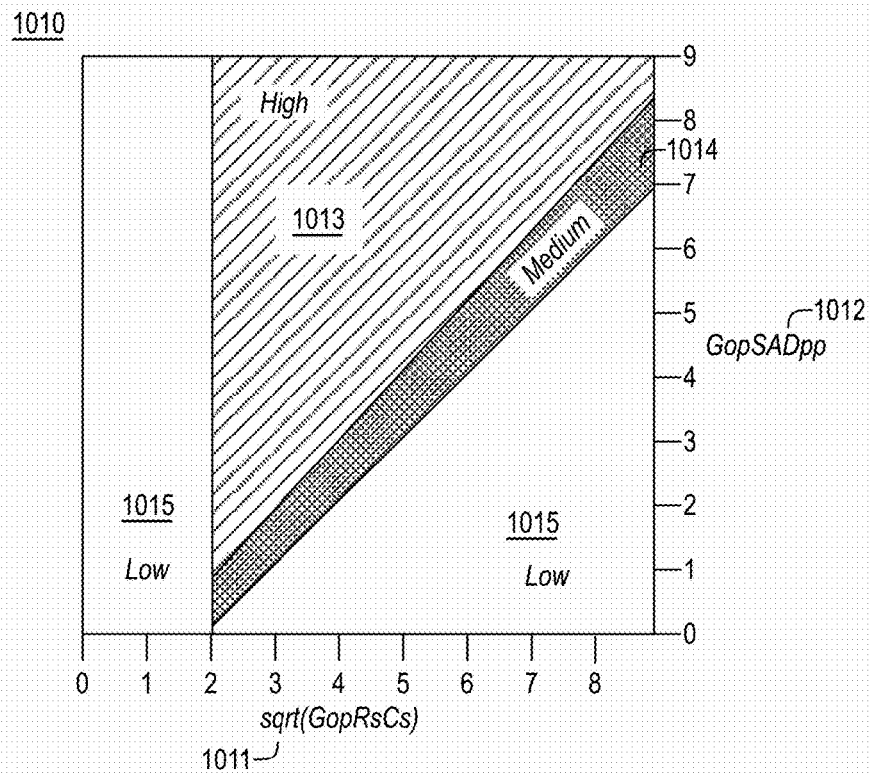
FIG. 10B illustrates an example classification of GOP complexity based on spatio-temporal measures for a GOP of size 8.

FIG. 10B illustrates an example classification of GOP complexity 1010 based on spatio-temporal measures for a GOP of size 8, arranged in accordance with at least some implementations of the present disclosure. For example, based on a spatial complexity of a group of pictures 1011 (e.g., sqrt(GopSADpp)) and a temporal complexity of a group of pictures 1012 (e.g., GopSADpp), the group of pictures complexity may be categorized as high complexity 1013, medium complexity 1014, or low complexity 1015. For example, classification of GOP complexity 1010 may implement the classification illustrated in Table 11.

Table 12 illustrates example lambda factors, Ln, discrimination for a 16 picture group of pictures.

TABLE 12

| Discriminant for 16 GOP | | |
|---|---|---|
| High Complexity | GopSADpp > 1.3 $\sqrt{\text{GopRsCs}}$ − 2.6<br>$\sqrt{\text{GopRsCs}}$ > 2 | $L_0$ = 0.4420<br>$L_1$ = 0.2793<br>$L_2$ = 0.3536<br>$L_3$ = 0.5000 |
| Medium Complexity | GopSADpp ≤ 1.3 $\sqrt{\text{GopRsCs}}$ − 2.6<br>$\sqrt{\text{GopRsCs}}$ > 2<br>GopSADpp > 1.1 $\sqrt{\text{GopRsCs}}$ − 2.2 | $L_0$ = 0.4420<br>$L_1$ = 0.3356<br>$L_2$ = 0.3817<br>$L_3$ = 0.6000 |
| Low Complexity | GopSADpp < 1.1 $\sqrt{\text{GopRsCs}}$ − 2.2<br>$\sqrt{\text{GopRsCs}}$ ≤ 2 | $L_0$ = 0.4420<br>$L_1$ = 0.3536<br>$L_2$ = 0.4000<br>$L_3$ = 0.6800 |

For example, with respect to a 16 picture group of pictures, group of pictures (GOP) complexity classifier 1003 may determine a group of pictures complexity (gop complexity) for a group of pictures based on the temporal complexity (e.g., GopSADpp) of a group of pictures and the spatial complexity (e.g., GopRsCs) of a group of pictures. As shown in Table 12, when the temporal complexity (e.g., GopSADpp) of a group of pictures exceeds a product of a first factor (e.g., 1.3 in the illustrated example) and a spatial complexity (e.g., sqrt(GopSADpp)) less a second factor (e.g., 2.6 in the illustrated example) and the spatial complexity (e.g., sqrt(GopSADpp)) exceeds a threshold (e.g., 2 in the illustrated example), the group of pictures complexity may be assigned as high complexity and the lambda factors may be provided as shown in the first row of the third column of Table 12. When the temporal complexity (e.g., GopSADpp) of the group of pictures does not exceed the product of the first factor (e.g., 1.3 in the illustrated example) and the spatial complexity (e.g., sqrt(GopSADpp)) less the second factor (e.g., 2.6 in the illustrated example), the spatial complexity (e.g., sqrt(GopSADpp)) exceeds the threshold (e.g., 2 in the illustrated example), and the temporal complexity (e.g., GopSADpp) of the group of pictures exceeds a product of a third factor (e.g., 1.1 in the illustrated example) and the spatial complexity (e.g., sqrt(GopSADpp)) less a fourth factor (e.g., 2.2 in the illustrated example), the group of pictures complexity may be assigned as medium complexity and the lambda factors may be provided as shown in the second row of the third column of Table 12. When the temporal complexity (e.g., GopSADpp) of the group of pictures is less than the spatial complexity (e.g., sqrt(GopSADpp)) less the fourth factor (e.g., 2.2 in the illustrated example) and the spatial complexity (e.g., sqrt (GopSADpp)) does not exceed the threshold (e.g., 2 in the illustrated example), the group of pictures complexity may be assigned as low complexity and the lambda factors may be provided as shown in the third row of the third column of Table 11.

Figure 10C:
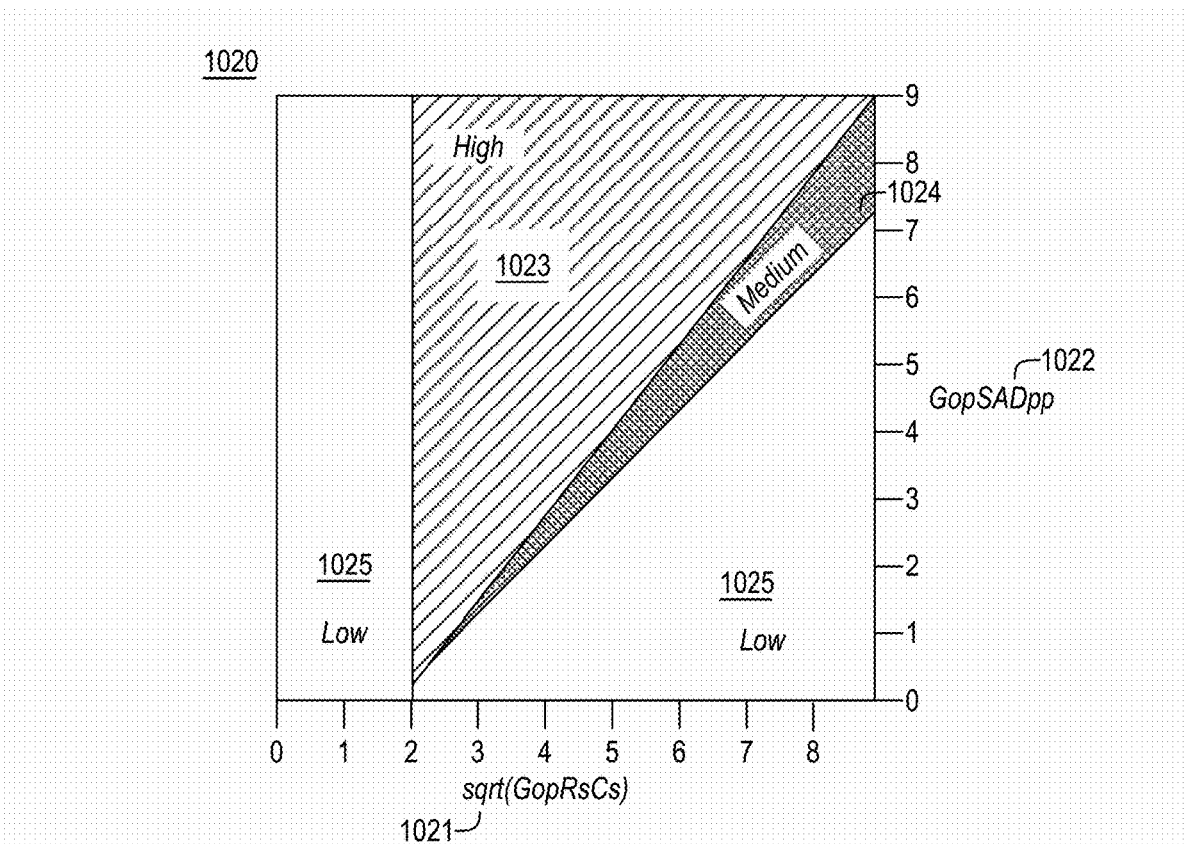
FIG. 10C illustrates an example classification of GOP complexity based on spatio-temporal measures for a GOP of size 16.

FIG. 10C illustrates an example classification of GOP complexity 1020 based on spatio-temporal measures for a GOP of size 16, arranged in accordance with at least some implementations of the present disclosure. For example, based on a spatial complexity of a group of pictures 1021 (e.g., sqrt(GopSADpp)) and a temporal complexity of a group of pictures 1022 (e.g., GopSADpp), the group of pictures complexity may be categorized as high complexity 1023, medium complexity 1024, or low complexity 1025. For example, classification of GOP complexity 1020 may implement the classification illustrated in Table 12.

In some embodiments, intra lambda, $L_i$, is unchanged and may have a value of about 0.57.

Discussion now turns to content based quantization adaptation.

Figure 11:
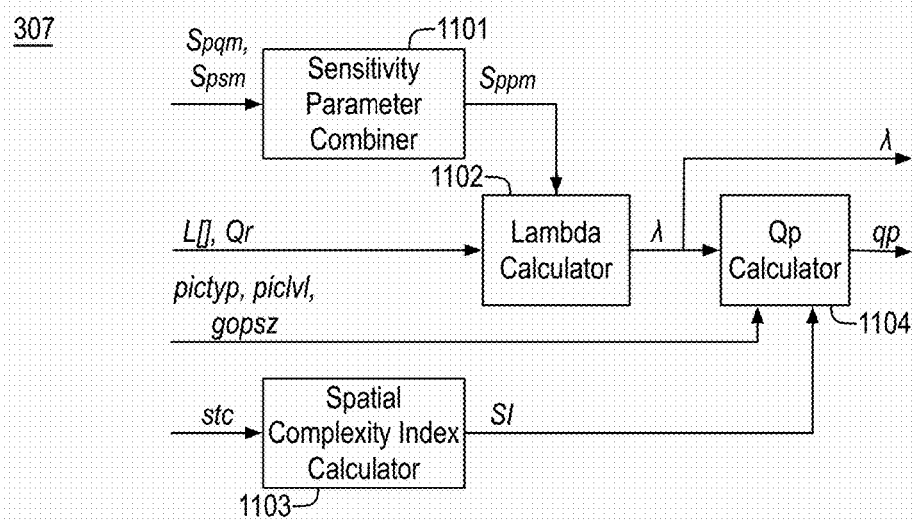
FIG. 11 illustrates an example content based quantization adapter module.

FIG. 11 illustrates an example content based quantization adapter module 307, arranged in accordance with at least some implementations of the present disclosure. As shown, content based quantization adapter module 307 may include a sensitivity parameter combiner 1101, a lambda calculator 1102, a spatial complexity index calculator 1103, and a Qp calculator 1104.

Content based quantization adapter module 307 may determine, for each block, a Qp given an adaptive rate distortion optimization Lagrange multiplier (lambda) for all frame types and GOP sizes on a block by block basis. In some embodiments, the optimal Qp may be correlated with spatial complexity. In the implementation of content based quantization adapter module 307, LCU spatial complexity Index (SI) based on block spatial complexity (e.g., LCU RsCs or the like) may be used to discretely model different log curves to give the optimal Qp for each frame type and GOP size. As used herein, the model is characterized as a LQ curve.

As shown, sensitivity parameter combiner 1101 may receive, for each block, a persistence sensitivity value (e.g., $S_{pqm}$) and a psychovisual sensitivity value (e.g., $S_{psm}$) and sensitivity parameter combiner 1101 may combine (by summing) the persistence sensitivity value and the psychovisual sensitivity value to generate a combined psychovisual and persistence sensitivity value (e.g., $S_{ppm}$).

Lambda calculator 1102 may receive the persistence sensitivity value for each block, a lambda factor for the current picture (L) and a representative quantizer (Qr) and lambda calculator 1102 may determine an adaptive rate distortion optimization Lagrange multiplier (lambda) for each block.

For example, lambda calculator 1102 may determine an adaptive rate distortion optimization Lagrange multiplier (lambda) for an I-picture as shown with respect to Equation (44):

$$\lambda_i = L_i \left( 2^{\frac{Qr-1+S_{ppm}-12}{3}} \right)(1 - \min(0.05 \ gopsz, 0.5)) \quad (44)$$

where $\lambda_i$ is the I-picture lambda, $L_i$ is a lambda factor, Qr is a representative quantizer, and $S_{ppm}$ is the combined psychovisual and persistence sensitivity value (e.g., including combined psychovisual and persistence sensitivity values on a block (LCU) by block basis).

Lambda calculator 1102 may determine an adaptive rate distortion optimization Lagrange multiplier (lambda) for a P (or GBP)-picture as shown with respect to Equation (45):

$$\lambda_0 = L_0 \left( 2^{\frac{Qr+S_{ppm}-12}{3}} \right) \quad (45)$$

where $\lambda_0$ is the P (or GBP)-picture lambda, $L_0$ is a lambda factor, Qr is a representative quantizer, and $S_{ppm}$ is the combined psychovisual and persistence sensitivity value (e.g., including combined psychovisual and persistence sensitivy values on a block (LCU) by block basis).

Lambda calculator 1102 may determine an adaptive rate distortion optimization Lagrange multiplier (lambda) for a Bn-picture as shown with respect to Equation (46):

$$\lambda_n = L_n \left( 2^{\frac{Qr+n+S_{ppm}-12}{3}} \right)\left( \max\left(2, \min\left(4, \frac{Qr+n+S_{ppm}-12}{6}\right)\right)\right) \quad (46)$$

where $\lambda_n$ is the Bn-picture lambda, n is the picture's level in a GOP pyramid, $L_n$ is a lambda factor, Qr is a representative quantizer, and $S_{ppm}$ is the combined psychovisual and persistence sensitivity value (e.g., including combined psychovisual and persistence sensitivy values on a block (LCU) by block basis).

As discussed, an adaptive lambda factor (L) may be determined based on the spatial complexity of the group of pictures, the temporal complexity of the group of pictures, and the level of the current picture in the hierarchical pyramid of the group of pictures (please refer to FIG. 10A and Tables 11 and 12). As shown in FIG. 11 and Equations (44)-(46), an adaptive rate distortion optimization Lagrange multiplier (lambda) for a block of a current picture of a video sequence may be generated based at least in part on a spatial complexity of a group of pictures comprising the current picture, a temporal complexity of the group of pictures, and a level of the current picture in a hierarchical pyramid of the group of pictures (via the lambda factor, L). For example, generating the adaptive rate distortion optimization Lagrange multiplier (lambda) may include determining an adaptive lambda factor based on the spatial complexity of the group of pictures, the temporal complexity of the group of pictures, and the level of the current picture in the hierarchical pyramid of the group of pictures and generating the adaptive rate distortion optimization Lagrange multiplier (lambda) by determining a product of the adaptive lambda factor and an exponential of a constant (e.g., 2) raised to a value comprising a reference quantization parameter (e.g., Qr as shown in Equations (44)-(46)).

Furthermore, as discussed with respect to Tables 11 and 12, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, such that the first value is less than the second value and the second value is less than the third value. For example, at level 1 in the GOP pyramid, the lambda value increases with decreasing GOP complexity (e.g., from 0.2793 to 0.3356 to 0.3536), at level 2 in the GOP pyramid, the lambda value increases with decreasing GOP complexity (e.g., from 0.3536 to 0.3817 to 0.4000), and at level 3 in the GOP pyramid, the lambda value increases with decreasing GOP complexity (e.g., from 0.5000 to 0.6000 to 0.6800). Table 12 shows similar trends for 16 picture GOPs.

Also, as discussed with respect to Tables 11 and 12, when the temporal complexity is greater than a product of the spatial complexity and a first constant less a second constant and the spatial complexity is greater than a third constant, indicating the group of pictures is a high complexity group of pictures; when the temporal complexity is not greater than the product of the spatial complexity and the first constant less the second constant and the spatial complexity is greater than the third constant, indicating the group of pictures is a medium complexity group of pictures; and when the temporal complexity is less than the spatial complexity less the third constant and the spatial complexity is not greater than the third constant, indicating the group of pictures is a low complexity group of pictures. Such indications of group of picture complexity may be used to access lambda factors based on the spatial complexity of the group of pictures, the temporal complexity of the group of pictures, and the level of the current picture in the hierarchical pyramid of the group of pictures.

As discussed, an LQ curve may provide the Qp based on the lambda factor. For example, Qp calculator 1104 may determine a Qp on a block basis using the corresponding lambda, picture type, picture level in the GOP hierarchy, GOP size, and spatial complexity for the block using the relationship shown with respect to Equation (47):

$$Qp = M \log_2(\lambda) + K \quad (47)$$

where $\lambda$ is lambda, M and K are adaptive parameters, and Qp is the Qp on a block by block basis.

For example, the Qp for each block may be determined as follows. A spatial complexity may be determined for buffered input frames. For each block (e.g., LCU), an adaptive rate distortion optimization Lagrange multiplier (lambda) is assigned based on picture type (pictyp), lambda factor (Ln), reference quantizer (Qr), combined psychovisual and persistence sensitivity value ($S_{ppm}$), and picture level (n) (e.g., as discussed above) and a Qp is assigned for the block (e.g., LCU) based on group of picture size (gopsz), picture type (pictyp) picture level (n), spatial complexity (e.g., a spatial complexity index, SI), the adaptive rate distortion optimization Lagrange multiplier (lambda), and a block level quantization parameter model (LQ curve).

Adaptive parameters M and K may be any suitable values. Table 13 provides example adaptive parameters for an LQ curve for an 8 picture GOP.

TABLE 13

Adaptive Parameters in LQ curve for 8 GOP

| Pic | Level | K or M | 0 | 1 | 2 | 3 | 4 | 5 | 6 | 7 |
|---|---|---|---|---|---|---|---|---|---|---|
| I | 0 | M | 4.2415 | 3.9818 | 3.9818 | 3.9818 | 4.0684 | 4.0684 | 4.0684 | 4.0684 |
|   |   | K | 12.8114 | 13.8536 | 13.8536 | 13.8536 | 13.8395 | 13.8395 | 13.8395 | 13.8395 |
| P/B | 0 | M | 4.5878 | 4.5878 | 4.5878 | 4.5878 | 4.5878 | 4.2005 | 4.2005 | 4.2005 |
|     |   | K | 12.3857 | 12.3857 | 12.3857 | 12.3857 | 12.3857 | 13.7122 | 13.7122 | 13.7122 |
| B | 1 | M | 4.3255 | 4.3255 | 4.3255 | 4.3255 | 4.3255 | 4.3255 | 4.3255 | 4.3255 |
|   |   | K | 13.7286 | 13.7286 | 13.7286 | 13.7286 | 13.7286 | 13.7286 | 13.7286 | 13.7286 |
| B | 2 | M | 4.4052 | 4.4052 | 4.4052 | 4.4052 | 4.4052 | 4.4052 | 4.4052 | 4.4052 |
|   |   | K | 13.1463 | 13.1463 | 13.1463 | 13.1463 | 13.1463 | 13.1463 | 13.1463 | 13.1463 |
| B | 3 | M | 4.2005 | 4.2005 | 4.2005 | 4.2005 | 4.2005 | 4.2005 | 4.2005 | 4.2005 |
|   |   | K | 13.7122 | 13.7122 | 13.7122 | 13.7122 | 13.7122 | 13.7122 | 13.7122 | 13.7122 |

Table 14 provides example adaptive parameters for an LQ curve for a 16 picture GOP.

TABLE 14

Adaptive Parameters in LQ curve for 16 GOP

| Pic | Level | K or M | 0 | 1 | 2 | 3 | 4 | 5 | 6 | 7 |
|---|---|---|---|---|---|---|---|---|---|---|
| I | 0 | M | 4.3281 | 3.9818 | 3.9818 | 3.9818 | 4.0684 | 4.0684 | 4.0684 | 4.0684 |
|   |   | K | 14.4329 | 14.8983 | 14.8983 | 14.8983 | 14.9069 | 14.9069 | 14.9069 | 14.9069 |
| P/B | 0 | M | 4.5878 | 4.5878 | 4.5878 | 4.5878 | 4.5878 | 4.3281 | 4.3281 | 4.3281 |
|     |   | K | 12.4456 | 12.4456 | 12.4456 | 12.4456 | 12.4456 | 13.5336 | 13.5336 | 13.5336 |
| B | 1 | M | 4.3255 | 4.3255 | 4.3255 | 4.3255 | 4.3255 | 4.3255 | 4.3255 | 4.3255 |
|   |   | K | 13.7286 | 13.7286 | 13.7286 | 13.7286 | 13.7286 | 13.7286 | 13.7286 | 13.7286 |
| B | 2 | M | 4.4052 | 4.4052 | 4.4052 | 4.4052 | 4.4052 | 4.4052 | 4.4052 | 4.4052 |
|   |   | K | 13.1463 | 13.1463 | 13.1463 | 13.1463 | 13.1463 | 13.1463 | 13.1463 | 13.1463 |
| B | 3 | M | 4.2005 | 4.2005 | 4.2005 | 4.2005 | 4.2005 | 4.2005 | 4.2005 | 4.2005 |
|   |   | K | 13.7122 | 13.7122 | 13.7122 | 13.7122 | 13.7122 | 13.7122 | 13.7122 | 13.7122 |

For example, using the techniques discussed herein, a block level spatial complexity may be determined for a block of a current picture of a video sequence (e.g., as discussed with respect to Equation (5)). An adaptive rate distortion optimization Lagrange multiplier (lambda) may be generated for the block based at least in part on a spatial complexity of a group of pictures comprising the current picture (e.g., as discussed with respect to Equation (41)), a temporal complexity of the group of pictures (e.g., as discussed with respect to Equation (43)), and a level of the current picture (e.g., n) in a hierarchical pyramid of the group of pictures. In some embodiments, the adaptive rate distortion optimization Lagrange multiplier is also dependent on the combined psychovisual and persistence sensitivity value ($S_{ppm}$) for the block. For example, the adaptive rate distortion optimization Lagrange multiplier may be determined as discussed with respect to Equations (44)-(46). A block level quantization parameter for the block may then be generated based on the adaptive rate distortion optimization Lagrange multiplier and adaptive parameters (e.g., K and M) picture type of the current picture, the level of the current picture in the pyramid hierarchy, and the block level spatial complexity of the block (which may be indexed as SI for example). As discussed herein, coding parameters for the block may be determined based at least in part on a rate distortion optimization using the adaptive rate distortion optimization Lagrange multiplier and the block level quantization parameter for the block. For example, an exhaustive or an adaptive rate distortion optimization search for the block using the rate distortion optimization Lagrange multiplier and the quantization parameter may be performed to determine coding modes for the block, partitioning for the block, etc. The block may then be encoded using the coding parameters and the block level quantization parameter into a bitstream such as a standards compliant bitstream.

As shown in Equation (47), generating the quantization parameter may include summing a first adaptive parameter (e.g., K) and a product of a log of the adaptive rate distortion optimization Lagrange multiplier (e.g., log($\lambda$)) and a second adaptive parameter (e.g., M). As discussed, the at first and second adaptive parameters are based on the picture type of the current picture, the level of the current picture in the pyramid hierarchy, and the block level spatial complexity of the block. For example, Tables 13 and 14 may be used to determine the adaptive parameters based on the GOP size (e.g., accessing Table 13 for GOPs having 8 pictures and Table 14 for GOPs having 16 pictures), picture type (e.g., as indicated by Pic in the Tables), picture level (e.g., as indicated by Level in the Tables), and spatial complexity (e.g., as indicated by spatial complexity index SI in the Tables).

For example, as shown in Tables 13 and 14, when the picture type is a P-picture type, the first adaptive parameter and the second adaptive parameter may be set as follows: when the spatial complexity is a first value, setting the first and adaptive parameters to second and third values, respectively, and when the spatial complexity is a fourth value, setting the first and second adaptive parameters to fifth and sixth values, respectively such that the first value is less than the fourth value, the second value is less than the fifth value, and the third value is less that the sixth value. For example, with reference to Table 13, for a P-picture at level 0, when increasing from spatial complexity indices 0-4 to spatial complexity indices 5-7, adaptive parameter M decreases from 4.5878 to 4.2005 and adaptive parameter K increases from 12.3857 to 13.7122. As will be appreciated other conclusions, trends, and the like may be determined from the data illustrated in Tables 13 and 14.

With reference to Equations (44)-(46), in some embodiments, the adaptive rate distortion optimization Lagrange multiplier (lambda) may depend on the combined psychovisual and persistence sensitivity value ($S_{ppm}$) for the block. In other embodiments, the combined psychovisual and persistence sensitivity value ($S_{ppm}$) for the block may be removed or set to zero in Equations (44)-(46). For example, generating the adaptive rate distortion optimization Lagrange multiplier (lambda) for each block may be based on the psychovisual and persistence sensitivity value ($S_{ppm}$) for each block (e.g., as provided by the combined psychovisual and persistence map (ppm)). As shown in Equations (44)-(46), in some embodiments, generating the adaptive rate distortion optimization Lagrange multiplier for a block includes determining a product of an adaptive lambda factor (e.g., L) and an exponential of a base (e.g., 2) raised to a value (e.g., (($Q_r-1+S_{ppm}-12$)/3), (($Q_r+S_{ppm}-12$)/3), or (($Q_r+n+S_{ppm}-12$)/3)) comprising the psychovisual and persistence sensitivity value.

Figure 12:
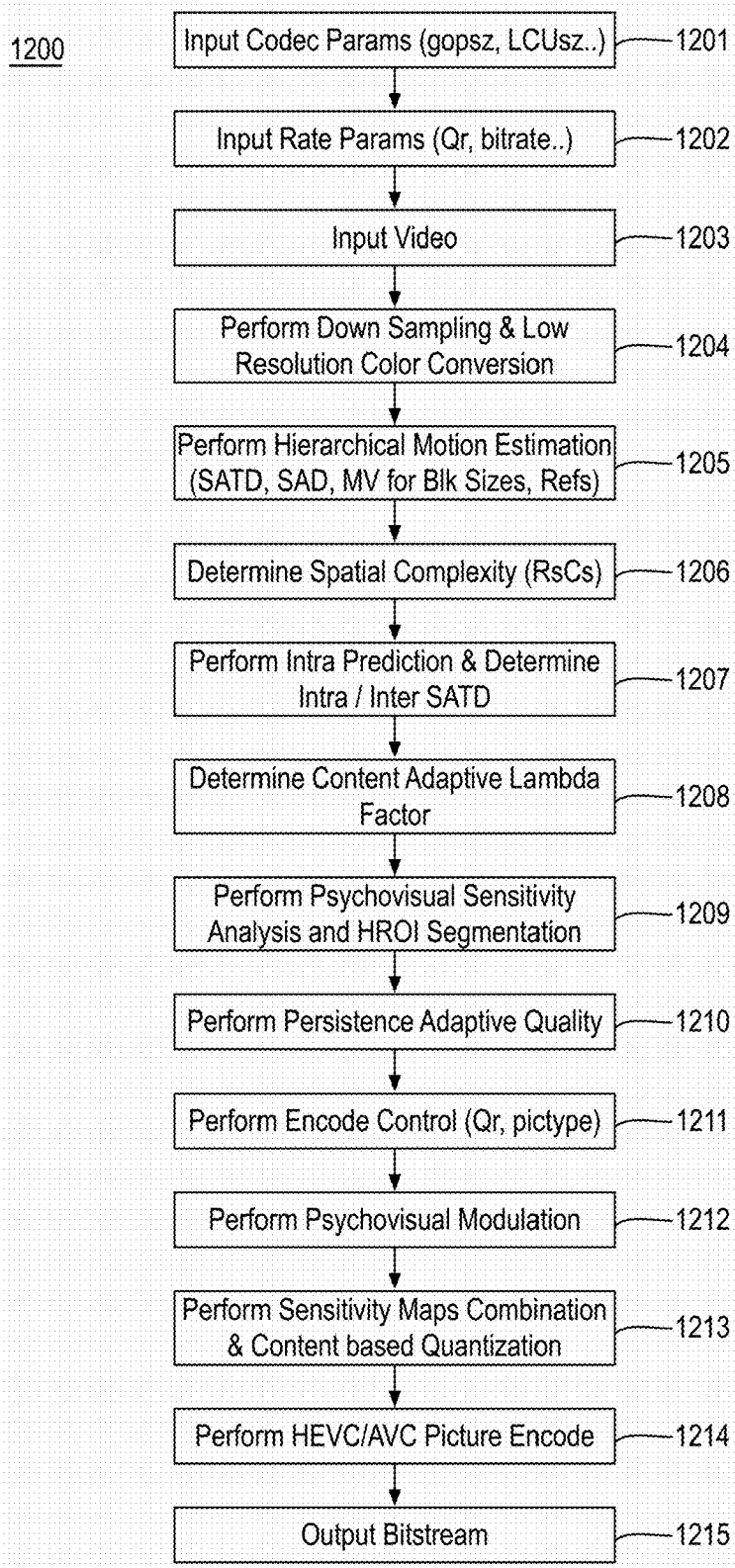
FIG. 12 illustrates an example process for adaptive quantization for video coding.

FIG. 12 illustrates an example process 1200 for adaptive quantization for video coding, arranged in accordance with at least some implementations of the present disclosure. Process 1200 may include one or more operations 1201-1215 as illustrated in FIG. 12. For example, process 1200 may include six functional processing groups: a pre-analysis group, a content adaptive lambda group, a psychovisual analysis & HROI group, a persistence analysis and quality adaptation group, a psychovisual modulation group, and a content adaptive quantization group.

As shown, process 1200 may begin at operation 1201, where codec parameters may be input including group or picture size (gopsz), block size (LCUsz), etc. Processing may continue at operation 1202, where rate parameters may be input including reference quantizer (Qr), bitrate, etc. Processing may continue at operation 1203, where video including any number of video pictures, sequences of video picture, etc. may be input in any suitable format for processing.

Processing may continue at operation 1204, where down sampling and low resolution color conversion may be performed. Processing may continue at operation 1205, where hierarchical motion estimation may be performed to determine SATD, SAD, MV for block sizes, and reference pictures for a current picture being processed. Processing may continue at operation 1206, where block level spatial complexity may be determined for blocks of the picture being processed. Processing may continue at operation 1207, where intra prediction may be performed for blocks of the picture being processed and intra and inter SATD may be determined. Operations 1204-1207 may provide a pre-analysis processing group.

Processing may continue at operation 1208, where a content adaptive lambda factor (L) may be determined for each block of the current picture being processed. The content adaptive lambda factor (L) may be determined using any suitable technique or techniques. In an embodiment, the adaptive lambda factor is based on the spatial complexity of the group of pictures, the temporal complexity of the group of pictures, and the level of the current picture in the hierarchical pyramid of the group of pictures of the current block and current frame as discussed herein. Operation 1208 may provide a content adaptive lambda processing group.

Processing may continue at operation 1209, where psychovisual sensitivity analysis and human region of interest segmentation may be performed. Human region of interest segmentation may be performed using any suitable technique or techniques. Psychovisual sensitivity analysis may be performed as discussed herein to generate a psychovisual sensitivity map having psychovisual sensitivity values for each block (e.g., LCU) of the current picture. Operation 1209 may provide a psychovisual analysis & HROI processing group.

Processing may continue at operation 1210, where persistence adaptive quality may be performed. For example, block level persistence analysis may be performed as discussed herein to generate a persistent quality map having persistence sensitivity values for each block (e.g., LCU) of the current picture. Operation 1210 may provide a persistence analysis and quality adaptation processing group.

Processing may continue at operation 1211, where encode control may be performed to generate reference Qr, picture type, etc. Such encode control may be performed using any suitable technique or techniques. Processing may continue at operation 1212, where psychovisual modulation may be performed. Such psychovisual modulation may be performed using any techniques discussed herein to modulate sensitivity values to increase sensitivity (and ultimately decrease Qp) in high psychovisual sensitivity areas and to decrease sensitivity (and ultimately increase Qp) in low psychovisual sensitivity areas. Operation 1212 may provide a psychovisual modulation processing group.

Processing may continue at operation 1213, where sensitivity maps combination and content based quantization may be performed. For example, the psychovisual sensitivity map (as modulated) and the persistent quality map may be combined (e.g., summed) to generate a combined psychovisual and persistence map having combined psychovisual and persistence sensitivity values for each block (e.g., LCU) of the current picture. Furthermore, at operation 1213, content based quantization may be performed using any suitable technique or techniques. For example, content based quantization may include generating an adaptive rate distortion optimization Lagrange multiplier for each block based at least in part on a spatial complexity of a group of pictures comprising the current picture, a temporal complexity of the group of pictures, and a level of the current picture in a hierarchical pyramid of the group of pictures and generating a block level quantization parameter for the block based on the adaptive rate distortion optimization Lagrange multiplier and adaptive parameters based on the picture type of the current picture, the level of the current picture in the pyramid hierarchy, and the block level spatial complexity of the block as discussed herein. Operation 1213 may provide a content adaptive quantization processing group.

Processing may continue at operation 1214, where picture encode may be performed for the current picture. The picture encode may be performed using any suitable technique or techniques. In some embodiments, the picture encode may be standards (e.g., HEVC or AVC or the like) compliant. In an embodiment, the current block and current picture may be encoded using the block level quantization parameter determined at operation 1213. In an embodiment, the encode may include determining coding parameters for the block based at least in part on a rate distortion optimization using the adaptive rate distortion optimization Lagrange multiplier and the block level quantization parameter determined as discussed above. Processing may continue at operation 1215, where a bitstream including the encoded block (e.g., quantized transform coefficient for the encoded block) and control parameters (e.g., block partition, block mode, etc. parameters) may be output.

Process 1200 or portions thereof may be performed any number of times for any number of blocks, pictures, groups of pictures, video sequences or the like.

Figure 13:
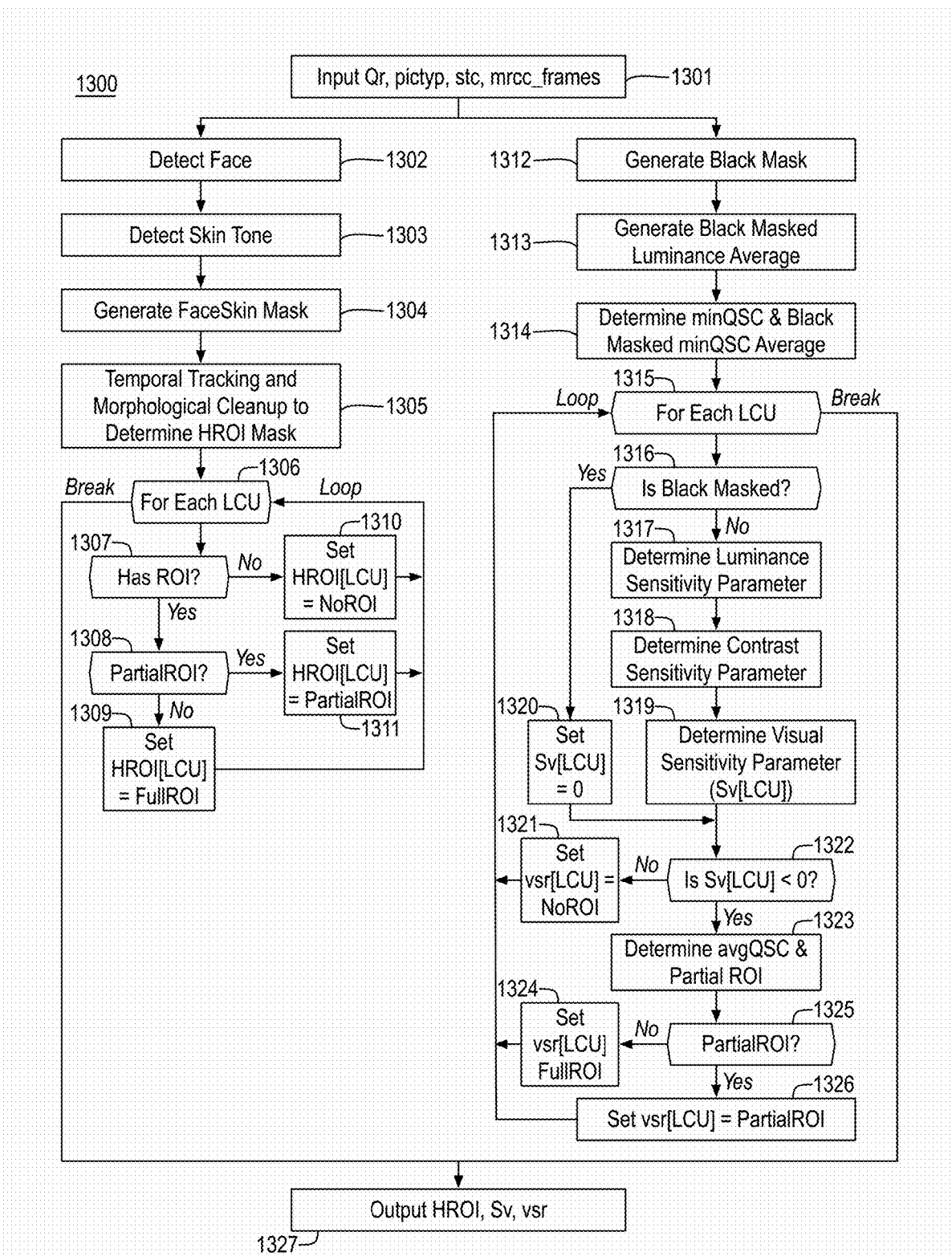
FIG. 13 illustrates an example process for psychovisual analysis and map generation.

FIG. 13 illustrates an example process 1300 for psychovisual analysis and map generation, arranged in accordance with at least some implementations of the present disclosure. Process 1300 may include one or more operations 1301-1327 as illustrated in FIG. 13. In process 1300, operations 1302-1305 may provide a human region of interest generation sub-process.

As shown, process 1300 may begin at operation 1301, where a reference quantizer (Qr), a picture type (pictyp), spatio-temporal complexity (stc), and multi resolution and color converted frames (mrcc_frms) may be input. Process 1300 may continue at operation 1302, where faces (if any) may be detected in in the multi resolution and color converted frames. Process 1300 may continue at operation 1303, where skin tone regions (if any) may be detected in in the multi resolution and color converted frames. Process 1300 may continue at operation 1304, where a face and skin mask may be generated. Process 1300 may continue at operation 1305, where temporal tracking of such faces and skin tone regions may be tracked temporally (e.g., across frames) and morphological cleanup may be performed to determine a human region of interest mask as discussed herein.

Process 1300 may continue at operation 1306, where a loop may be started that cycles through each block (e.g., LCU) of the current picture. When complete, the loop may break and processing may continue at operation 1327 as discussed below. Process 1300 may continue at operation 1307, where a determination may be made as to whether the current block has a region of interest (e.g., whether the block has any portion of a region of interest therein). If not, Process 1300 may continue at operation 1310, where, in a human region of interest block map, the block may be indicated has having no region of interest (HROI[LCU] =NoROI). If so, process 1300 may continue at operation 1308, where a determination may be made as to whether only a portion of the block has a region of interest therein. If so, process 1300 may continue at operation 1311, where, in a human region of interest block map, the block may be indicated has having a partial region of interest (HROI [LCU]=PartialROI). If not, process 1300 may continue at operation 1309, where, in a human region of interest block map, the block may be indicated has having a full region of interest (HROI[LCU]=FullROI).

Process 1300 may also continue from operation 1301 at operation 1312, where a black mask may be generated as discussed herein. For example, a black level mask may be generated for the current picture, the black level mask indicating, on a block by block basis, whether blocks of the current picture have an average luminance less than a threshold. Process 1300 may continue at operation 1313, where a black masked luminance average may be determined for each block such that if the block is masked no luminance average is determined and, if the block is not masked a luminance average is determined as discussed herein. Process 1300 may continue at operation 1314, where a minQSC and a black masked minQSC may be determined. For example, if the block is masked no contrast value is determined and, if the block is not masked a contrast value for the block is determined as discussed herein.

Process 1300 may continue at operation 1315, where a loop may be started that cycles through each block (e.g., LCU) of the current picture. When complete, the loop may break and processing may continue at operation 1327 as discussed below. Process 1300 may continue at operation 1316, where a determination may be made for the current block as to whether the block is masked by the black mask. If so, process 1300 may continue at operation 1320, where a visual sensitivity ($S_v$) is set to zero and subsequently at operation 1322 as discussed below. If not, process 1300 may continue at operation 1321, where a luminance sensitivity parameter or value may be determined for the block ($S_l$) as discussed herein. Process 1300 may continue at operation 1318, where a contrast sensitivity parameter or value may be determined for the block ($S_c$) as discussed herein. Process 1300 may continue at operation 1319, where a visual sensitivity parameter value ($S_v$) may be determined for the block using any suitable techniques such as adding the visual sensitivity value and the contrast sensitivity value. For example, the visual sensitivity parameter value ($S_v$) for the block may be added to a visual sensitivity map (vsm)

Process 1300 may continue from operation 1319 or 1320 at operation 1322, where a determination may be made as to whether the visual sensitivity parameter value is less than a threshold (e.g., 0) such that no visual sensitivity is indicated for the block. If not, process 1300 may continue at operation 1321, where, for the block, an indicator of a visual sensitivity region map (vsr) (e.g., a visual sensitivity region block map) may be set to NoROI indicating no visual sensitivity (e.g., not a region of interest) and processing may continue at operation 1326 as discussed below. If so, process 1300 may continue at operation 1323, where an avgQSC and at operation 1325, where a determination as to whether the block is a partial region of interest based on visual sensitivity may be made. If not, process 1300 may continue at operation 1324, where, for the block, an indicator of a visual sensitivity region map (vsr) (e.g., a visual sensitivity region block map) may be set to FullROI indicating visual sensitivity (e.g., a full region of interest or a region of full interest). If so, process 1300 may continue at operation 1326, where, for the block, an indicator of a visual sensitivity region map (vsr) (e.g., a visual sensitivity region block map) may be set to PartialROI indicating partial visual sensitivity (e.g., a partial region of interest or a region of partial interest).

Process 1300 may continue from operations 1306 and 1315 at operation 1327, where, when such processing is completed for each block of the current picture, the human region of interest block map, the visual sensitivity region block map, and the visual sensitivity map may be output.

Process 1300 or portions thereof may be performed any number of times for any number of blocks, pictures, groups of pictures, video sequences or the like.

Figure 14:
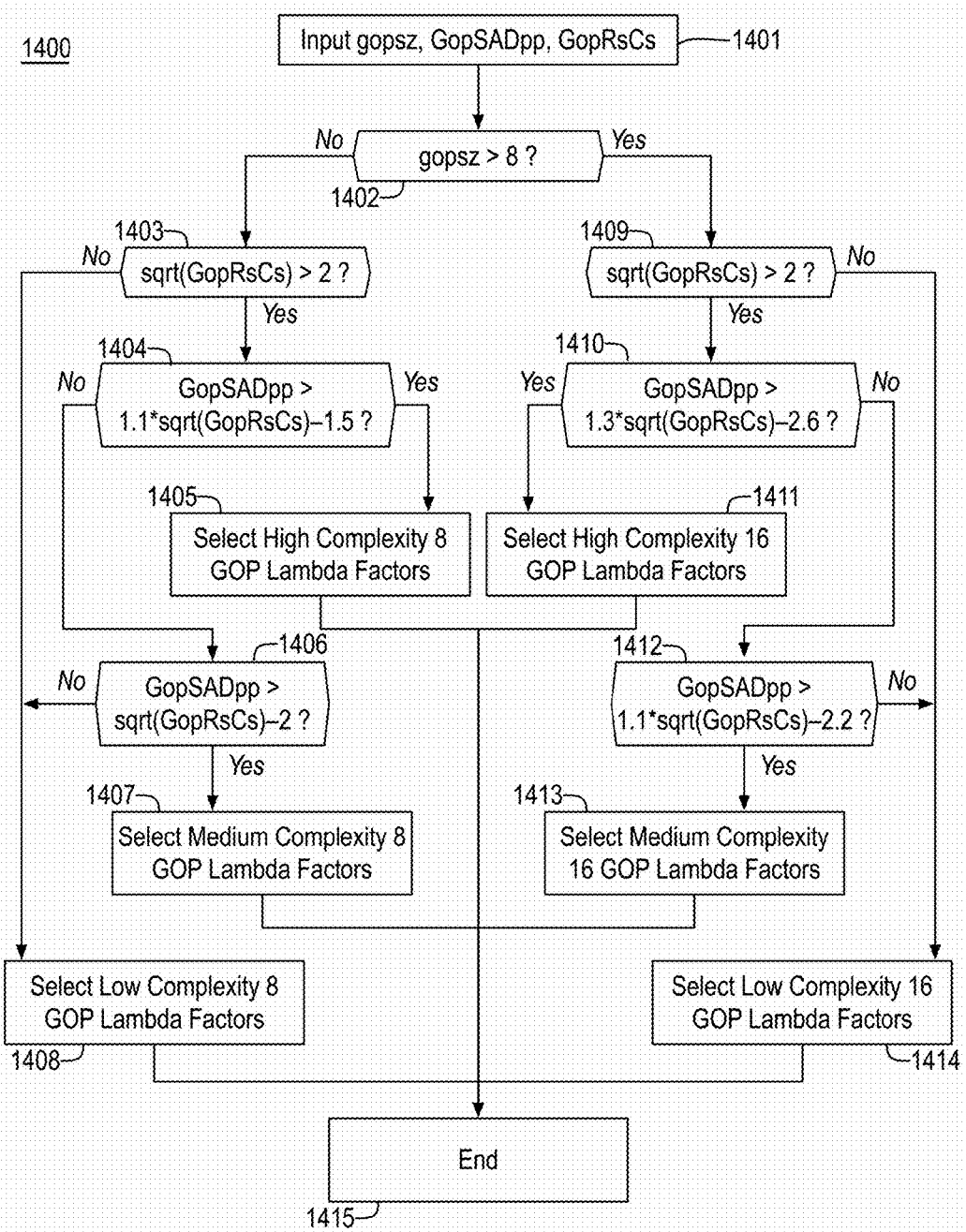
FIG. 14 illustrates an example process for content adaptive rate distortion optimization Lagrange multiplier (lambda) adaptation.

FIG. 14 illustrates an example process 1400 for content adaptive rate distortion optimization Lagrange multiplier (lambda) adaptation, arranged in accordance with at least some implementations of the present disclosure. Process 1400 may include one or more operations 1401-1415 as illustrated in FIG. 14.

As shown, process 1400 may begin at operation 1401, where a group of picture size (gopsz), a group of pictures temporal complexity (GopSADpp), and a group of pictures spatial complexity (GopRsC) may be input. Process 1400 may continue at operation 1402, where a determination may be made as to whether the group of picture size exceeds a threshold (e.g., 8 in this example).

If not, process 1400 may continue at operation 1403, where a determination may be made as to whether a group of pictures spatial complexity (e.g., sqrt(GopRsC)) exceeds a threshold (e.g., 2 in this example). If not, process 1400 may continue at operation 1408, where lambda factors for a group of pictures having 8 pictures and low complexity may be selected (e.g., as shown in bottom right cell of Table 11).

If so, process 1400 may continue at operation 1404, where a determination may be made as to whether a group of pictures temporal complexity (e.g., GopSADpp) exceeds a product of a first constant (e.g., 1.1 in this example) and the group of pictures spatial complexity (e.g., sqrt(GopRsC)) less a second constant (e.g., 1.5 in this example). If not, process 1400 may continue at operation 1406, where a determination may be made as to whether the group of pictures temporal complexity (e.g., GopSADpp) exceeds a product of a first constant (e.g., 1 in this example) and the group of pictures spatial complexity (e.g., sqrt(GopRsC)) less a second constant (e.g., 2 in this example). If not, process 1400 may continue at operation 1408, where lambda factors for a group of pictures having 8 pictures and low complexity may be selected (e.g., as shown in bottom right cell of Table 11). If so, process 1400 may continue at operation 1407, where lambda factors for a group of pictures having 8 pictures and medium complexity may be selected (e.g., as shown in middle right cell of Table 11).

If the determination at operation 1404 is affirmative, process 1400 may continue at operation 1405, where lambda factors for a group of pictures having 8 pictures and high complexity may be selected (e.g., as shown in top right cell of Table 11).

Returning to operation 1402, if the group of picture size exceeds the threshold (e.g., 8 in this example), process 1400 may continue at operation 1409, where a determination may be made as to whether a group of pictures spatial complexity (e.g., sqrt(GopRsC)) exceeds a threshold (e.g., 2 in this example). If not, process 1400 may continue at operation 1414, where lambda factors for a group of pictures having 16 pictures and low complexity may be selected (e.g., as shown in bottom right cell of Table 12).

If so, process 1400 may continue at operation 1410, where a determination may be made as to whether a group of pictures temporal complexity (e.g., GopSADpp) exceeds a product of a first constant (e.g., 1.3 in this example) and the group of pictures spatial complexity (e.g., sqrt(GopRsC)) less a second constant (e.g., 2.6 in this example). If not, process 1400 may continue at operation 1412, where a determination may be made as to whether the group of pictures temporal complexity (e.g., GopSADpp) exceeds a product of a first constant (e.g., 1.1 in this example) and the group of pictures spatial complexity (e.g., sqrt(GopRsC)) less a second constant (e.g., 2.2 in this example). If not, process 1400 may continue at operation 1414, where lambda factors for a group of pictures having 16 pictures and low complexity may be selected (e.g., as shown in bottom right cell of Table 12). If so, process 1400 may continue at operation 1413, where lambda factors for a group of pictures having 16 pictures and medium complexity may be selected (e.g., as shown in middle right cell of Table 12).

If the determination at operation 1410 is affirmative, process 1400 may continue at operation 1411, where lambda factors for a group of pictures having 16 pictures and high complexity may be selected (e.g., as shown in top right cell of Table 12).

Process 1400 may continue from any of operations 1405, 1411, 1407, 1413, 1408, 1414 at operation 1415, where process 1400 may end. Process 1400 or portions thereof may be performed any number of times for any number of blocks, pictures, groups of pictures, video sequences or the like.

Figure 15A:
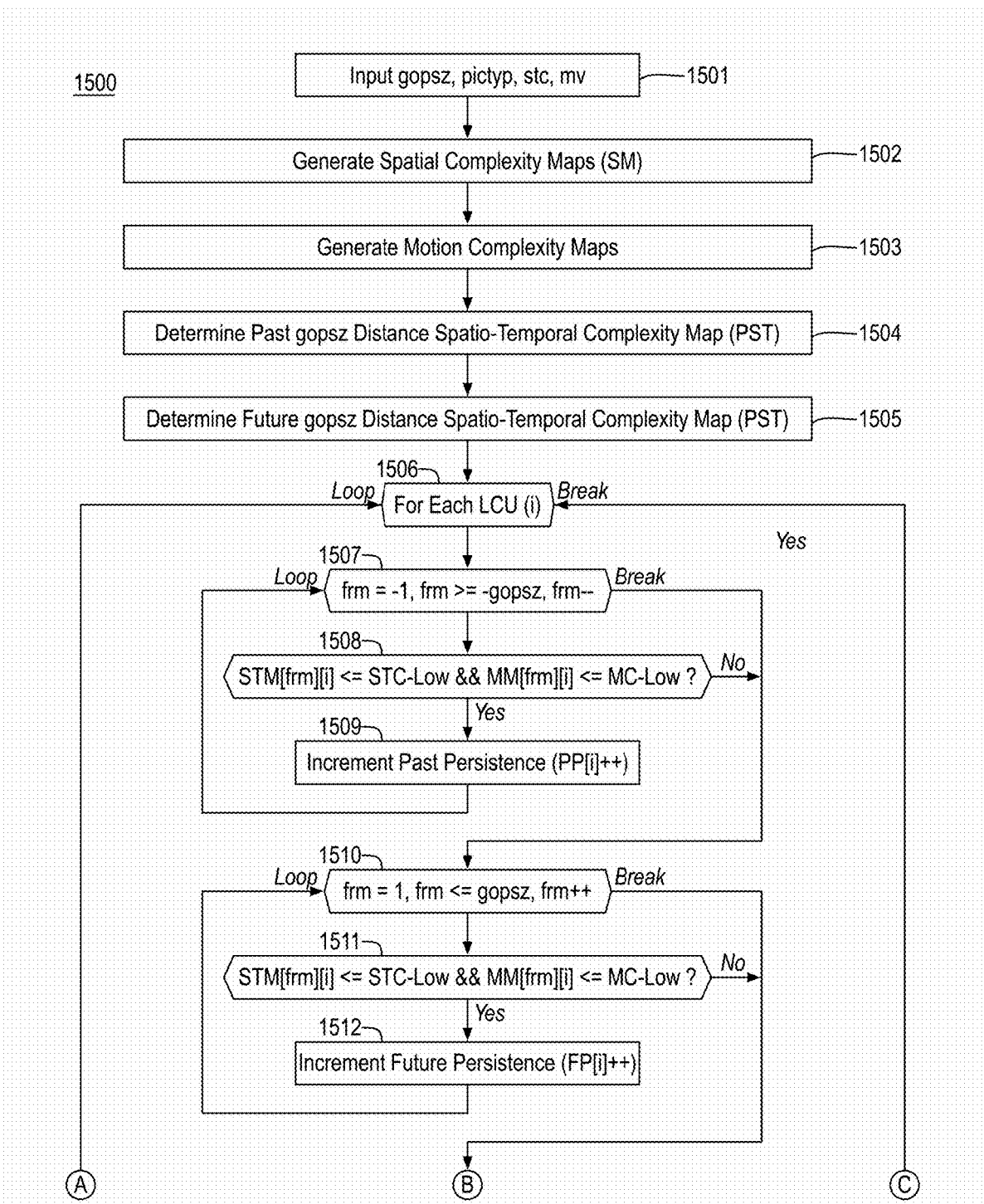
FIGS. 15A and 15B illustrates an example process for persistence analysis and quality adaptation.
Figure 15B:
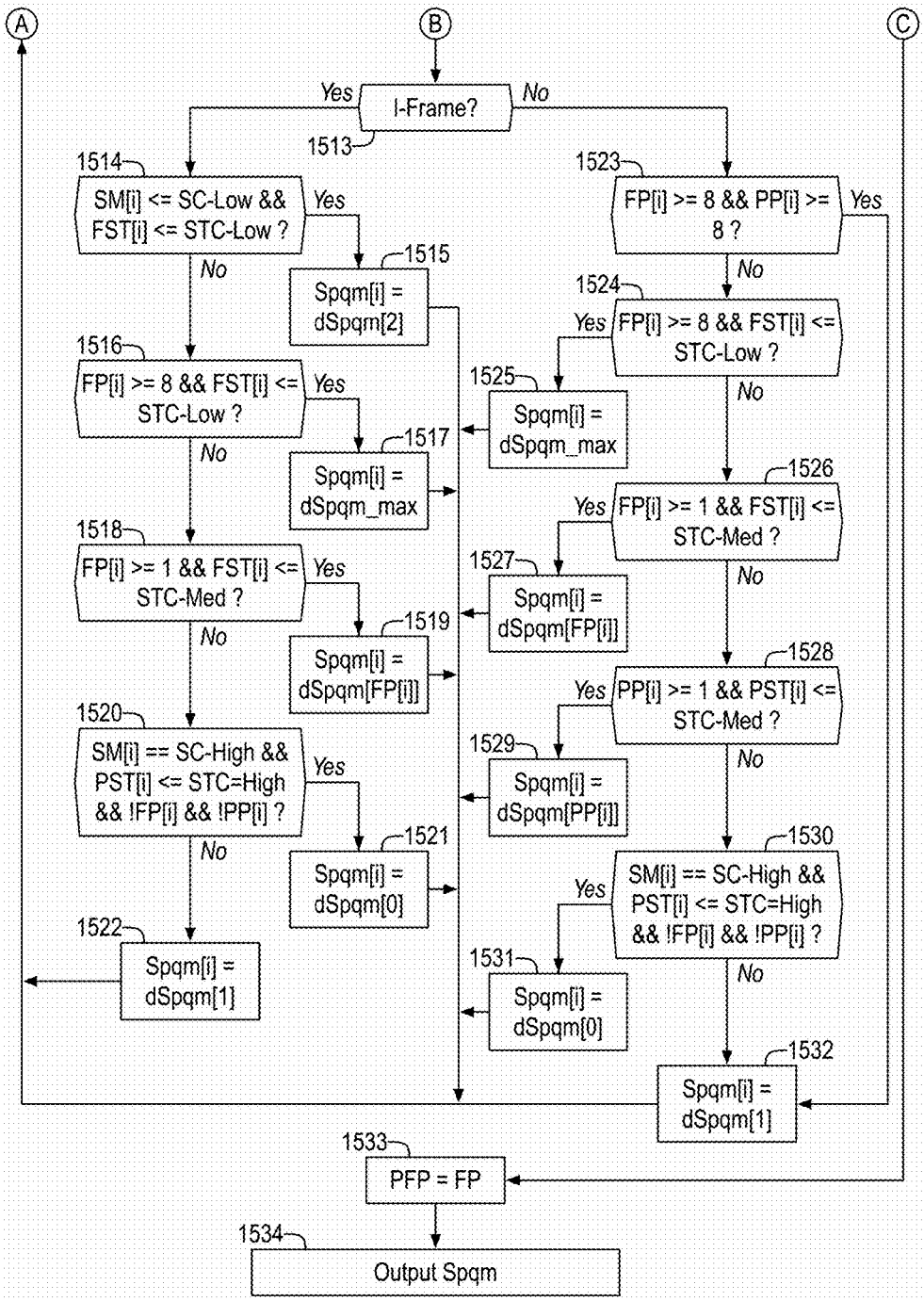

FIGS. 15A and 15B illustrates an example process 1500 for persistence analysis and quality adaptation, arranged in accordance with at least some implementations of the present disclosure. Process 1500 may include one or more operations 1501-1534 as illustrated in FIG. 15.

As shown, process 1500 may begin at operation 1501, where a group of picture size (gopsz), a picture type (pictyp), spatio-temporal complexity (stc), and motion vectors (mv) may be input. Process 1500 may continue at operation 1502, where spatial complexity maps may be generated as discussed herein for each picture in a group of pictures. For example, the spatial complexity maps may include a spatial complexity value for each block of each picture. Process 1500 may continue at operation 1503, where motion complexity maps may be generated as discussed herein for each picture in the group of pictures. For example, the motion complexity maps may include a motion complexity value for each block of each picture.

Process 1500 may continue at operation 1504, where a past gopsz distance spatio-temporal complexity map (e.g., with respect to a picture at a size of the GOP distance in the past from the current picture) may be determined. Process 1500 may continue at operation 1505, where a future gopsz distance spatio-temporal complexity map (e.g., with respect to a picture at a size of the GOP distance in the future from the current picture) may be determined.

Process 1500 may continue at operation 1506, where a loop may be started that cycles through each block (e.g., LCU) of the current picture. When complete, the loop may break and processing may continue at operation 1533 as discussed below. Process 1500 may continue at operation 1507, where a loop may be started that cycles through each picture (e.g., frm) in the current group of pictures in the past with respect to the current picture. When complete, the loop may break and processing may continue at operation 1510 as discussed below. Process 1500 may continue at operation 1508, where a determination may be made as to whether the spatio-temporal complexity map for the current picture with respect to the GOP in the past being processed indicates a low complexity and the motion complexity map for the current picture with respect to the GOP in the past being processed indicates a low complexity. If not, processing may continue at operation 1510 as discussed below. If so, process 1500 may continue at operation 1509, where past persistence may be incremented. Operations 1507 may determine the past persistence of the current picture or blocks of the current picture.

Process 1500 may continue from operation 1507 or operation 1508 at operation 1510, where a loop may be started that cycles through each picture (e.g., frm) in the current group of pictures in the future with respect to the current picture. When complete, the loop may break and processing may continue at operation 1513 as discussed below. Process 1500 may continue at operation 1511, where a determination may be made as to whether the spatio-temporal complexity map for the current picture with respect to the GOP in the future being processed indicates a low complexity and the motion complexity map for the current picture with respect to the GOP in the future being processed indicates a low complexity. If not, processing may continue at operation 1513 as discussed below. If so, process 1500 may continue at operation 1512, where future persistence may be incremented. Operations 1507 may determine the future persistence of the current picture or blocks of the current picture.

Process 1500 may continue from operation 1510 or operation 1511 at operation 1513, where a determination may be made as to whether the current frame is an I-frame or picture.

If so, process 1500 may continue at operation 1514, where a determination may be made as to whether the spatial complexity map (SM) indicates the current block (i) has less than or equal to low spatial complexity and the future gopsz distance spatio-temporal complexity map (FST) indicates less than or equal to low complexity for the block. If so, process 1500 may continue at operation 1515, where the persistent quality sensitivity value for the block may be set to dSpqm[2] (−1, please see Table 8).

If not, process 1500 may continue at operation 1516, where a determination may be made as to whether the future persistence (FP) indicates the current block (i) has a future persistence that meets or exceeds 8 pictures and the future gopsz distance spatio-temporal complexity map (FST) indicates less than or equal to low complexity for the block. If so, process 1500 may continue at operation 1517, where the persistent quality sensitivity value for the block may be set to dSpqm_max (a maximum value such as −6).

If not, process 1500 may continue at operation 1518, where a determination may be made as to whether the future persistence (FP) indicates the current block (i) has a future persistence that meets or exceeds 1 picture and the future gopsz distance spatio-temporal complexity map (FST) indicates less than or equal to medium complexity for the block. If so, process 1500 may continue at operation 1519, where the persistent quality sensitivity value for the block may be set to the future persistence (FP) for the current block, dSpqm[FP[i]] (please see Table 8).

If not, process 1500 may continue at operation 1520, where a determination may be made as to whether the spatial complexity map (SM) indicates the current block (i) has high complexity and the past gopsz distance spatio-temporal complexity map (PST) indicates less than or equal to high complexity for the block and there is no future persistence (FP) for the current block (i) and there is no past persistence (PP) for the current block (i). If so, process 1500 may continue at operation 1521, where the persistent quality sensitivity value for the block may be set to a maximum value, dSpqm[0] (+1, please see Table 8).

If not, process 1500 may continue at operation 1522, where the persistent quality sensitivity value for the block may be set to dSpqm[1] (0, a default value, please see Table 8).

Returning to operation 1513, if the determination is that the current picture is not an I-frame or picture, process 1500 may continue at operation 1523, where a determination may be made as to whether the future persistence (FP) indicates the current block (i) has a future persistence that meets or exceeds 8 pictures and the past persistence (PP) indicates the current block (i) has a past persistence that meets or exceeds 8 pictures (e.g., the block has persistence continuity). If so process 1500 may continue at operation 1532, where the persistent quality sensitivity value for the block may be set to dSpqm[1] (0, please see Table 8).

If not, process 1500 may continue at operation 1524, where a determination may be made as to whether the future persistence (FP) indicates the current block (i) has a persistence that meets or exceeds 8 pictures and the future gopsz distance spatio-temporal complexity map (FST) indicates less than or equal to low complexity for the block. If so, process 1500 may continue at operation 1525, where the persistent quality sensitivity value for the block may be set to dSpqm_max (a maximum value such as −6).

If not, process 1500 may continue at operation 1526, where a determination may be made as to whether the future persistence (FP) indicates the current block (i) has a persistence that meets or exceeds 1 picture and the future gopsz distance spatio-temporal complexity map (FST) indicates less than or equal to medium complexity for the block. If so, process 1500 may continue at operation 1527, where the persistent quality sensitivity value for the block may be set to the future persistence (FP) for the current block, dSpqm [FP[i]] (please see Table 8).

If not, process 1500 may continue at operation 1528, where a determination may be made as to whether the past persistence (PP) indicates the current block (i) has a persistence that meets or exceeds 1 picture and the past gopsz distance spatio-temporal complexity map (PST) indicates less than or equal to medium complexity for the block. If so, process 1500 may continue at operation 1529, where the persistent quality sensitivity value for the block may be set to the past persistence (PP) for the current block, dSpqm[PP[i]] (please see Table 8).

If not, process 1500 may continue at operation 1530, where a determination may be made as to whether the spatial complexity map (SM) indicates the current block (i) has high complexity and the past gopsz distance spatio-temporal complexity map (PST) indicates less than or equal to high complexity for the block and there is no future persistence (FP) for the current block (i) and there is no past persistence (PP) for the current block (i). If so, process 1500 may continue at operation 1532, where the persistent quality sensitivity value for the block may be set to a maximum value, dSpqm[0] (+1, please see Table 8).

If not, process 1500 may continue at operation 1532, where the persistent quality sensitivity value for the block may be set to dSpqm[1] (0, a default value, please see Table 8).

Process 1500 may continue from any of operations 1515, 1517, 1519, 1521, 1523, 1525, 1527, 1529, or 1531 at operation 1533, where a saved future persistence may be set to the current future persistence.

Process 1500 may continue at operation 1534, where the persistence sensitivity values ($S_{pqm}$) such as a persistence sensitivity value map or persistent quality map (pqm) may be output for further processing.

Process 1500 or portions thereof may be performed any number of times for any number of blocks, pictures, groups of pictures, video sequences or the like.

Figure 16:
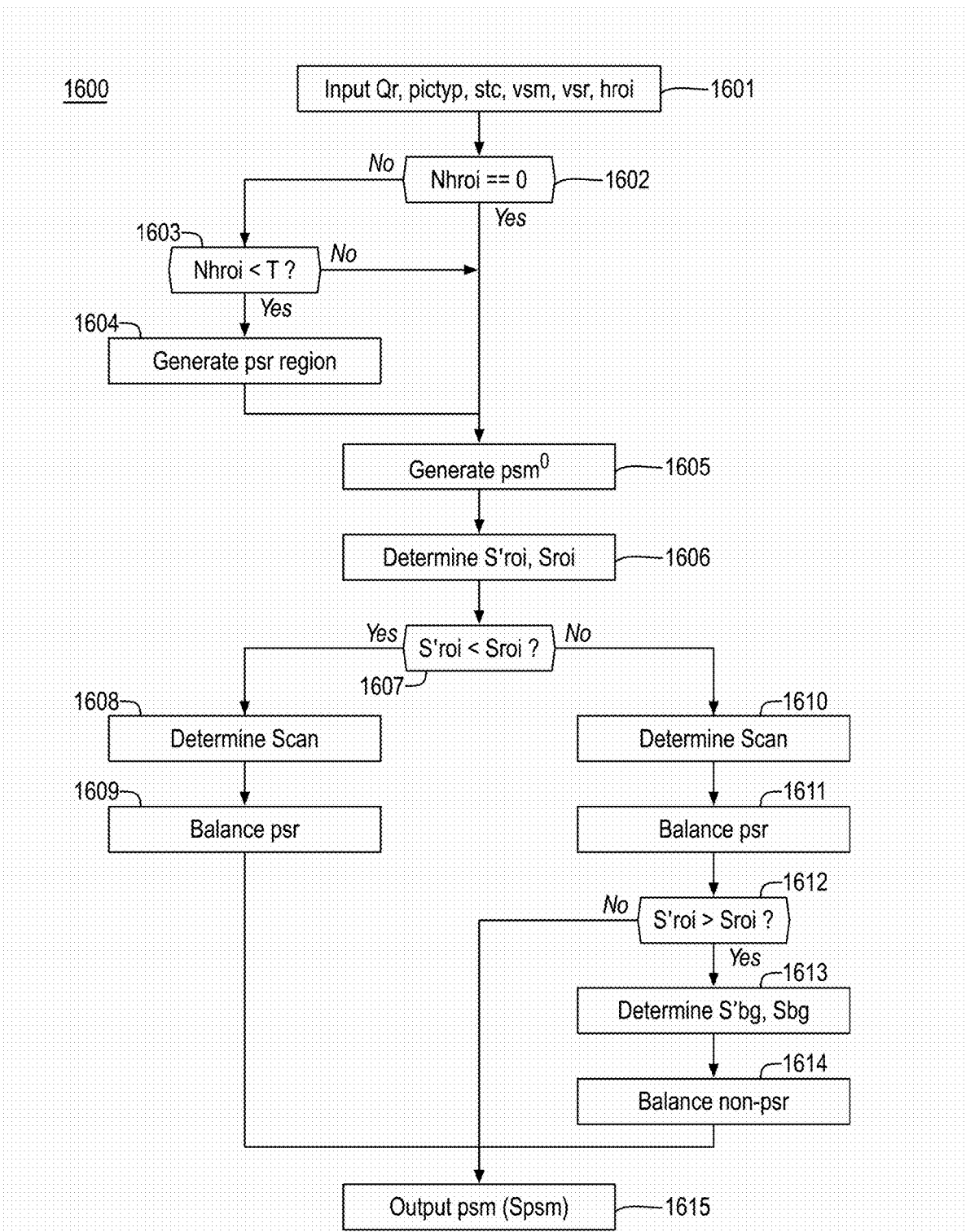
FIG. 16 illustrates an example process for psychovisual modulation.

FIG. 16 illustrates an example process 1600 for psychovisual modulation, arranged in accordance with at least some implementations of the present disclosure. Process 1600 may include one or more operations 1601-1615 as illustrated in FIG. 16.

As shown, process 1600 may begin at operation 1601, where a reference quantizer (Qr), a picture type (pictyp), spatio-temporal complexity (stc), a visual sensitivity map (vsm), visual sensitivity region map (vsr) (e.g., a visual sensitivity block map), and a human region of interest block map (hroi) may be input. Process 1600 may continue at operation 1602, where a determination may be made as to whether a number of human regions or blocks of interest is zero (e.g., the human region of interest block map has no regions or blocks of interest). If so, process 1600 may continue at operation 1605 as discussed below. If not, process 1600 may continue at operation 1603, where a determination may be made as to whether the a number of human regions or blocks of interest is less than a threshold (T). If not process 1600 may continue at operation 1605 as discussed below. if so, process 1600 may continue at operation 1604, where a psychovisual sensitivity region or block map (psr) may be generated as discussed herein. For example, visual sensitive regions from a visibility sensitivity block map (vsr) may be added to the regions of interest from the human region of interest block map (hroi) in an order of highest sensitivity to lowest until the threshold T is met.

Process 1600 may continue from operation 1602, 1603, or 1604 at operation 1605, where an initial psychovisual sensitivity map (e.g., an unbalanced psm⁰) may be generated as discussed herein. For example, the initial psychovisual sensitivity map may include a psychovisual sensitivity value for each block of the current picture. Process 1600 may continue at operation 1606, where an estimate of average psr area sensitivity ($S'_{roi}$) and a true overage of psr area sensitivity ($S_{roi}$) may be determined as discussed herein with respect to Equations (35) and (36).

Process 1600 may continue at operation 1607, where a determination may be made as to whether the estimate of average psr area sensitivity is less than the true overage of psr area sensitivity. If so, process 1600 may continue at operation 1608, where a scan pattern may be determined (e.g., causal raster scan, anti-causal raster scan, centroid spiral scan, or anti-centroid spiral scan) and operation 1609, where bitrate may be balanced in the psychovisual sensitivity regions of interest based on the psychovisual sensitivity region or block map by adjusting sensitivity values within the psychovisual sensitivity regions of interest in the visual sensitivity map (vsm).

If not, process 1600 may continue at operation 1610, where a scan pattern may be determined (e.g., causal raster scan, anti-causal raster scan, centroid spiral scan, or anti-centroid spiral scan) and operation 1611, where bitrate may be balanced in the psychovisual sensitivity regions of interest based on the psychovisual sensitivity region or block map by adjusting sensitivity values within the psychovisual sensitivity regions of interest in the visual sensitivity map (vsm). Process 1600 may continue at operation 1612, where a determination may be made as to whether the estimate of average psr area sensitivity is less than the true overage of psr area sensitivity. If not, process 1600 may continue at operation 1615 as discussed below. If so, process 1600 may continue at operation 1613, where an an estimate of a background bitrate ($R'_{bg}$) and a true overage of background bitrate ($R_{bg}$) may be determined as discussed herein. Process 1600 may continue at operation 1614, where bitrate may be balanced in the non-psychovisual sensitivity regions of interest based on the psychovisual sensitivity region or block map by adjusting sensitivity values within the non-psychovisual sensitivity regions of interest in the visual sensitivity map (vsm).

Process 1600 may continue from operation 1609, 1612, or 1614 at operation 1615, where the modified psychovisual sensitivity map (psm) may be output. For example, the modified psychovisual sensitivity map (psm) may include a psychovisual sensitivity value for each block of the current picture.

Process 1600 or portions thereof may be performed any number of times for any number of blocks, pictures, groups of pictures, video sequences or the like.

Figure 17:
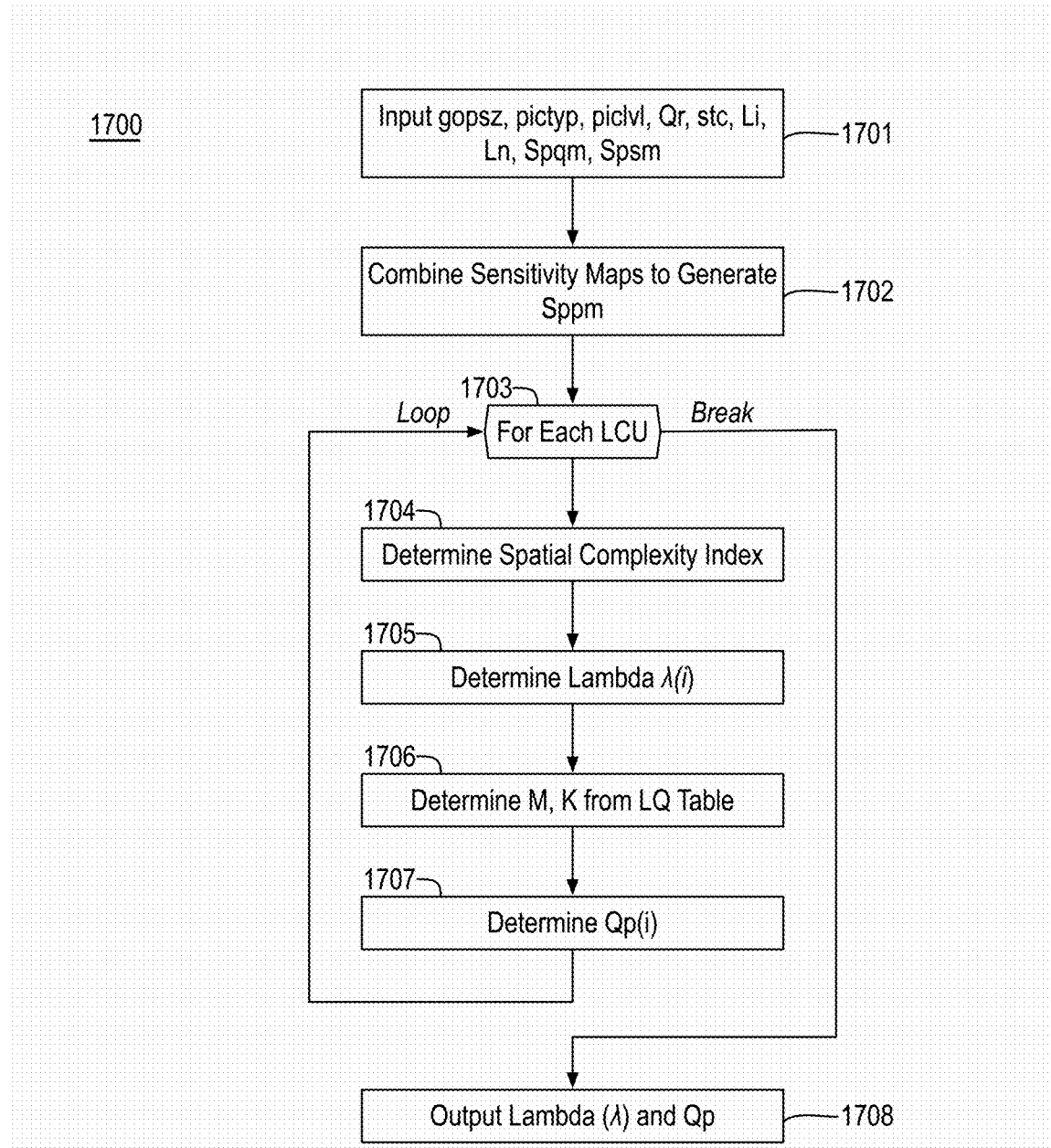
FIG. 17 illustrates an example process for content adaptive quantization processing.

FIG. 17 illustrates an example process 1700 for content adaptive quantization processing, arranged in accordance with at least some implementations of the present disclosure. Process 1700 may include one or more operations 1701-1708 as illustrated in FIG. 17.

As shown, process 1700 may begin at operation 1701, where a group of pictures size (gopsz), a picture type (pictyp), a picture level (piclvl), a reference quantizer (Qr), spatio-temporal complexity (stc), a lambda factor (L), persistence sensitivity values ($S_{pqm}$) (e.g., via a persistence sensitivity map (pqm)), and psychovisual sensitivity values ($S_{psm}$) (e.g., via a psychovisual sensitivity map (psm)) may be input. Process 1700 may continue at operation 1702, where the persistence sensitivity map (pqm) and the psychovisual sensitivity map (psm) may be combined (e.g., by adding) to generate a combined psychovisual and persistence map (ppm) having combined psychovisual and persistence sensitivity values ($S_{ppm}$) for each block of the current picture.

Process 1700 may continue at operation 1703, where a loop may be started that cycles through each block (e.g., LCU) of the current picture. When complete, the loop may break and processing may continue at operation 1708 as discussed below. Process 1700 may continue at operation 1704, where a spatial complexity index may be determined for the current block. For example, a spatial complexity value may be determined for the current block and the spatial complexity value may be converted to a spatial complexity index for the current block as discussed herein.

Process 1700 may continue at operation 1705, where an adaptive rate distortion optimization Lagrange multiplier (lambda, $\lambda$). The adaptive rate distortion optimization Lagrange multiplier may be determined using any techniques discussed herein such as those discussed with respect to Tables 11 and 12 and Equations (44)-(46). Process 1700 may continue at operation 1706, where adaptive parameters (e.g., M and K) may be determined for the current using any techniques discussed herein such as those discussed with respect to Tables 13 and 14. Process 1700 may continue at operation 1707, where a quantization parameter (Qp) may be determined for the current block using any techniques discussed herein such as those discussed with respect to Equation (47).

Process 1700 may continue from operation 1703 after the completion of processing for each block of the current picture at operation 1708, where the adaptive rate distortion optimization Lagrange multipliers and the quantization parameter for each block may be output for further processing. For example, the adaptive rate distortion optimization Lagrange multipliers and the quantization parameter for each block may be used for encoding as discussed herein.

Process 1700 or portions thereof may be performed any number of times for any number of blocks, pictures, groups of pictures, video sequences or the like.

Figure 18:
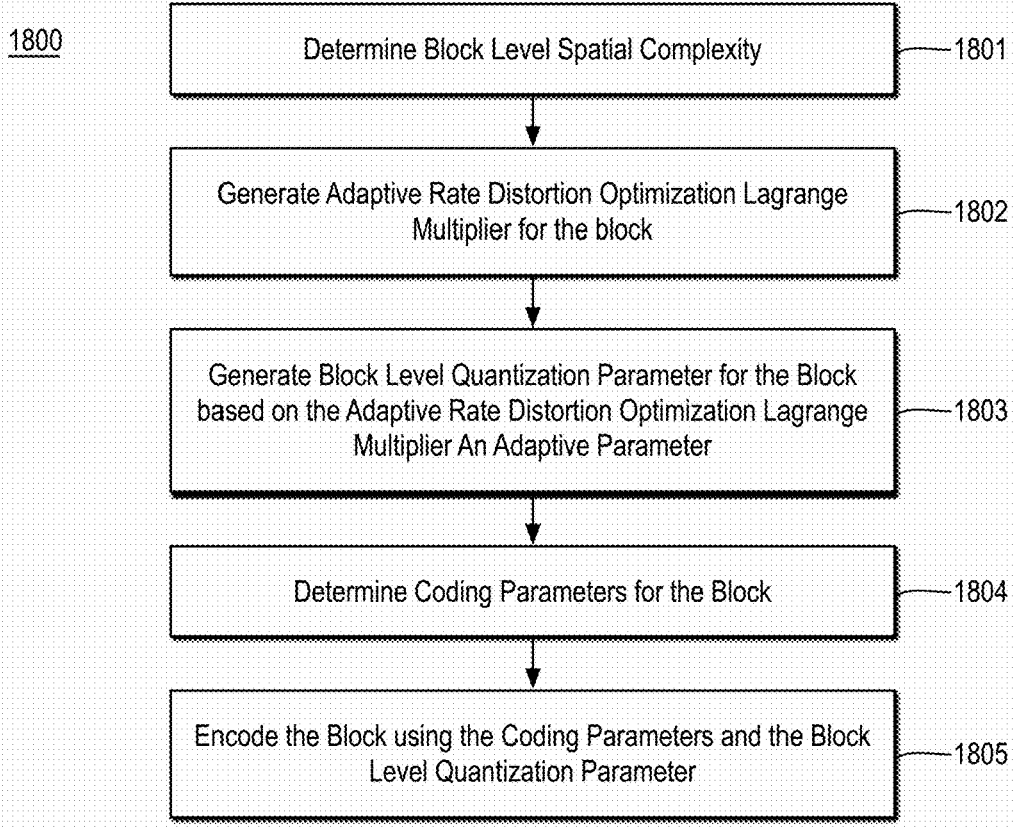
FIG. 18 is a flow diagram illustrating an example process for video coding.

FIG. 18 is a flow diagram illustrating an example process 1800 for video coding, arranged in accordance with at least some implementations of the present disclosure. Process 1800 may include one or more operations 1801-1806 as illustrated in FIG. 18. Process 1800 may form at least part of a video coding process. Furthermore, process 1800 will be described with reference to system 1900 of FIG. 19. For example, process 1800 or portions thereof may be performed by system 1900.

Figure 19:
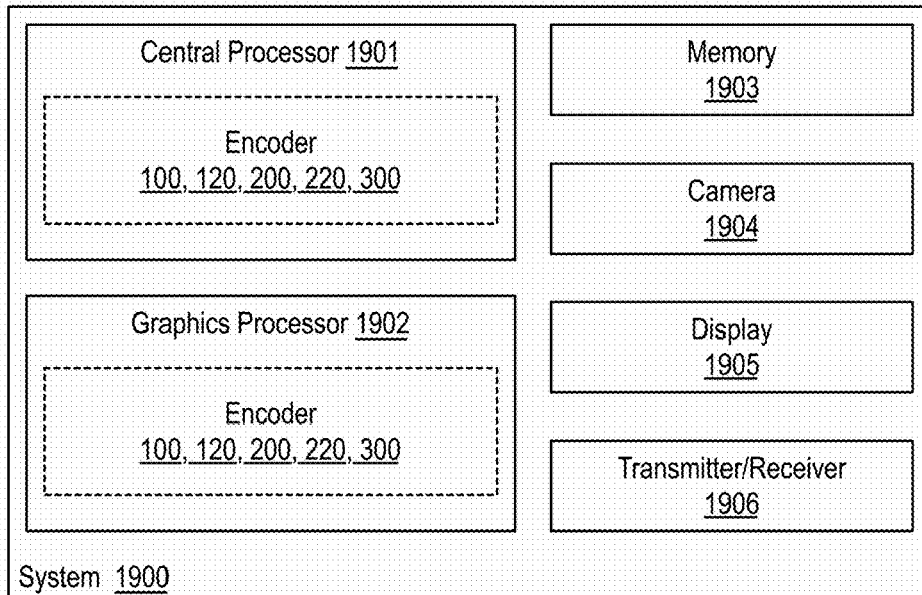
FIG. 19 is an illustrative diagram of an example system for video coding.

FIG. 19 is an illustrative diagram of an example system 1900 for video coding, arranged in accordance with at least some implementations of the present disclosure. For example, system 1900 may perform one or more operations discussed with respect to any process or system or any other operations discussed herein. As shown in FIG. 19, system 1900 may include a central processor 1901, a graphics processor 1902, a memory 1903, a camera 1904, a display 1905, and a transmitter/receiver 1906. In some embodiments system 1900 may not include camera 1904, display 1905, and/or transmitter/receiver 1906. As shown, central processor 1901 and/or graphics processor 1902 may implement one or more or combinations of video encoders 100, 120, 200, 220, 300. Video encoders 100, 120, 200, 220, 300 may include any components, systems, or the like as discussed herein or combinations thereof. In the example of system 1900, memory 1903 may store picture data, picture parameters, lambda factors, lambda, quantization parameters, or any related data such as any other data discussed herein.

As shown, in some embodiments, one or more or combinations of video encoders 100, 120, 200, 220, 300 may be implemented via central processor 1901. In other embodiments, one or more or combinations of video encoders 100, 120, 200, 220, 300 may be implemented via graphics processor 1902. In yet other embodiments, one or more or combinations of video encoders 100, 120, 200, 220, 300 may be implemented by a video processing unit, a video processing pipeline, or the like. In some embodiments, one or more or combinations of video encoders 100, 120, 200, 220, 300 may be implemented in hardware as a system-on-a-chip (SoC).

Graphics processor 1902 may include any number and type of graphics processing units that may provide the operations as discussed herein. Such operations may be implemented via software or hardware or a combination thereof. For example, graphics processor 1902 may include circuitry dedicated to manipulate and/or analyze images or frames obtained from memory 1903. Central processor 1901 may include any number and type of processing units or modules that may provide control and other high level functions for system 1900 and/or provide any operations as discussed herein. Memory 1903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1903 may be implemented by cache memory. In an embodiment, one or more or portions of video encoders 100, 120, 200, 220, 300 may be implemented via an execution unit (EU) of graphics processor 1902 or another processor. The EU may include, for example, programmable logic or circuitry such as a logic core or cores that may provide a wide array of programmable logic functions. In an embodiment, one or more or portions of video encoders 100, 120, 200, 220, 300 may be implemented via dedicated hardware such as fixed function circuitry or the like. Fixed function circuitry may include dedicated logic or circuitry and may provide a set of fixed function entry points that may map to the dedicated logic for a fixed purpose or function. Camera 1904 may be any suitable camera or device that may obtain image or frame data for processing as discussed herein. Display 1905 may be any display or device that may present image or frame data. Transmitter/receiver 1906 may include any suitable transmitter and/or receiver that may transmit or receive bitstream data as discussed herein.

System 1900 may implement any devices, systems, modules, units, or the like as discussed herein. Furthermore, system 1900 may implement any processes, operations, or the like as discussed herein. System 1900 may have any suitable form factor. For example, system 1900 may be implemented by a camera, a smartphone, an ultrabook, a tablet, a wearable device, a monitor, a desktop computer, a set top box, or the like.

Returning to discussion of FIG. 18, process 1800 may begin at operation 1801, where a block level spatial complexity may be determined for a block of a current picture of a video sequence. The block level spatial complexity may be determined using any suitable technique or techniques.

Processing may continue at operation 1802, where an adaptive rate distortion optimization Lagrange multiplier may be generated for the block based at least in part on a spatial complexity of a group of pictures comprising the current picture, a temporal complexity of the group of pictures, and a level of the current picture in a hierarchical pyramid of the group of pictures. The adaptive rate distortion optimization Lagrange multiplier may be generated for the block using any suitable technique or techniques. In an embodiment, process 1800 further includes determining an adaptive lambda factor based on the spatial complexity of the group of pictures, the temporal complexity of the group of pictures, and the level of the current picture in the hierarchical pyramid of the group of pictures such that generating the adaptive rate distortion optimization Lagrange multiplier includes determining a product of the adaptive lambda factor and an exponential of a base raised to a value comprising a reference quantization parameter.

The adaptive lambda factor may be determined using any suitable technique or techniques. In an embodiment, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value such that the first value is less than the second value and the second value is less than the third value. In an embodiment, process 1800 further includes, when the temporal complexity is greater than a product of the spatial complexity and a first constant less a second constant and the spatial complexity is greater than a third constant, indicating the group of pictures is a high complexity group of pictures, when the temporal complexity is not greater than the product of the spatial complexity and the first constant less the second constant and the spatial complexity is greater than the third constant, indicating the group of pictures is a medium complexity group of pictures, and when the temporal complexity is less than the spatial complexity less the third constant and the spatial complexity is not greater than the third constant, indicating the group of pictures is a low complexity group of pictures.

As discussed herein, in some embodiments, the adaptive rate distortion optimization Lagrange multiplier is generated based on a psychovisual sensitivity value, a persistence sensitivity value, or the like. In an embodiment, process 1800 further includes determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block. For example, generating the adaptive rate distortion optimization Lagrange multiplier may include determining a product of an adaptive lambda factor and an exponential of a constant raised to a value comprising the psychovisual and persistence sensitivity value.

The psychovisual sensitivity value and the persistence sensitivy value may be combined using any suitable technique or techniques. In an embodiment, combining the psychovisual sensitivity value and the persistence sensitivity value includes summing the psychovisual value and the persistence sensitivity value to generate the psychovisual and persistence sensitivity value.

As discussed herein, in some embodiments, generating the adaptive rate distortion optimization Lagrange multiplier includes determining a product of an adaptive lambda factor and an exponential of a base raised to a value comprising the psychovisual and persistence sensitivity value.

The psychovisual sensitivity value may be determined using any suitable technique or techniques. In an embodiment, determining the psychovisual sensitivity value for the block includes generating a black level mask for the current picture, the black level mask indicating, on a block by block basis, whether blocks of the current picture have an average luminance less than a threshold, generating a luminance sensitivity value for each block of the current picture, generating a contrast sensitivity value for each block of the current picture, and generating a visual sensitivity map including, for each block of the current picture, either a visual sensitivity value for the block when the black level mask does not mask the block or a null value when the black level mask does mask the block such that the visual sensitivity value for the block is a sum of the luminance sensitivity value and the contrast sensitivity value.

In an embodiment, determining the psychovisual sensitivity value for the block includes generating an initial psychovisual sensitivity map for the current picture, the initial psychovisual sensitivity map including, for each block of the current picture, a psychovisual sensitivity value, determining a human region of interest block map and a visibility sensitivity block map for the current picture, combining the human region of interest block map and the visibility sensitivity block map to provide a psychovisual regions of interest block map, the psychovisual regions of interest block map including, for each block of the current picture, an indicator of whether the block is fully in a region of interest, partially in a region of interest, or not in a region of interest, and modulating the initial psychovisual sensitivity map based on the psychovisual regions of interest block map to provide a final psychovisual sensitivity map, the final psychovisual sensitivity map including the psychovisual and persistence sensitivity value for the block.

For example, combining the human region of interest bock map and the visibility sensitivity bock map may include, when a number of human region of interest blocks in the human region of interest bock map exceeds or meets a threshold, the psychovisual regions of interest block map matches the human region of interest map, and when the number of human region of interest blocks in the human region of interest bock map does not meet the threshold, the psychovisual regions of interest block map includes the human region of interest blocks and at least one region from the visibility sensitivity bock map having a maximum sensitivity of the regions of the visibility sensitivity bock map. Furthermore, modulating the initial psychovisual sensitivity map based on the psychovisual regions of interest block map may include increasing a first sensitivity of a first block of the initial psychovisual sensitivity map that is a region of interest in the psychovisual regions of interest block map and decreasing a second sensitivity of a second block of the initial psychovisual sensitivity map that is a region of no interest in the psychovisual regions of interest block map.

Furthermore, the persistence sensitivity value may be determined using any suitable technique or techniques. In an embodiment, determining the persistence sensitivity value for the block includes determining, for the block, whether the block has persistence continuity such that the block has co-located regions of low spatio-temporal complexity and low motion complexity in one or more past and future pictures of the video sequence and, when the block has persistence continuity, setting the persistence sensitivity value for the block to zero.

In an embodiment, determining the persistence sensitivity value for the block includes determining, for the block, whether the block has forward persistence continuity such that the block has co-located regions of low spatio-temporal complexity and low motion complexity in a number future pictures of the video sequence through a number of pictures in the group of pictures, determining a spatio-temporal complexity for the block based on a future picture that is the number of pictures in the group of pictures in the future with respect to the current frame, and, when the spatio-temporal complexity for the block based on the future picture indicates low complexity and the block has forward persistence continuity, setting the persistence sensitivity value for the block to a first value and, when the spatio-temporal complexity for the block based on the future picture indicates medium complexity and the block has forward persistence continuity, setting the persistence sensitivity value for the block to a second value greater than the first value.

Processing may continue at operation 1803, where a block level quantization parameter may be generated for the block based on the adaptive rate distortion optimization Lagrange multiplier and at least one adaptive parameter based on the picture type of the current picture, the level of the current picture in the pyramid hierarchy, and the block level spatial complexity of the block. The block level quantization parameter may be generated using any suitable technique or techniques. In an embodiment, generating the block level quantization parameter includes summing the at least one adaptive parameter and a product of a log of the adaptive rate distortion optimization Lagrange multiplier and a second adaptive parameter such that the at least one adaptive parameter and the second adaptive parameter are both based on the picture type of the current picture, the level of the current picture in the pyramid hierarchy, and the block level spatial complexity of the block.

The at least one adaptive parameter and the second adaptive parameter may be generated using any suitable technique or techniques. In an embodiment, the at least one adaptive parameter and the second adaptive parameter may be generated by accessing tables as discussed herein. In an embodiment, the picture type is a P-picture type and determining the at least one adaptive parameter and the second adaptive parameter includes, when the spatial complexity is a first value, setting the at least one adaptive parameter and the second adaptive parameter to second and third values, respectively, and, when the spatial complexity is a fourth value, setting the at least one adaptive parameter and the second adaptive parameter to fifth and sixth values, respectively, such that the first value is less than the fourth value, the second value is greater than the fifth value, and the third value is less that the sixth value.

Processing may continue at operation 1804, where coding parameters may be determined for the block based at least in part on a rate distortion optimization using the adaptive rate distortion optimization Lagrange multiplier and the block level quantization parameter. The coding parameters may include any suitable coding parameters discussed herein and the rate distortion optimization may be performed using any suitable technique or techniques. In an embodiment, determining the coding parameters for the block includes performing an exhaustive or an adaptive rate distortion optimization search for the block using the rate distortion optimization Lagrange multiplier and the quantization parameter.

Processing may continue at operation 1805, where the block may be encoded using the coding parameters and the block level quantization parameter into a bitstream. The block may be encoded using any suitable technique or techniques. The bitstream may be any suitable bitstream such as a standards compliant bitstream.

Process 1800 may be performed in series or at least partially in parallel for any number of blocks, video frames, video sequences, or the like. In an embodiment, such processing includes determining, for each block of the current picture, a block level spatial complexity for the block, determining, for each block of the current picture, a psychovisual and persistence sensitivy value for the block to generate a psychovisual and persistence map for the current picture, determining, for each block of the current picture, an adaptive rate distortion optimization Lagrange multiplier based at least in part on the corresponding block level spatial complexity and psychovisual and persistence sensitivy value, and determining, for each block of the current picture, coding parameters for each block based at least in part on the corresponding adaptive rate distortion optimization Lagrange multiplier such that each block is one of a largest coding unit or a coding unit of the current picture and the bitstream is an HEVC compliant bitstream.

As discussed, such operations may be performed by system 1900 or any other system discussed herein. For example, memory 1903 may store the current picture of the video sequence (and any other suitable data) and central processor 1901 and/or graphics processor 1902 may perform any operation discussed with respect to process 1800.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

The techniques discussed herein may provided improved coding results (e.g., in decoded video) such as additional detail or texture in psychovisually important regions including background areas (e.g., grass areas and road areas), face and skin areas, etc. The techniques discussed herein may provide, for example: combining lambda and adaptive quantization for HEVC encoding; combining persistence and adaptive quantization for HEVC encoding; psycho-visual lambda quantization without HROI for HEVC encoding; psycho-visual quantization with HROI for HEVC encoding; content adaptive lambda and quantization pairing for high efficiency HEVC/AVC video encoding; psychovisual sensitivity and persistence based modulation of a CALQ pair for better visual quality; content analysis based adaptive lambda factor for HEVC encoding; spatio-temporal complexity based GOP discriminant functions used to classify GOPs; automatically generating a psr region based wholly or in part using visual sensitivity and HROI; of bitrate balancing of psr using sensitivity and complexity; causality and attention based scanning of ROI for improved compression efficiency and video quality; persistence adaptive quality based on spatio-temporal complexity; and content analysis based adaptive lambda to Qp control for highly efficient HEVC encoding.

Figure 20:
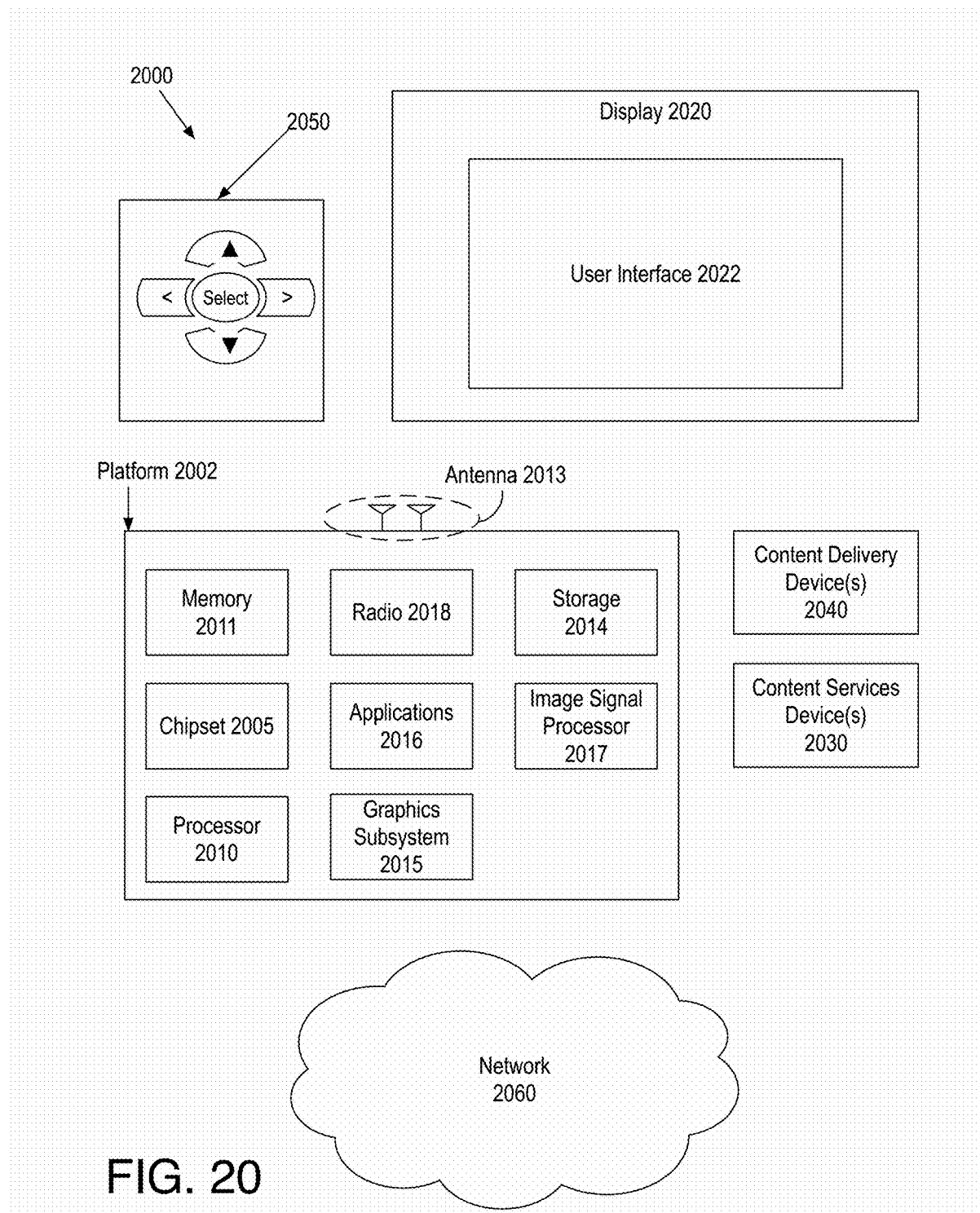
FIG. 20 is an illustrative diagram of an example system.

FIG. 20 is an illustrative diagram of an example system 2000, arranged in accordance with at least some implementations of the present disclosure. In various implementations, system 2000 may be a mobile device system although system 2000 is not limited to this context. For example, system 2000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2000 includes a platform 2002 coupled to a display 2020. Platform 2002 may receive content from a content device such as content services device(s) 2030 or content delivery device(s) 2040 or other content sources such as image sensors 2019. For example, platform 2002 may receive image data as discussed herein from image sensors 2019 or any other content source. A navigation controller 2050 including one or more navigation features may be used to interact with, for example, platform 2002 and/or display 2020. Each of these components is described in greater detail below.

In various implementations, platform 2002 may include any combination of a chipset 2005, processor 2010, memory 2011, antenna 2013, storage 2014, graphics subsystem 2015, applications 2016, image signal processor 2017 and/or radio 2018. Chipset 2005 may provide intercommunication among processor 2010, memory 2011, storage 2014, graphics subsystem 2015, applications 2016, image signal processor 2017 and/or radio 2018. For example, chipset 2005 may include a storage adapter (not depicted) capable of providing intercommunication with storage 2014.

Processor 2010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2010 may be dual-core processor(s), dual-core mobile processor(s), and so forth.

Memory 2011 may be implemented as a volatile memory device such as, but not limited to, a Random Access Memory (RAM), Dynamic Random Access Memory (DRAM), or Static RAM (SRAM).

Storage 2014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2014 may include technology to increase the storage performance enhanced protection for valuable digital media when multiple hard drives are included, for example.

Image signal processor 2017 may be implemented as a specialized digital signal processor or the like used for image processing. In some examples, image signal processor 2017 may be implemented based on a single instruction multiple data or multiple instruction multiple data architecture or the like. In some examples, image signal processor 2017 may be characterized as a media processor. As discussed herein, image signal processor 2017 may be implemented based on a system on a chip architecture and/or based on a multi-core architecture.

Graphics subsystem 2015 may perform processing of images such as still or video for display. Graphics subsystem 2015 may be a graphics processing unit (GPU) or a visual processing unit (VPU), for example. An analog or digital interface may be used to communicatively couple graphics subsystem 2015 and display 2020. For example, the interface may be any of a High-Definition Multimedia Interface, DisplayPort, wireless HDMI, and/or wireless HD compliant techniques. Graphics subsystem 2015 may be integrated into processor 2010 or chipset 2005. In some implementations, graphics subsystem 2015 may be a stand-alone device communicatively coupled to chipset 2005.

The image and/or video processing techniques described herein may be implemented in various hardware architectures. For example, image and/or video functionality may be integrated within a chipset. Alternatively, a discrete graphics and/or video processor may be used. As still another implementation, the image and/or video functions may be provided by a general purpose processor, including a multi-core processor. In further embodiments, the functions may be implemented in a consumer electronics device.

Radio 2018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2018 may operate in accordance with one or more applicable standards in any version.

In various implementations, display 2020 may include any television type monitor or display. Display 2020 may include, for example, a computer display screen, touch screen display, video monitor, television-like device, and/or a television. Display 2020 may be digital and/or analog. In various implementations, display 2020 may be a holographic display. Also, display 2020 may be a transparent surface that may receive a visual projection. Such projections may convey various forms of information, images, and/or objects. For example, such projections may be a visual overlay for a mobile augmented reality (MAR) application. Under the control of one or more software applications 2016, platform 2002 may display user interface 2022 on display 2020.

In various implementations, content services device(s) 2030 may be hosted by any national, international and/or independent service and thus accessible to platform 2002 via the Internet, for example. Content services device(s) 2030 may be coupled to platform 2002 and/or to display 2020. Platform 2002 and/or content services device(s) 2030 may be coupled to a network 2060 to communicate (e.g., send and/or receive) media information to and from network

2060. Content delivery device(s) 2040 also may be coupled to platform 2002 and/or to display 2020.

Image sensors 2019 may include any suitable image sensors that may provide image data based on a scene. For example, image sensors 2019 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 2019 may include any device that may detect information of a scene to generate image data.

In various implementations, content services device(s) 2030 may include a cable television box, personal computer, network, telephone, Internet enabled devices or appliance capable of delivering digital information and/or content, and any other similar device capable of uni-directionally or bi-directionally communicating content between content providers and platform 2002 and/display 2020, via network 2060 or directly. It will be appreciated that the content may be communicated uni-directionally and/or bi-directionally to and from any one of the components in system 2000 and a content provider via network 2060. Examples of content may include any media information including, for example, video, music, medical and gaming information, and so forth.

Content services device(s) 2030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2002 may receive control signals from navigation controller 2050 having one or more navigation features. The navigation features of navigation controller 2050 may be used to interact with user interface 2022, for example. In various embodiments, navigation controller 2050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2050 may be replicated on a display (e.g., display 2020) by movements of a pointer, cursor, focus ring, or other visual indicators displayed on the display. For example, under the control of software applications 2016, the navigation features located on navigation controller 2050 may be mapped to virtual navigation features displayed on user interface 2022, for example. In various embodiments, navigation controller 2050 may not be a separate component but may be integrated into platform 2002 and/or display 2020. The present disclosure, however, is not limited to the elements or in the context shown or described herein.

In various implementations, drivers (not shown) may include technology to enable users to instantly turn on and off platform 2002 like a television with the touch of a button after initial boot-up, when enabled, for example. Program logic may allow platform 2002 to stream content to media adaptors or other content services device(s) 2030 or content delivery device(s) 2040 even when the platform is turned "off." In addition, chipset 2005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2000 may be integrated. For example, platform 2002 and content services device(s) 2030 may be integrated, or platform 2002 and content delivery device(s) 2040 may be integrated, or platform 2002, content services device(s) 2030, and content delivery device(s) 2040 may be integrated, for example. In various embodiments, platform 2002 and display 2020 may be an integrated unit. Display 2020 and content service device(s) 2030 may be integrated, or display 2020 and content delivery device(s) 2040 may be integrated, for example. These examples are not meant to limit the present disclosure.

In various embodiments, system 2000 may be implemented as a wireless system, a wired system, or a combination of both. When implemented as a wireless system, system 2000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 20.

Figure 21:
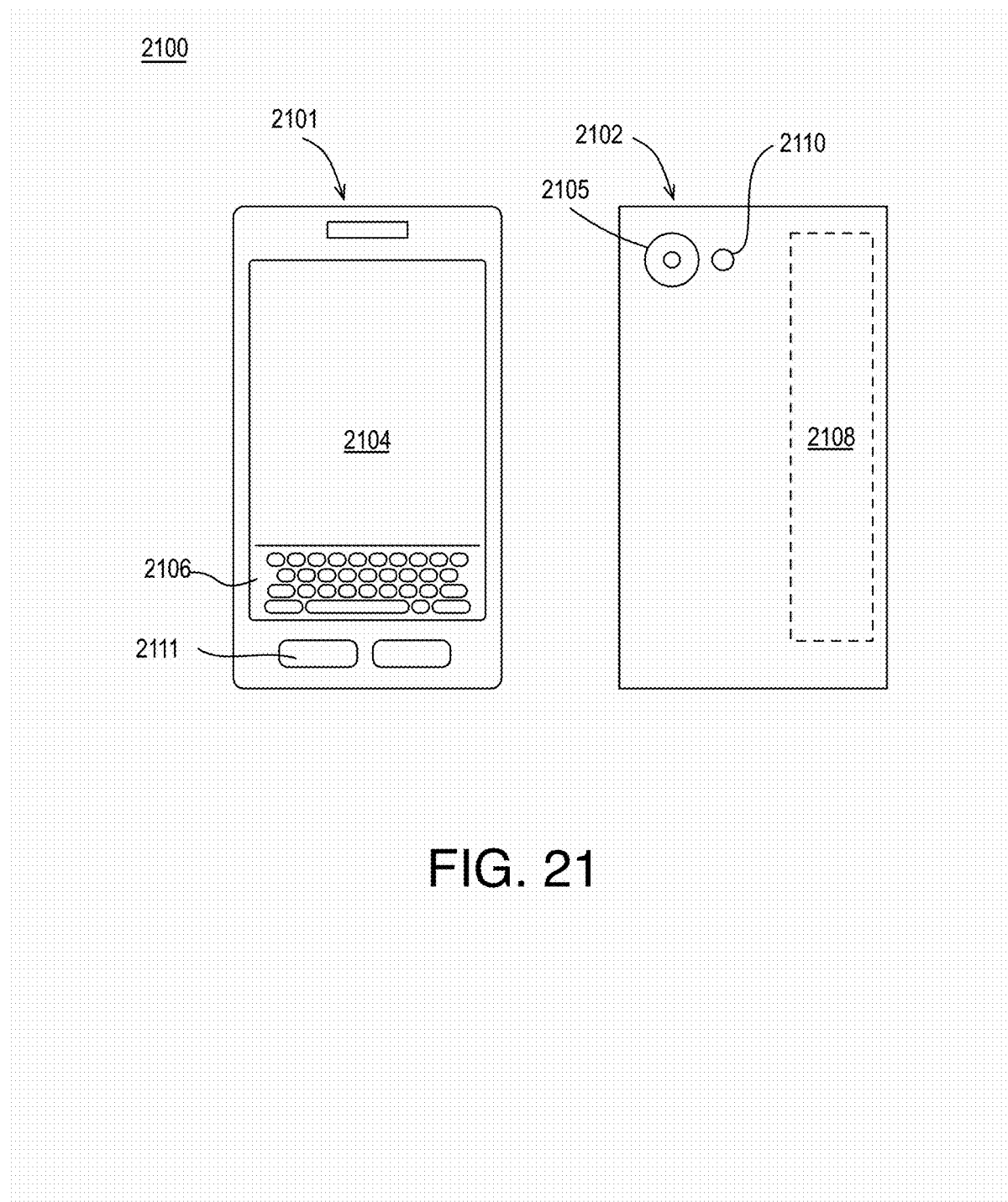
FIG. 21 illustrates an example small form factor device, all arranged in accordance with at least some implementations of the present disclosure.

As described above, system 2000 may be embodied in varying physical styles or form factors. FIG. 21 illustrates an example small form factor device 2100, arranged in accordance with at least some implementations of the present disclosure. In some examples, system 2000 may be implemented via device 2100. In various embodiments, for example, device 2100 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 21, device 2100 may include a housing with a front 2101 and a back 2102. Device 2100 includes a display 2104, an input/output (I/O) device 2106, and an integrated antenna 2108. Device 2100 also may include navigation features 2111. I/O device 2106 may include any suitable I/O device for entering information into a mobile computing device. Examples for I/O device 2106 may include an alphanumeric keyboard, a numeric keypad, a touch pad, input keys, buttons, switches, microphones, speakers, voice recognition device and software, and so forth. Information also may be entered into device 2100 by way of microphone (not shown), or may be digitized by a voice recognition device. As shown, device 2100 may include a camera 2105 (e.g., including a lens, an aperture, and an imaging sensor) and a flash 2110 integrated into back 2102 (or elsewhere) of device 2100. In other examples, camera 2105 and/or flash 2110 may be integrated into front 2101 of device 2100 and/or additional cameras (e.g., such that device 2100 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer implemented method for video coding comprises determining a block level spatial complexity for a block of a current picture of a video sequence, generating an adaptive rate distortion optimization Lagrange multiplier for the block based at least in part on a spatial complexity of a group of pictures comprising the current picture, a temporal complexity of the group of pictures, and a level of the current picture in a hierarchical pyramid of the group of pictures, generating a block level quantization parameter for the block based on the adaptive rate distortion optimization Lagrange multiplier and at least one adaptive parameter based on the picture type of the current picture, the level of the current picture in the pyramid hierarchy, and the block level spatial complexity of the block, determining coding parameters for the block based at least in part on a rate distortion optimization using the adaptive rate distortion optimization Lagrange multiplier and the block level quantization parameter, and encoding the block using the coding parameters and the block level quantization parameter into a bitstream.

Further to the first embodiments, generating the block level quantization parameter comprises summing the at least one adaptive parameter and a product of a log of the adaptive rate distortion optimization Lagrange multiplier and a second adaptive parameter such the at least one adaptive parameter and the second adaptive parameter are both based on the picture type of the current picture, the level of the current picture in the pyramid hierarchy, and the block level spatial complexity of the block.

Further to the first embodiments, generating the block level quantization parameter comprises summing the at least one adaptive parameter and a product of a log of the adaptive rate distortion optimization Lagrange multiplier and a second adaptive parameter such the at least one adaptive parameter and the second adaptive parameter are both based on the picture type of the current picture, the level of the current picture in the pyramid hierarchy, and the block level spatial complexity of the block, the picture type is a P-picture type and determining the at least one adaptive parameter and the second adaptive parameter comprises, when the spatial complexity is a first value, setting the at least one adaptive parameter and the second adaptive parameter to second and third values, respectively, and, when the spatial complexity is a fourth value, setting the at least one adaptive parameter and the second adaptive parameter to fifth and sixth values, respectively, such that the first value is less than the fourth value, the second value is greater than the fifth value, and the third value is less that the sixth value.

Further to the first embodiments, the method further comprises determining an adaptive lambda factor based on the spatial complexity of the group of pictures, the temporal complexity of the group of pictures, and the level of the current picture in the hierarchical pyramid of the group of pictures such that generating the adaptive rate distortion optimization Lagrange multiplier comprises determining a product of the adaptive lambda factor and an exponential of a base raised to a value comprising a reference quantization parameter.

Further to the first embodiments, the method further comprises determining an adaptive lambda factor based on the spatial complexity of the group of pictures, the temporal complexity of the group of pictures, and the level of the current picture in the hierarchical pyramid of the group of pictures such that generating the adaptive rate distortion optimization Lagrange multiplier comprises determining a product of the adaptive lambda factor and an exponential of a base raised to a value comprising a reference quantization parameter such that, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, such that the first value is less than the second value and the second value is less than the third value.

Further to the first embodiments, the method further comprises determining an adaptive lambda factor based on the spatial complexity of the group of pictures, the temporal complexity of the group of pictures, and the level of the current picture in the hierarchical pyramid of the group of pictures such that generating the adaptive rate distortion optimization Lagrange multiplier comprises determining a product of the adaptive lambda factor and an exponential of a base raised to a value comprising a reference quantization parameter such that, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, such that the first value is less than the second value and the second value is less than the third value, the method further comprising when the temporal complexity is greater than a product of the spatial complexity and a first constant less a second constant and the spatial complexity is greater than a third constant, indicating the group of pictures is a high complexity group of pictures, when the temporal complexity is not greater than the product of the spatial complexity and the first constant less the second constant and the spatial complexity is greater than the third constant, indicating the group of pictures is a medium complexity group of pictures, and when the temporal complexity is less than the spatial complexity less the third constant and the spatial complexity is not greater than the third constant, indicating the group of pictures is a low complexity group of pictures.

Further to the first embodiments, the method further comprises determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block.

Further to the first embodiments, the method further comprises determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block such that generating the adaptive rate distortion optimization Lagrange multiplier comprises determining a product of an adaptive lambda factor and an exponential of a base raised to a value comprising the psychovisual and persistence sensitivity value.

Further to the first embodiments, the method further comprises determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block such that combining the psychovisual sensitivity value and the persistence sensitivy value comprises summing the psychovisual value and the persistence sensitivy value.

Further to the first embodiments, the method further comprises determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block such that determining the psychovisual sensitivity value for the block comprises generating a black level mask for the current picture, the black level mask indicating, on a block by block basis, whether blocks of the current picture have an average luminance less than a threshold, generating a luminance sensitivity value for each block of the current picture, generating a contrast sensitivity value for each block of the current picture, and generating a visual sensitivity map including, for each block of the current picture, either a visual sensitivity value for the block when the black level mask does not mask the block or a null value when the black level mask does mask the block, such that the visual sensitivity value for the block comprises a sum of the luminance sensitivity value and the contrast sensitivity value.

Further to the first embodiments, the method further comprises determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block such that determining the psychovisual sensitivity value for the block comprises generating an initial psychovisual sensitivity map for the current picture, the initial psychovisual sensitivity map including, for each block of the current picture, a psychovisual sensitivity value, determining a human region of interest block map and a visibility sensitivity block map for the current picture, combining the human region of interest block map and the visibility sensitivity block map to provide a psychovisual regions of interest block map, the psychovisual regions of interest block map including, for each block of the current picture, an indicator of whether the block is fully in a region of interest, partially in a region of interest, or not in a region of interest, and modulating the initial psychovisual sensitivity map based on the psychovisual regions of interest block map to provide a final psychovisual sensitivity map, the final psychovisual sensitivity map including the psychovisual and persistence sensitivity value for the block.

Further to the first embodiments, the method further comprises determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block such that determining the psychovisual sensitivity value for the block comprises generating an initial psychovisual sensitivity map for the current picture, the initial psychovisual sensitivity map including, for each block of the current picture, a psychovisual sensitivity value, determining a human region of interest block map and a visibility sensitivity block map for the current picture, combining the human region of interest block map and the visibility sensitivity block map to provide a psychovisual regions of interest block map, the psychovisual regions of interest block map including, for each block of the current picture, an indicator of whether the block is fully in a region of interest, partially in a region of interest, or not in a region of interest, and modulating the initial psychovisual sensitivity map based on the psychovisual regions of interest block map to provide a final psychovisual sensitivity map, the final psychovisual sensitivity map including the psychovisual and persistence sensitivity value for the block such that combining the human region of interest bock map and the visibility sensitivity bock map comprises when a number of human region of interest blocks in the human region of interest bock map exceeds or meets a threshold, setting the psychovisual regions of interest block map to match the human region of interest map and when the number of human region of interest blocks in the human region of interest bock map does not meet the threshold, setting the psychovisual regions of interest block map to include the human region of interest blocks and at least one region from the visibility sensitivity bock map having a maximum sensitivity of the regions of the visibility sensitivity bock map.

Further to the first embodiments, the method further comprises determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block such that determining the psychovisual sensitivity value for the block comprises generating an initial psychovisual sensitivity map for the current picture, the initial psychovisual sensitivity map including, for each block of the current picture, a psychovisual sensitivity value, determining a human region of interest block map and a visibility sensitivity block map for the current picture, combining the human region of interest block map and the visibility sensitivity block map to provide a psychovisual regions of interest block map, the psychovisual regions of interest block map including, for each block of the current picture, an indicator of whether the block is fully in a region of interest, partially in a region of interest, or not in a region of interest, and modulating the initial psychovisual sensitivity map based on the psychovisual regions of interest block map to provide a final psychovisual sensitivity map, the final psychovisual sensitivity map including the psychovisual and persistence sensitivity value for the block such that modulating the initial psychovisual sensitivity map based on the psychovisual regions of interest block map comprises increasing a first sensitivity of a first block of the initial psychovisual sensitivity map that comprises a region of interest in the psychovisual regions of interest block map and decreasing a second sensitivity of a second block of the initial psychovisual sensitivity map that comprises a region of no interest in the psychovisual regions of interest block map.

Further to the first embodiments, the method further comprises determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block such that determining the persistence sensitivity value for the block comprises determining, for the block, whether the block has persistence continuity such that the block has co-located regions of low spatio-temporal complexity and low motion complexity in one or more past and future pictures of the video sequence and when the block has persistence continuity, setting the persistence sensitivity value for the block to zero.

Further to the first embodiments, the method further comprises determining, for the block, a psychovisual sensitivity value and a persistence sensitivity value and combining the psychovisual sensitivity value and the persistence sensitivity value to generate a psychovisual and persistence sensitivity value for the block such that generating the adaptive rate distortion optimization Lagrange multiplier for the block is based at least in part on the psychovisual and persistence sensitivy value for the block such that determining the persistence sensitivity value for the block comprises determining, for the block, whether the block has forward persistence continuity such that the block has co-located regions of low spatio-temporal complexity and low motion complexity in a number future pictures of the video sequence through a number of pictures in the group of pictures, determining a spatio-temporal complexity for the block based on a future picture that is the number of pictures in the group of pictures in the future with respect to the current frame, and, when the spatio-temporal complexity for the block based on the future picture indicates low complexity and the block has forward persistence continuity, setting the persistence sensitivity value for the block to a first value, and, when the spatio-temporal complexity for the block based on the future picture indicates medium complexity and the block has forward persistence continuity, setting the persistence sensitivity value for the block to a second value greater than the first value.

Further to the first embodiments, determining the coding parameters for the block comprises performing an exhaustive or an adaptive rate distortion optimization search for the block using the rate distortion optimization Lagrange multiplier and the quantization parameter.

Further to the first embodiments, the method further comprises determining, for each block of the current picture, a block level spatial complexity for the block, determining, for each block of the current picture, a psychovisual and persistence sensitivy value for the block to generate a psychovisual and persistence map for the current picture, determining, for each block of the current picture, an adaptive rate distortion optimization Lagrange multiplier based at least in part on the corresponding block level spatial complexity and psychovisual and persistence sensitivy value, and determining, for each block of the current picture, coding parameters for each block based at least in part on the corresponding adaptive rate distortion optimization Lagrange multiplier, such that each block comprises one of a largest coding unit or a coding unit of the current picture and the bitstream comprises an HEVC compliant bitstream.

In one or more second embodiments, a system for coding video comprises a memory configured to store a current picture of a video sequence and a processor coupled to the memory, the processor to determine a block level spatial complexity for a block of the current picture, to generate an adaptive rate distortion optimization Lagrange multiplier for the block based at least in part on a spatial complexity of a group of pictures comprising the current picture, a temporal complexity of the group of pictures, and a level of the current picture in a hierarchical pyramid of the group of pictures, to generate a block level quantization parameter for the block based on the adaptive rate distortion optimization Lagrange multiplier and at least one adaptive parameter based on the picture type of the current picture, the level of the current picture in the pyramid hierarchy, and the block level spatial complexity of the block, to determine coding parameters for the block based at least in part on a rate distortion optimization using the adaptive rate distortion optimization Lagrange multiplier and the block level quantization parameter, and to encode the block using the coding parameters and the block level quantization parameter into a bitstream.

Further to the second embodiments, the processor to generate the block level quantization parameter comprises the processor to sum the at least one adaptive parameter and a product of a log of the adaptive rate distortion optimization Lagrange multiplier and a second adaptive parameter, such that the at least one adaptive parameter and the second adaptive parameter are both based on the picture type of the current picture, the level of the current picture in the pyramid hierarchy, and the block level spatial complexity of the block.

Further to the second embodiments, the processor to generate the block level quantization parameter comprises the processor to sum the at least one adaptive parameter and a product of a log of the adaptive rate distortion optimization Lagrange multiplier and a second adaptive parameter, such that the at least one adaptive parameter and the second adaptive parameter are both based on the picture type of the current picture, the level of the current picture in the pyramid hierarchy, and the block level spatial complexity of the block, such that the picture type is a P-picture type and the processor to determine the at least one adaptive parameter and the second adaptive parameter comprises the processor to, when the spatial complexity is a first value, set the at least one adaptive parameter and the second adaptive parameter to second and third values, respectively, and, when the spatial complexity is a fourth value, set the at least one adaptive parameter and the second adaptive parameter to fifth and sixth values, respectively, such that the first value is less than the fourth value, the second value is greater than the fifth value, and the third value is less that the sixth value.

Further to the second embodiments, the processor is further to determine an adaptive lambda factor based on the spatial complexity of the group of pictures, the temporal complexity of the group of pictures, and the level of the current picture in the hierarchical pyramid of the group of pictures, such that the processor to generate the adaptive rate distortion optimization Lagrange multiplier comprises the processor to determine a product of the adaptive lambda factor and an exponential of a base raised to a value comprising a reference quantization parameter.

Further to the second embodiments, the processor is further to determine an adaptive lambda factor based on the spatial complexity of the group of pictures, the temporal complexity of the group of pictures, and the level of the current picture in the hierarchical pyramid of the group of pictures, such that the processor to generate the adaptive rate distortion optimization Lagrange multiplier comprises the processor to determine a product of the adaptive lambda factor and an exponential of a base raised to a value comprising a reference quantization parameter such that, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, such that the first value is less than the second value and the second value is less than the third value.

Further to the second embodiments, the processor is further to determine an adaptive lambda factor based on the spatial complexity of the group of pictures, the temporal complexity of the group of pictures, and the level of the current picture in the hierarchical pyramid of the group of pictures, such that the processor to generate the adaptive rate distortion optimization Lagrange multiplier comprises the processor to determine a product of the adaptive lambda factor and an exponential of a base raised to a value comprising a reference quantization parameter such that, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, such that the first value is less than the second value and the second value is less than the third value and such that the processor is further to when the temporal complexity is greater than a product of the spatial complexity and a first constant less a second constant and the spatial complexity is greater than a third constant, indicate the group of pictures is a high complexity group of pictures, when the temporal complexity is not greater than the product of the spatial complexity and the first constant less the second constant and the spatial complexity is greater than the third constant, indicate the group of pictures is a medium complexity group of pictures, and when the temporal complexity is less than the spatial complexity less the third constant and the spatial complexity is not greater than the third constant, indicate the group of pictures is a low complexity group of pictures.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block such that the processor to generate the adaptive rate distortion optimization Lagrange multiplier comprises the processor to determine a product of an adaptive lambda factor and an exponential of a base raised to a value comprising the psychovisual and persistence sensitivity value.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block such that the processor to combine the psychovisual sensitivity value and the persistence sensitivy value comprises the processor to sum the psychovisual value and the persistence sensitivy value.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block such that the processor to determine the psychovisual sensitivity value for the block comprises the processor to generate a black level mask for the current picture, the black level mask indicating, on a block by block basis, whether blocks of the current picture have an average luminance less than a threshold, to generate a luminance sensitivity value for each block of the current picture, to generate a contrast sensitivity value for each block of the current picture, and to generate a visual sensitivity map including, for each block of the current picture, either a visual sensitivity value for the block when the black level mask does not mask the block or a null value when the black level mask does mask the block, such that the visual sensitivity value for the block comprises a sum of the luminance sensitivity value and the contrast sensitivity value.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block such that the processor to determine the psychovisual sensitivity value for the block comprises the processor to generate an initial psychovisual sensitivity map for the current picture, the initial psychovisual sensitivity map including, for each block of the current picture, a psychovisual sensitivity value, determine a human region of interest block map and a visibility sensitivity block map for the current picture, combine the human region of interest block map and the visibility sensitivity block map to provide a psychovisual regions of interest block map, the psychovisual regions of interest block map including, for each block of the current picture, an indicator of whether the block is fully in a region of interest, partially in a region of interest, or not in a region of interest, and modulate the initial psychovisual sensitivity map based on the psychovisual regions of interest block map to provide a final psychovisual sensitivity map, the final psychovisual sensitivity map including the psychovisual and persistence sensitivity value for the block.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block such that the processor to determine the psychovisual sensitivity value for the block comprises the processor to generate an initial psychovisual sensitivity map for the current picture, the initial psychovisual sensitivity map including, for each block of the current picture, a psychovisual sensitivity value, determine a human region of interest block map and a visibility sensitivity block map for the current picture, combine the human region of interest block map and the visibility sensitivity block map to provide a psychovisual regions of interest block map, the psychovisual regions of interest block map including, for each block of the current picture, an indicator of whether the block is fully in a region of interest, partially in a region of interest, or not in a region of interest, and modulate the initial psychovisual sensitivity map based on the psychovisual regions of interest block map to provide a final psychovisual sensitivity map, the final psychovisual sensitivity map including the psychovisual and persistence sensitivity value for the block such that the processor to combine the human region of interest bock map and the visibility sensitivity bock map comprises the processor to, when a number of human region of interest blocks in the human region of interest bock map exceeds or meets a threshold, set the psychovisual regions of interest block map to match the human region of interest map, and, when the number of human region of interest blocks in the human region of interest bock map does not meet the threshold, set the psychovisual regions of interest block map to include the human region of interest blocks and at least one region from the visibility sensitivity bock map having a maximum sensitivity of the regions of the visibility sensitivity bock map.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block such that the processor to determine the psychovisual sensitivity value for the block comprises the processor to generate an initial psychovisual sensitivity map for the current picture, the initial psychovisual sensitivity map including, for each block of the current picture, a psychovisual sensitivity value, determine a human region of interest block map and a visibility sensitivity block map for the current picture, combine the human region of interest block map and the visibility sensitivity block map to provide a psychovisual regions of interest block map, the psychovisual regions of interest block map including, for each block of the current picture, an indicator of whether the block is fully in a region of interest, partially in a region of interest, or not in a region of interest, and modulate the initial psychovisual sensitivity map based on the psychovisual regions of interest block map to provide a final psychovisual sensitivity map, the final psychovisual sensitivity map including the psychovisual and persistence sensitivity value for the block such that the processor to modulate the initial psychovisual sensitivity map based on the psychovisual regions of interest block map comprises the processor to increase a first sensitivity of a first block of the initial psychovisual sensitivity map that comprises a region of interest in the psychovisual regions of interest block map and decrease a second sensitivity of a second block of the initial psychovisual sensitivity map that comprises a region of no interest in the psychovisual regions of interest block map.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block such that the processor to determine the persistence sensitivity value for the block comprises the processor to determine, for the block, whether the block has persistence continuity such that the block has co-located regions of low spatio-temporal complexity and low motion complexity in one or more past and future pictures of the video sequence and to, when the block has persistence continuity, set the persistence sensitivity value for the block to zero.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block such that the processor to determine the psychovisual sensitivity value for the block comprises the processor to generate a black level mask for the current picture, the black level mask indicating, on a block by block basis, whether blocks of the current picture have an average luminance less than a threshold, to generate a luminance sensitivity value for each block of the current picture, to generate a contrast sensitivity value for each block of the current picture, and to generate a visual sensitivity map including, for each block of the current picture, either a visual sensitivity value for the block when the black level mask does not mask the block or a null value when the black level mask does mask the block, such that the visual sensitivity value for the block comprises a sum of the luminance sensitivity value and the contrast sensitivity value; and/or the processor to determine the persistence sensitivity value for the block comprises the processor to determine, for the block, whether the block has persistence continuity such that the block has co-located regions of low spatio-temporal complexity and low motion complexity in one or more past and future pictures of the video sequence and to, when the block has persistence continuity, set the persistence sensitivity value for the block to zero.

Further to the second embodiments, the processor is further to determine, for the block, a psychovisual sensitivity value and a persistence sensitivity value and to combine the psychovisual sensitivity value and the persistence sensitivity value to generate a psychovisual and persistence sensitivity value for the block, such that the processor to generate the adaptive rate distortion optimization Lagrange multiplier for the block is based at least in part on the psychovisual and persistence sensitivy value for the block such that the processor to determine the persistence sensitivity value for the block comprises the processor to determine, for the block, whether the block has forward persistence continuity such that the block has co-located regions of low spatio-temporal complexity and low motion complexity in a number future pictures of the video sequence through a number of pictures in the group of pictures, determine a spatio-temporal complexity for the block based on a future picture that is the number of pictures in the group of pictures in the future with respect to the current frame, and, when the spatio-temporal complexity for the block based on the future picture indicates low complexity and the block has forward persistence continuity, set the persistence sensitivity value for the block to a first value, and, when the spatio-temporal complexity for the block based on the future picture indicates medium complexity and the block has forward persistence continuity, set the persistence sensitivity value for the block to a second value greater than the first value.

Further to the second embodiments, the processor to determine the coding parameters for the block comprises the processor to perform an exhaustive or an adaptive rate distortion optimization search for the block using the rate distortion optimization Lagrange multiplier and the quantization parameter.

Further to the second embodiments, the processor is further to determine, for each block of the current picture, a block level spatial complexity for the block, determine, for each block of the current picture, a psychovisual and persistence sensitivy value for the block to generate a psychovisual and persistence map for the current picture, determine, for each block of the current picture, an adaptive rate distortion optimization Lagrange multiplier based at least in part on the corresponding block level spatial complexity and psychovisual and persistence sensitivy value, and determine, for each block of the current picture, coding parameters for each block based at least in part on the corresponding adaptive rate distortion optimization Lagrange multiplier, such that each block comprises one of a largest coding unit or a coding unit of the current picture and the bitstream comprises an HEVC compliant bitstream.

In one or more third embodiments, a system comprises means for determining a block level spatial complexity for a block of a current picture of a video sequence, means for generating an adaptive rate distortion optimization Lagrange multiplier for the block based at least in part on a spatial complexity of a group of pictures comprising the current picture, a temporal complexity of the group of pictures, and a level of the current picture in a hierarchical pyramid of the group of pictures, means for generating a block level quantization parameter for the block based on the adaptive rate distortion optimization Lagrange multiplier and at least one adaptive parameter based on the picture type of the current picture, the level of the current picture in the pyramid hierarchy, and the block level spatial complexity of the block, means for determining coding parameters for the block based at least in part on a rate distortion optimization using the adaptive rate distortion optimization Lagrange multiplier and the block level quantization parameter, and means for encoding the block using the coding parameters and the block level quantization parameter into a bitstream.

Further to the third embodiments, the means for generating the block level quantization parameter comprise means for summing the at least one adaptive parameter and a product of a log of the adaptive rate distortion optimization Lagrange multiplier and a second adaptive parameter, such that the at least one adaptive parameter and the second adaptive parameter are both based on the picture type of the current picture, the level of the current picture in the pyramid hierarchy, and the block level spatial complexity of the block.

Further to the third embodiments, the system further comprises means for determining an adaptive lambda factor based on the spatial complexity of the group of pictures, the temporal complexity of the group of pictures, and the level of the current picture in the hierarchical pyramid of the group of pictures, such that the means for generating the adaptive rate distortion optimization Lagrange multiplier comprise means for determining a product of the adaptive lambda factor and an exponential of a base raised to a value comprising a reference quantization parameter.

Further to the third embodiments, the system further comprises means for determining an adaptive lambda factor based on the spatial complexity of the group of pictures, the temporal complexity of the group of pictures, and the level of the current picture in the hierarchical pyramid of the group of pictures, such that the means for generating the adaptive rate distortion optimization Lagrange multiplier comprise means for determining a product of the adaptive lambda factor and an exponential of a base raised to a value comprising a reference quantization parameter such that, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, such that the first value is less than the second value and the second value is less than the third value.

Further to the third embodiments, the system further comprises means for determining, for the block, a psychovisual sensitivity value and a persistence sensitivity value and means for combining the psychovisual sensitivity value and the persistence sensitivity value to generate a psychovisual and persistence sensitivity value for the block, such that the means for generating the adaptive rate distortion optimization Lagrange multiplier for the block generate the adaptive rate distortion optimization Lagrange multiplier for the block based at least in part on the psychovisual and persistence sensitivy value for the block.

Further to the third embodiments, the system further comprises means for determining, for the block, a psychovisual sensitivity value and a persistence sensitivity value and means for combining the psychovisual sensitivity value and the persistence sensitivity value to generate a psychovisual and persistence sensitivity value for the block, such that the means for generating the adaptive rate distortion optimization Lagrange multiplier for the block generate the adaptive rate distortion optimization Lagrange multiplier for the block based at least in part on the psychovisual and persistence sensitivy value for the block such that the means for determining the psychovisual sensitivity value for the block comprise means for generating a black level mask for the current picture, the black level mask indicating, on a block by block basis, whether blocks of the current picture have an average luminance less than a threshold, means for generating a luminance sensitivity value for each block of the current picture, means for generating a contrast sensitivity value for each block of the current picture, and means for generating a visual sensitivity map, the visual sensitivity map including, for each block of the current picture, either a visual sensitivity value for the block when the black level mask does not mask the block or a null value when the black level mask does mask the block, such that the visual sensitivity value for the block comprises a sum of the luminance sensitivity value and the contrast sensitivity value.

Further to the third embodiments, the system further comprises means for determining, for the block, a psychovisual sensitivity value and a persistence sensitivity value and means for combining the psychovisual sensitivity value and the persistence sensitivity value to generate a psychovisual and persistence sensitivity value for the block, such that the means for generating the adaptive rate distortion optimization Lagrange multiplier for the block generate the adaptive rate distortion optimization Lagrange multiplier for the block based at least in part on the psychovisual and persistence sensitivy value for the block such that the means for determining the persistence sensitivity value for the block comprise means for determining, for the block, whether the block has persistence continuity such that the block has co-located regions of low spatio-temporal complexity and low motion complexity in one or more past and future pictures of the video sequence and means for, when the block has persistence continuity, setting the persistence sensitivity value for the block to zero.

In one or more fourth embodiments, at least one machine readable medium comprises a plurality of instructions that, in response to being executed on a device, cause the device to code video by determining a block level spatial complexity for a block of a current picture of a video sequence, generating an adaptive rate distortion optimization Lagrange multiplier for the block based at least in part on a spatial complexity of a group of pictures comprising the current picture, a temporal complexity of the group of pictures, and a level of the current picture in a hierarchical pyramid of the group of pictures, generating a block level quantization parameter for the block based on the adaptive rate distortion optimization Lagrange multiplier and at least one adaptive parameter based on the picture type of the current picture, the level of the current picture in the pyramid hierarchy, and the block level spatial complexity of the block, determining coding parameters for the block based at least in part on a rate distortion optimization using the adaptive rate distortion optimization Lagrange multiplier and the block level quantization parameter, and encoding the block using the coding parameters and the block level quantization parameter into a bitstream.

Further to the fourth embodiments, generating the block level quantization parameter comprises summing the at least one adaptive parameter and a product of a log of the adaptive rate distortion optimization Lagrange multiplier and a second adaptive parameter, such that the at least one adaptive parameter and the second adaptive parameter are both based on the picture type of the current picture, the level of the current picture in the pyramid hierarchy, and the block level spatial complexity of the block.

Further to the fourth embodiments, the machine readable medium comprises further instructions that, in response to being executed on the device, cause the device to code video by determining an adaptive lambda factor based on the spatial complexity of the group of pictures, the temporal complexity of the group of pictures, and the level of the current picture in the hierarchical pyramid of the group of pictures, such that generating the adaptive rate distortion optimization Lagrange multiplier comprises determining a product of the adaptive lambda factor and an exponential of a base raised to a value comprising a reference quantization parameter.

Further to the fourth embodiments, the machine readable medium comprises further instructions that, in response to being executed on the device, cause the device to code video by determining an adaptive lambda factor based on the spatial complexity of the group of pictures, the temporal complexity of the group of pictures, and the level of the current picture in the hierarchical pyramid of the group of pictures, such that generating the adaptive rate distortion optimization Lagrange multiplier comprises determining a product of the adaptive lambda factor and an exponential of a base raised to a value comprising a reference quantization parameter such that, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, such that the first value is less than the second value and the second value is less than the third value.

Further to the fourth embodiments, the machine readable medium comprises further instructions that, in response to being executed on the device, cause the device to code video by determining, for the block, a psychovisual sensitivity value and a persistence sensitivity value and combining the psychovisual sensitivity value and the persistence sensitivity value to generate a psychovisual and persistence sensitivity value for the block, such that generating the adaptive rate distortion optimization Lagrange multiplier for the block is based at least in part on the psychovisual and persistence sensitivy value for the block.

Further to the fourth embodiments, the machine readable medium comprises further instructions that, in response to being executed on the device, cause the device to code video by determining, for the block, a psychovisual sensitivity value and a persistence sensitivity value and combining the psychovisual sensitivity value and the persistence sensitivity value to generate a psychovisual and persistence sensitivity value for the block, such that generating the adaptive rate distortion optimization Lagrange multiplier for the block is based at least in part on the psychovisual and persistence sensitivy value for the block such that determining the psychovisual sensitivity value for the block comprises generating a black level mask for the current picture, the black level mask indicating, on a block by block basis, whether blocks of the current picture have an average luminance less than a threshold, generating a luminance sensitivity value for each block of the current picture, generating a contrast sensitivity value for each block of the current picture, and generating a visual sensitivity map including, for each block of the current picture, either a visual sensitivity value for the block when the black level mask does not mask the block or a null value when the black level mask does mask the block, such that the visual sensitivity value for the block comprises a sum of the luminance sensitivity value and the contrast sensitivity value.

Further to the fourth embodiments, the machine readable medium comprises further instructions that, in response to being executed on the device, cause the device to code video by determining, for the block, a psychovisual sensitivity value and a persistence sensitivity value and combining the psychovisual sensitivity value and the persistence sensitivity value to generate a psychovisual and persistence sensitivity value for the block, such that generating the adaptive rate distortion optimization Lagrange multiplier for the block is based at least in part on the psychovisual and persistence sensitivy value for the block such that determining the persistence sensitivity value for the block comprises determining, for the block, whether the block has persistence continuity such that the block has co-located regions of low spatio-temporal complexity and low motion complexity in one or more past and future pictures of the video sequence and, when the block has persistence continuity, setting the persistence sensitivity value for the block to zero.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method for video coding comprising:

determining a block level spatial complexity for a block of a current picture of a video sequence;

generating an adaptive rate distortion optimization Lagrange multiplier for the block based at least in part on a spatial complexity of a group of pictures comprising the current picture, a temporal complexity of the group of pictures, and a level of the current picture in a hierarchical pyramid of the group of pictures;

generating a block level quantization parameter for the block based on the adaptive rate distortion optimization Lagrange multiplier and at least one adaptive parameter based on a picture type of the current picture, the level of the current picture in the pyramid hierarchy, and the block level spatial complexity of the block;

determining coding parameters for the block based at least in part on a rate distortion optimization using the adaptive rate distortion optimization Lagrange multiplier and the block level quantization parameter; and encoding the block using the coding parameters and the block level quantization parameter into a bitstream.

2. The method of claim 1, wherein generating the block level quantization parameter comprises summing the at least one adaptive parameter and a product of a log of the adaptive rate distortion optimization Lagrange multiplier and a second adaptive parameter, wherein the at least one adaptive parameter and the second adaptive parameter are both based on the picture type of the current picture, the level of the current picture in the pyramid hierarchy, and the block level spatial complexity of the block.

3. The method of claim 2, wherein the picture type is a P-picture type and determining the at least one adaptive parameter and the second adaptive parameter comprises:

when the block level spatial complexity is a first value, setting the at least one adaptive parameter and the second adaptive parameter to second and third values, respectively; and when the block level spatial complexity is a fourth value, setting the at least one adaptive parameter and the second adaptive parameter to fifth and sixth values, respectively, wherein the first value is less than the fourth value, the second value is greater than the fifth value, and the third value is less that the sixth value.

4. The method of claim 1, further comprising:

determining an adaptive lambda factor based on the spatial complexity of the group of pictures, the temporal complexity of the group of pictures, and the level of the current picture in the hierarchical pyramid of the group of pictures, wherein generating the adaptive rate distortion optimization Lagrange multiplier comprises determining a product of the adaptive lambda factor and an exponential of a base raised to a value comprising a reference quantization parameter.

5. The method of claim 4, wherein, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, wherein the first value is less than the second value and the second value is less than the third value.

6. The method of claim 5, further comprising:

when the temporal complexity is greater than a product of the spatial complexity and a first constant less a second constant and the spatial complexity is greater than a third constant, indicating the group of pictures is a high complexity group of pictures;

when the temporal complexity is not greater than the product of the spatial complexity and the first constant less the second constant and the spatial complexity is greater than the third constant, indicating the group of pictures is a medium complexity group of pictures; and when the temporal complexity is less than the spatial complexity less the third constant and the spatial complexity is not greater than the third constant, indicating the group of pictures is a low complexity group of pictures.

7. The method of claim 1, further comprising:

determining, for the block, a psychovisual sensitivity value and a persistence sensitivity value; and combining the psychovisual sensitivity value and the persistence sensitivity value to generate a psychovisual and persistence sensitivity value for the block, wherein generating the adaptive rate distortion optimization Lagrange multiplier for the block is based at least in part on the psychovisual and persistence sensitivy value for the block.

8. The method of claim 7, wherein generating the adaptive rate distortion optimization Lagrange multiplier comprises determining a product of an adaptive lambda factor and an exponential of a base raised to a value comprising the psychovisual and persistence sensitivity value.

9. The method of claim 7, wherein combining the psychovisual sensitivity value and the persistence sensitivy value comprises summing the psychovisual sensitivity value and the persistence sensitivy value.

10. The method of claim 7, wherein determining the psychovisual sensitivity value for the block comprises:

generating a black level mask for the current picture, the black level mask indicating, on a block by block basis, whether blocks of the current picture have an average luminance less than a threshold;

generating a luminance sensitivity value for each block of the current picture;

generating a contrast sensitivity value for each block of the current picture; and generating a visual sensitivity map including, for each block of the current picture, either a visual sensitivity value for the block when the black level mask does not mask the block or a null value when the black level mask does mask the block, wherein the visual sensitivity value for the block comprises a sum of the luminance sensitivity value and the contrast sensitivity value.

11. The method of claim 7, wherein determining the psychovisual sensitivity value for the block comprises:

generating an initial psychovisual sensitivity map for the current picture, the initial psychovisual sensitivity map including, for each block of the current picture, a psychovisual sensitivity value;

determining a human region of interest block map and a visibility sensitivity block map for the current picture;

combining the human region of interest block map and the visibility sensitivity block map to provide a psychovisual regions of interest block map, the psychovisual regions of interest block map including, for each block of the current picture, an indicator of whether the block is fully in a region of interest, partially in a region of interest, or not in a region of interest; and modulating the initial psychovisual sensitivity map based on the psychovisual regions of interest block map to provide a final psychovisual sensitivity map, the final psychovisual sensitivity map including the psychovisual and persistence sensitivity value for the block.

12. The method of claim 11, wherein combining the human region of interest block map and the visibility sensitivity block map comprises:
when a number of human region of interest blocks in the human region of interest block map exceeds or meets a threshold, setting the psychovisual regions of interest block map to match the human region of interest block map; and
when the number of human region of interest blocks in the human region of interest block map does not meet the threshold, setting the psychovisual regions of interest block map to include the human region of interest blocks and at least one region from the visibility sensitivity block map having a maximum sensitivity of the regions of the visibility sensitivity block map.

13. The method of claim 11, wherein modulating the initial psychovisual sensitivity map based on the psychovisual regions of interest block map comprises:
increasing a first sensitivity of a first block of the initial psychovisual sensitivity map that comprises a region of interest in the psychovisual regions of interest block map; and
decreasing a second sensitivity of a second block of the initial psychovisual sensitivity map that comprises a region of no interest in the psychovisual regions of interest block map.

14. The method of claim 7, wherein determining the persistence sensitivity value for the block comprises:
determining, for the block, whether the block has persistence continuity such that the block has co-located regions of low spatio-temporal complexity and low motion complexity in one or more past and future pictures of the video sequence; and
when the block has persistence continuity, setting the persistence sensitivity value for the block to zero.

15. The method of claim 7, wherein determining the persistence sensitivity value for the block comprises:
determining, for the block, whether the block has forward persistence continuity such that the block has co-located regions of low spatio-temporal complexity and low motion complexity in a number future pictures of the video sequence through a number of pictures in the group of pictures;
determining a spatio-temporal complexity for the block based on a future picture that is the number of pictures in the group of pictures in the future with respect to the current frame; and
when the spatio-temporal complexity for the block based on the future picture indicates low complexity and the block has forward persistence continuity, setting the persistence sensitivity value for the block to a first value; and
when the spatio-temporal complexity for the block based on the future picture indicates medium complexity and the block has forward persistence continuity, setting the persistence sensitivity value for the block to a second value greater than the first value.

16. The method of claim 1, wherein determining the coding parameters for the block comprises:
performing an exhaustive or an adaptive rate distortion optimization search for the block using the rate distortion optimization Lagrange multiplier and the quantization parameter.

17. The method of claim 1, further comprising:
determining, for each block of the current picture, a block level spatial complexity for the block;
determining, for each block of the current picture, a psychovisual and persistence sensitivy value for the block to generate a psychovisual and persistence map for the current picture;
determining, for each block of the current picture, an adaptive rate distortion optimization Lagrange multiplier based at least in part on the corresponding block level spatial complexity and psychovisual and persistence sensitivy value; and
determining, for each block of the current picture, coding parameters for each block based at least in part on the corresponding adaptive rate distortion optimization Lagrange multiplier, wherein each block comprises one of a largest coding unit or a coding unit of the current picture and the bitstream comprises an HEVC compliant bitstream.

18. A system for coding video comprising:
a memory configured to store a current picture of a video sequence; and
a processor coupled to the memory, the processor to determine a block level spatial complexity for a block of the current picture, to generate an adaptive rate distortion optimization Lagrange multiplier for the block based at least in part on a spatial complexity of a group of pictures comprising the current picture, a temporal complexity of the group of pictures, and a level of the current picture in a hierarchical pyramid of the group of pictures, to generate a block level quantization parameter for the block based on the adaptive rate distortion optimization Lagrange multiplier and at least one adaptive parameter based on a picture type of the current picture, the level of the current picture in the pyramid hierarchy, and the block level spatial complexity of the block, to determine coding parameters for the block based at least in part on a rate distortion optimization using the adaptive rate distortion optimization Lagrange multiplier and the block level quantization parameter, and to encode the block using the coding parameters and the block level quantization parameter into a bitstream.

19. The system of claim 18, wherein the processor to generate the block level quantization parameter comprises the processor to sum the at least one adaptive parameter and a product of a log of the adaptive rate distortion optimization Lagrange multiplier and a second adaptive parameter, wherein the at least one adaptive parameter and the second adaptive parameter are both based on the picture type of the current picture, the level of the current picture in the pyramid hierarchy, and the block level spatial complexity of the block.

20. The system of claim 18, wherein the processor is further to determine an adaptive lambda factor based on the spatial complexity of the group of pictures, the temporal complexity of the group of pictures, and the level of the current picture in the hierarchical pyramid of the group of pictures, wherein the processor to generate the adaptive rate distortion optimization Lagrange multiplier comprises the processor to determine a product of the adaptive lambda factor and an exponential of a base raised to a value comprising a reference quantization parameter.

21. The system of claim 20, wherein, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, wherein the first value is less than the second value and the second value is less than the third value.

22. The system of claim 18, wherein the processor is further to determine, for the block, a psychovisual sensitivity value and a persistence sensitivity value and to combine the psychovisual sensitivity value and the persistence sensitivity value to generate a psychovisual and persistence sensitivity value for the block, wherein the processor to generate the adaptive rate distortion optimization Lagrange multiplier for the block is based at least in part on the psychovisual and persistence sensitivy value for the block.

23. The system of claim 22, wherein the processor to determine the psychovisual sensitivity value for the block comprises the processor to generate a black level mask for the current picture, the black level mask indicating, on a block by block basis, whether blocks of the current picture have an average luminance less than a threshold, to generate a luminance sensitivity value for each block of the current picture, to generate a contrast sensitivity value for each block of the current picture, and to generate a visual sensitivity map including, for each block of the current picture, either a visual sensitivity value for the block when the black level mask does not mask the block or a null value when the black level mask does mask the block, wherein the visual sensitivity value for the block comprises a sum of the luminance sensitivity value and the contrast sensitivity value.

24. The system of claim 22, wherein the processor to determine the persistence sensitivity value for the block comprises the processor to determine, for the block, whether the block has persistence continuity such that the block has co-located regions of low spatio-temporal complexity and low motion complexity in one or more past and future pictures of the video sequence and to, when the block has persistence continuity, set the persistence sensitivity value for the block to zero.

25. At least one non-transitory machine readable medium comprising a plurality of instructions that, in response to being executed on a device, cause the device to code video by:
  determining a block level spatial complexity for a block of a current picture of a video sequence;
  generating an adaptive rate distortion optimization Lagrange multiplier for the block based at least in part on a spatial complexity of a group of pictures comprising the current picture, a temporal complexity of the group of pictures, and a level of the current picture in a hierarchical pyramid of the group of pictures;
  generating a block level quantization parameter for the block based on the adaptive rate distortion optimization Lagrange multiplier and at least one adaptive parameter based on a picture type of the current picture, the level of the current picture in the pyramid hierarchy, and the block level spatial complexity of the block;
  determining coding parameters for the block based at least in part on a rate distortion optimization using the adaptive rate distortion optimization Lagrange multiplier and the block level quantization parameter; and
  encoding the block using the coding parameters and the block level quantization parameter into a bitstream.

26. The non-transitory machine readable medium of claim 25, wherein generating the block level quantization parameter comprises summing the at least one adaptive parameter and a product of a log of the adaptive rate distortion optimization Lagrange multiplier and a second adaptive parameter, wherein the at least one adaptive parameter and the second adaptive parameter are both based on the picture type of the current picture, the level of the current picture in the pyramid hierarchy, and the block level spatial complexity of the block.

27. The non-transitory machine readable medium of claim 25, the machine readable medium comprising further instructions that, in response to being executed on the device, cause the device to code video by:
  determining an adaptive lambda factor based on the spatial complexity of the group of pictures, the temporal complexity of the group of pictures, and the level of the current picture in the hierarchical pyramid of the group of pictures, wherein
  generating the adaptive rate distortion optimization Lagrange multiplier comprises determining a product of the adaptive lambda factor and an exponential of a base raised to a value comprising a reference quantization parameter.

28. The non-transitory machine readable medium of claim 27, wherein, when the spatial complexity of the group of pictures and the temporal complexity of the group of pictures indicate a high complexity group of pictures the adaptive lambda factor is a first value, when the spatial complexity of the group of pictures and the temporal complexity of the group of pictures indicate a medium complexity group of pictures the adaptive lambda factor is a second value, and when the spatial complexity of the group of pictures and the temporal complexity of the group of pictures indicate a low complexity group of pictures the adaptive lambda factor is a third value, wherein the first value is less than the second value and the second value is less than the third value.

29. The non-transitory machine readable medium of claim 25, the machine readable medium comprising further instructions that, in response to being executed on the device, cause the device to code video by:
  determining, for the block, a psychovisual sensitivity value and a persistence sensitivity value; and
  combining the psychovisual sensitivity value and the persistence sensitivity value to generate a psychovisual and persistence sensitivity value for the block, wherein
  generating the adaptive rate distortion optimization Lagrange multiplier for the block is based at least in part on the psychovisual and persistence sensitivy value for the block.

30. The non-transitory machine readable medium of claim 29, wherein determining the psychovisual sensitivity value for the block comprises:
  generating a black level mask for the current picture, the black level mask indicating, on a block by block basis, whether blocks of the current picture have an average luminance less than a threshold;
  generating a luminance sensitivity value for each block of the current picture;
  generating a contrast sensitivity value for each block of the current picture; and
  generating a visual sensitivity map including, for each block of the current picture, either a visual sensitivity value for the block when the black level mask does not mask the block or a null value when the black level mask does mask the block, wherein the visual sensitivity value for the block comprises a sum of the luminance sensitivity value and the contrast sensitivity value.

31. The non-transitory machine readable medium of claim 29, wherein determining the persistence sensitivity value for the block comprises:
    determining, for the block, whether the block has persistence continuity such that the block has co-located regions of low spatio-temporal complexity and low motion complexity in one or more past and future pictures of the video sequence; and
    when the block has persistence continuity, setting the persistence sensitivity value for the block to zero.

* * * * *